United States Patent
Pietri-Rouxel et al.

(10) Patent No.: US 12,496,328 B2
(45) Date of Patent: Dec. 16, 2025

(54) COMPOSITIONS FOR THE TREATMENT OF SARCOPENIA OR DISUSE ATROPHY

(71) Applicants: ASSOCIATION INSTITUT DE MYOLOGIE, Paris (FR); INSERM (INSTITUT NATIONAL DE LA SANTÉ ET DE LA RECHERCHE MÉDICALE), Paris (FR); SORBONNE UNIVERSITE, Paris (FR)

(72) Inventors: France Pietri-Rouxel, Clichy (FR); Sestina Falcone, Paris (FR)

(73) Assignees: ASSOCIATION INSTITUT DE MYOLOGIE, Paris (FR); INSERM (INSTITUT NATIONAL DE LA SANTÉ ET DE LA RECHERCHE MÉDICALE), Paris (FR); SORBONNE UNIVERSITE, Paris (FR)

( * ) Notice: Subject to any disclaimer, the term of this patent is extended or adjusted under 35 U.S.C. 154(b) by 264 days.

(21) Appl. No.: 17/261,314

(22) PCT Filed: Jul. 19, 2019

(86) PCT No.: PCT/EP2019/069545
§ 371 (c)(1),
(2) Date: Jan. 19, 2021

(87) PCT Pub. No.: WO2020/016425
PCT Pub. Date: Jan. 23, 2020

(65) Prior Publication Data
US 2021/0275639 A1    Sep. 9, 2021

(30) Foreign Application Priority Data

Jul. 20, 2018 (EP) .................................... 18184861
Jan. 18, 2019 (EP) .................................... 19152677

(51) Int. Cl.
*A61K 38/18* (2006.01)
*A61K 38/17* (2006.01)
*A61P 21/06* (2006.01)
*G01N 33/74* (2006.01)

(52) U.S. Cl.
CPC ........ *A61K 38/1841* (2013.01); *A61K 38/177* (2013.01); *A61P 21/06* (2018.01); *G01N 33/74* (2013.01); *A61K 38/1875* (2013.01); *G01N 2333/475* (2013.01); *G01N 2800/2878* (2013.01)

(58) Field of Classification Search
None
See application file for complete search history.

(56) References Cited

U.S. PATENT DOCUMENTS

2014/0213776 A1* 7/2014 Scher ................... C07K 14/475
435/252.33
2014/0233776 A1* 8/2014 Krogsgaard ........... H04R 25/02
381/323

FOREIGN PATENT DOCUMENTS

| EP | 1 721 909 | 11/2006 |
|---|---|---|
| WO | 2014/000042 | 1/2014 |
| WO | 2017/075037 | 5/2017 |

OTHER PUBLICATIONS

Sun et al., 2016, Am. J. Physiol. Cell. Physiol. 311:C101-C115.*
Sartori et al. (2013, Nature Genetics 45(11):1309-1321).*
Winbanks et al. (2003, J. Cell Bio. 203(2):345-357).*
Piétri-Rouxel, F. (Sep. 2022). GDF5 therapeutic potential for Duchenne Muscular Dystrophy gene therapy optimization. In 12th Japanese-French Workshop "New insights in personalized medicine for neuromuscular diseases: From Basic to Applied Myology," pp. 1-20.*
Falcone et al. (Sep. 2022). Unraveling the role of GDF5 therapeutic potential in Amyotrophic Lateral Sclerosis. Myology 2022, Sep. 2022, Nice (France), France. Hal-04002164. pp. 1-4.*
International Search Report and Written Opinion of the ISA for PCT/EP2019/069545, mailed Oct. 25, 2019, 15 pages.
Sartori et al., "BMP signaling controls muscle mass", Nature Genetics, Nov. 2013, vol. 45, No. 11, Nov. 2013, pp. 1309-1318.
Falcone et al., "From voltage sensing to gene expression in the control of muscle mass homeostasis", Neuromuscular Disorders, vol. 27, No. 2, Oct. 1, 2017, 1 page.

* cited by examiner

*Primary Examiner* — Elizabeth C. Kemmerer
(74) *Attorney, Agent, or Firm* — NIXON & VANDERHYE, PC

(57) ABSTRACT

The present invention relates to a substance that activates the GDF5 pathway, for use in a method for the treatment of age-related sarcopenia or disuse atrophy.

14 Claims, 28 Drawing Sheets
Specification includes a Sequence Listing.

Figure 2A:
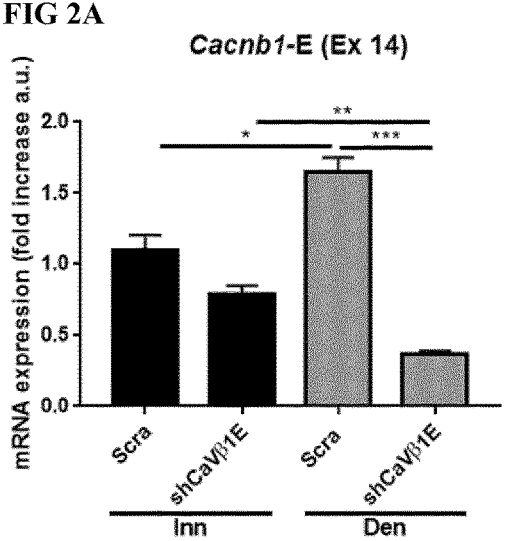

FIG 2H
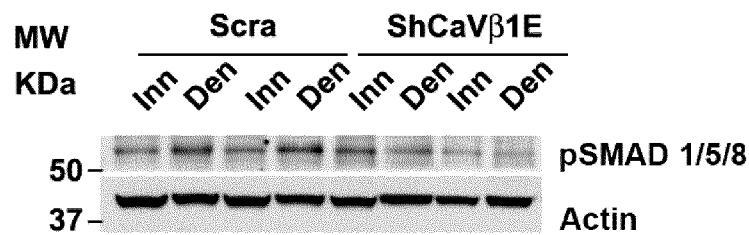
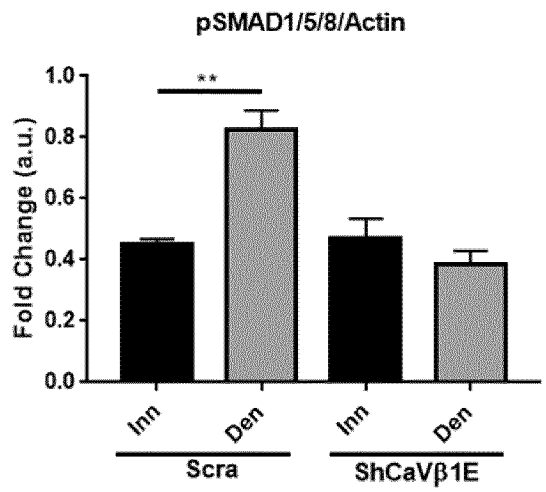
FIG 2I
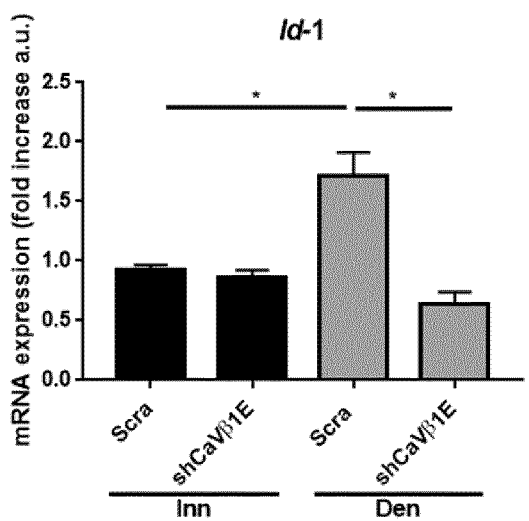
FIG 2J
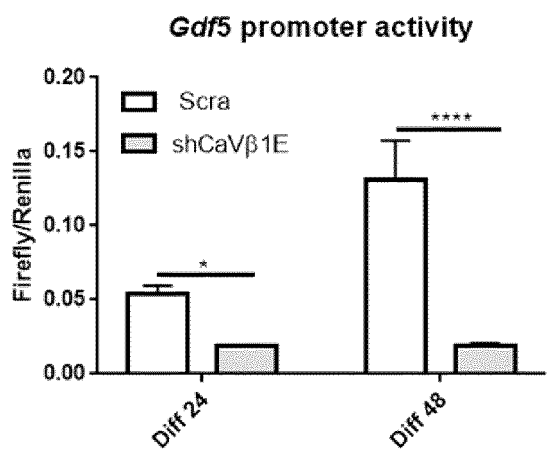

FIG 9A

```
ATGGTCCAGAAGAGCGGCATGTCCCGGGGCCCTTACCCACCTTCCCAAGAGATCCCTATGGAGGTTTCGACCCC
||||                                                                  ||||
ATGG                                                                  AGGT

AGCCACAGGGCAAGTACAGCAAGAGGAAAGGGCGGTTCAAAAGGTCAGACGGGAGTACGTCCTCGGATACAACA
   |||         ||||             ||            |||              ||| || ||
   GCC         CAGC             CG            GAC              CCT GG TA
TCCAACAGCTTCGTCCGCCAGGGCTCAGCAGAGTCCTACACGAGCCGACCATCAGACTCTGATGTGTCTCTGGAG
              ||   ||||||||||||||||||||||||||||||||||||||||||||||||||||||||
              GT   GGGCTCAGCAGAGTCCTACACGAGCCGACCATCAGACTCTGATGTGTCTCTGGAG

GAGGACCGGGAAGCCTTAAGGAAGGAGGCAGAGCGCCAGGCCTTAGCCCAGCTCGAGAAAGCCAAGACCAAACCA
||||||||||||||||||||||||||||||||||||||||||||||||||||||||||||||||||||||||||
GAGGACCGGGAAGCCTTAAGGAAGGAGGCAGAGCGCCAGGCCTTAGCCCAGCTCGAGAAAGCCAAGACCAAACCA

GTGGCTTTTGCTGTTCGGACAAATGTTGGCTACAATCCGTCTCCAGGGGATGAGGTGCCTGTACAGGGAGTGGCC
|||||||||||||||||||||||||||||||||||||||||||||||||||||||||||||||||||||||||||
GTGGCTTTTGCTGTTCGGACAAATGTTGGCTACAATCCGTCTCCAGGGGATGAGGTGCCTGTACAGGGAGTGGCC

ATCACCTTTGAGCCCAAGGACTTCCTACACATCAAGGAGAAGTACAATAATGACTGGTGGATTGGGCGGCTGGTG
|||||||||||||||||||||||||||||||||||||||||||||||||||||||||||||||||||||||||||
ATCACCTTTGAGCCCAAGGACTTCCTACACATCAAGGAGAAGTACAATAATGACTGGTGGATTGGGCGGCTGGTG

AAGGAAGGCTGCGAGGTTGGCTTCATCCCCAGCCCGGTCAAACTGGACAGCCTTCGTCTGCTGCAGGAACAGACC
||||||||||||||||||||||||||||||||||||||||||||||||||||||||||||||||||||||||||||
AAGGAAGGCTGCGAGGTTGGCTTCATCCCCAGCCCGGTCAAACTGGACAGCCTTCGTCTGCTGCAGGAACAGACC

CTGCGCCAGAACCGCCTCAGCTCCAGCAAGTCAGGTGACAACTCCAGTTCCAGTCTGGGAGATGTGGTGACTGGC
|||||||||||||||||||||||||||||||||||||||||||||||||||||||||||||||||||||||||||
CTGCGCCAGAACCGCCTCAGCTCCAGCAAGTCAGGTGACAACTCCAGTTCCAGTCTGGGAGATGTGGTGACTGGC

ACCCGCCGCCCCACACCCCCTGCCAGTGGTAATGAAATGACTAACTTTGCCTTTGAGCTAGACCCCCTAGAGTTA
|||||||||||||||||||||||||||||||||||||||||||||||||||||||||||||||||||||||||||
ACCCGCCGCCCCACACCCCCTGCCAGTGGTAATGAAATGACTAACTTTGCCTTTGAGCTAGACCCCCTAGAGTTA

GAGGAGGAGGAGGCAGAGCTAGGGGAGCACGGCGGCTCAGCCAAGACTAGCGTGAGCAGTGTCACCACGCCGCCA
|||||||||||||||||||||||||||||||||||||||||||||||||||||||||||||||||||||||||||
GAGGAGGAGGAGGCAGAGCTAGGGGAGCACGGCGGCTCAGCCAAGACTAGCGTGAGCAGTGTCACCACGCCGCCA

CCCCACGGCAAGCGCATCCCCTTCTTTAAGAAGACAGAGCACGTGCCCCCCTATGACGTGGTGCCTTCCATGAGG
|||||||||||||||||||||||||||||||||||||||||||||||||||||||||||||||||||||||||||
CCCCACGGCAAGCGCATCCCCTTCTTTAAGAAGACAGAGCACGTGCCCCCCTATGACGTGGTGCCTTCCATGAGG

CCCATCATCCTGGTGGGACCGTCGCTCAAGGGCTATGAGGTGACAGACATGATGCAGAAAGCGTTGTTTGACTTC
|||||||||||||||||||||||||||||||||||||||||||||||||||||||||||||||||||||||||||
CCCATCATCCTGGTGGGACCGTCGCTCAAGGGCTATGAGGTGACAGACATGATGCAGAAAGCGTTGTTTGACTTC

CTCAAGCATCGGTTTGATGGCAGGATTTCCATCACCCGGGTAACAGCTGACATTTCCTGGCCAAACGCTCCGTC
||||||||||||||||||||||||||||||||||||||||||||||||||||||||||||||||||||||||||
CTCAAGCATCGGTTTGATGGCAGGATTTCCATCACCCGGGTAACAGCTGACATTTCCTGGCCAAACGCTCCGTC
```

FIG 9A (CONT.)

```
CTCAACAACCCCAGCAAACACATCATCATTGAGCGCTCCAACACGCGTTCCAGCCTGGCTGAGGTACAGAGTGAA
|||||||||||||||||||||||||||||||||||||||||||||||||||||||||||||||||||||||||||
CTCAACAACCCCAGCAAACACATCATCATTGAGCGCTCCAACACGCGTTCCAGCCTGGCTGAGGTACAGAGTGAA

ATTGAGAGGATCTTCGAGCTGGCCCGGACCTTGCAGCTGGTCGCCTTGGACGCTGACACCATCAACCACCCAGCC
|||||||||||||||||||||||||||||||||||||||||||||||||||||||||||||||||||||||||||
ATTGAGAGGATCTTCGAGCTGGCCCGGACCTTGCAGCTGGTCGCCTTGGACGCTGACACCATCAACCACCCAGCC

CAGCTCTCTAAAACGTCGCTGGCCCCCATCATTGTTTACATCAAGATCACATCTCCCAAGGTACTGCAGAGGCTC
|||||||||||||||||||||||||||||||||||||||||||||||||||||||||||||||||||||||||||
CAGCTCTCTAAAACGTCGCTGGCCCCCATCATTGTTTACATCAAGATCACATCTCCCAAGGTACTGCAGAGGCTC

ATCAAATCCCGAGGGAAGTCTCAATCCAAACACCTCAATGTCCAAATAGCAGCCTCGGAGAAGCTGGCACAGTGT
|||||||||||||||||||||||||||||||||||||||||||||||||||||||||||||||||||||||||||
ATCAAATCCCGAGGGAAGTCTCAATCCAAACACCTCAATGTCCAAATAGCAGCCTCGGAGAAGCTGGCACAGTGT

CCCCCCGAAATGTTTGACATAATCCTGGACGAGAACCAATTGGAAGATGCCTGCGAGCACCTGGCTGAGTACTTG
|||||||||||||||||||||||||||||||||||||||||||||||||||||||||||||||||||||||||||
CCCCCCGAAATGTTTGACATAATCCTGGACGAGAACCAATTGGAAGATGCCTGCGAGCACCTGGCTGAGTACTTG

GAAGCCTACTGGAAGGCCACACATCCGCCTAGCAGCACGCCACCCAATCCGCTGCTGAACCGCACCATGGCTACC
|||||||||||||||||||||||||||||||||||||||||||||||||||||||||||||||||||||||||||
GAAGCCTACTGGAAGGCCACACATCCGCCTAGCAGCACGCCACCCAATCCGCTGCTGAACCGCACCATGGCTACC

GCAGCTCTGGCTGCCAGCCCTGCCCCCGTCTCCAACCTCCAGGGACCCTACCTTGCTTCCGGGGACCAGCCGCTG
||||||||||||||||||||||||||||||||||||||||||x||xxxxx||xx|x||xxxxxxxxxxxx||x
GCAGCTCTGGCTGCCAGCCCTGCCCCCGTCTCCAACCTCCAGGTACAGGTGCTCACCTCGCTCAGGAGAAATCTC GACCGGGCCACTGGGGAACATGCCAGTGTGCACGAGTACCCCGGGGAACTGGGCCAGCCCCCAGGCCTTTACCCC
xx| xxxxxxxxxx|xxxx|x|||xxxxx||xx|xxxx|xx||x||xxxxxxxx|xx|xxxxxxx|xxxxxxxx
AGCTTCTGGGGCGGGCTGGAGGCCTCACCGCGGGAGGCGACGCGGTGGCCCAGCCTCAGGAGCACGCCATGTAG
(Iso D)

AGCAACCACCCACCTGGCCGGGCAGGCACCCTGCGGGCGCTATCCCGCCAAGACACCTTTGATGCTGACACCCCC

GGCAGCCGAAATTCTGCCTACACGGAGCCGGGAGACTCGTGTGTGGACATGGAGACAGACCCCTCAGAGGGCCCA

GGGCCTGGAGACCCTGCAGGGGGAGGCACACCACCAGCCCGGCAGGGCTCCTGGGAAGACGAGGAAGACTATGAG

GAGGAGATGACCGACAACAGGAACCGGGGCCGGAATAAGGCCCGCTACTGTGCGGAGGGTGGTGGGCCGGTTCTG

GGGCGCAATAAGAATGAGCTGGAGGGCTGGGGACAAGGCGTCTACATCCGCTGA (Iso E)
```

FIG 9B

MVQKSGMSRGPYPPSQEIPMEVFDPSPQGKYSKRKGRFKRSDGSTSSDTTSNSFVRQGSAESYTSRPSDSDVSLEE
---------------------------------------------------------------------------------MEVPSRTLVVGSAESYTSRPSDSDVSLEE

DREALRKEAERQALAQLEKAKTKPVAFAVRTNVGYNPSPGDEVPVQGVAITFEPKDFLHIKEKYNNDWWIGRLVKE
DREALRKEAERQALAQLEKAKTKPVAFAVRTNVGYNPSPGDEVPVQGVAITFEPKDFLHIKEKYNNDWWIGRLVKE

GCEVGFIPSPVKLDSLRLLQEQTLRQNRLSSSKSGDNSSSSLGDVVTGTRRPTPPASGNEMTNFAFELDPLELEEEEA
GCEVGFIPSPVKLDSLRLLQEQTLRQNRLSSSKSGDNSSSSLGDVVTGTRRPTPPASGNEMTNFAFELDPLELEEEEA

ELGEHGGSAKTSVSSVTTPPPHGKRIPFFKKTEHVPPYDVVPSMRPIILVGPSLKGYEVTDMMQKALFDFLKHRFDG
ELGEHGGSAKTSVSSVTTPPPHGKRIPFFKKTEHVPPYDVVPSMRPIILVGPSLKGYEVTDMMQKALFDFLKHRFDG

RISITRVTADISLAKRSVLNNPSKHIIIERSNTRSSLAEVQSEIERIFELARTLQLVALDADTINHPAQLSKTSLAPIIVYIKIT
RISITRVTADISLAKRSVLNNPSKHIIIERSNTRSSLAEVQSEIERIFELARTLQLVALDADTINHPAQLSKTSLAPIIVYIKIT

SPKVLQRLIKSRGKSQSKHLNVQIAASEKLAQCPPEMFDIILDENQLEDACEHLAEYLEAYWKATHPPSSTPPNPLLN
SPKVLQRLIKSRGKSQSKHLNVQIAASEKLAQCPPEMFDIILDENQLEDACEHLAEYLEAYWKATHPPSSTPPNPLLN

RTMATAALAASPAPVSNLQGPYLASGDQPLDRATGEHASVHEYPGELGQPPGLYPSNHPPGRAGTLRALSRQDT
RTMATAALAASPAPVSNLQVQVLTSLRRNLSFWGGLEASPRGGDAVAQPQEHAM
                                                                                                         (Iso D)
FDADTPGSRNSAYTEPGDSCVDMETDPSEGPGPGDPAGGGTPPARQGSWEDEEDYEEEMTDNRNRGRNKAR
YCAEGGGPVLGRNKNELEGWGQGVYIR                                          (ISOE)

FIG 9C

```
ATGGTCCAGAAGAGCGGCATGTCCCGGGGCCCTTACCCACCTTCCCAAGAGATCCCTATGGAGGTCTTCGACCCC
||||||||||||||||||||||||||||||||||||||||||||||||||||||||||||||||||||||||||||
ATGGTCCAGAAGAGCGGCATGTCCCGGGGCCCTTACCCACCTTCCCAAGAGATCCCTATGGAGGTCTTCGACCCC

AGCCCACAGGGCAAGTACAGCAAGAGGAAAGGGCGGTTCAAAAGGTCAGACGGGAGTACGTCCTCGGATACAACA
||||||||||||||||||||||||||||||||||||||||||||||||||||||||||||||||||||||||||||
AGCCCACAGGGCAAGTACAGCAAGAGGAAAGGGCGGTTCAAAAGGTCAGACGGGAGTACGTCCTCGGATACAACA

TCCAACAGCTTCGTCCGCCAGGGCTCAGCAGAGTCCTACACGAGCCGACCATCAGACTCTGATGTGTCTCTGGAG
||||||||||||||||||||||||||||||||||||||||||||||||||||||||||||||||||||||||||||
TCCAACAGCTTCGTCCGCCAGGGCTCAGCAGAGTCCTACACGAGCCGACCATCAGACTCTGATGTGTCTCTGGAG

GAGGACCGGGAAGCCTTAAGGAAGGAGGCAGAGCGCCAGGCCTTAGCCCAGCTCGAGAAAGCCAAGACCAAACCA
||||||||||||||||||||||||||||||||||||||||||||||||||||||||||||||||||||||||||||
GAGGACCGGGAAGCCTTAAGGAAGGAGGCAGAGCGCCAGGCCTTAGCCCAGCTCGAGAAAGCCAAGACCAAACCA

GTGGCTTTTGCTGTTCGGACAAATGTTGGCTACAATCCGTCTCCAGGGGATGAGGTGCCTGTACAGGGAGTGGCC
||||||||||||||||||||||||||||||||||||||||||||||||||||||||||||||||||||||||||||
GTGGCTTTTGCTGTTCGGACAAATGTTGGCTACAATCCGTCTCCAGGGGATGAGGTGCCTGTACAGGGAGTGGCC

ATCACCTTTGAGCCCAAGGACTTCCTACACATCAAGGAGAAGTACAATAATGACTGGTGGATTGGGCGGCTGGTG
||||||||||||||||||||||||||||||||||||||||||||||||||||||||||||||||||||||||||||
ATCACCTTTGAGCCCAAGGACTTCCTACACATCAAGGAGAAGTACAATAATGACTGGTGGATTGGGCGGCTGGTG

AAGGAAGGCTGCGAGGTTGGCTTCATCCCCAGCCCGGTCAAACTGGACAGCCTTCGTCTGCTGCAGGAACAGACC
||||||||||||||||||||||||||||||||||||||||||||||||||||||||||||||||||||||||||||
AAGGAAGGCTGCGAGGTTGGCTTCATCCCCAGCCCGGTCAAACTGGACAGCCTTCGTCTGCTGCAGGAACAGACC

CTGCGCCAGAACCGCCTCAGCTCCAGCAAGTCAGGTGACAACTCCAGTTCCAGTCTGGGAGATGTGGTGACTGGC
||||||||||||||||||||||||||||||||||||||||||||||||||||||||||||||||||||||||||||
CTGCGCCAGAACCGCCTCAGCTCCAGCAAGTCAGGTGACAACTCCAGTTCCAGTCTGGGAGATGTGGTGACTGGC

ACCCGCCGCCCCACACCCCCTGCCAGTGGTAATGAAATGACTAACTTTGCCTTTGAGCTAGACCCCCTAGAGTTA
|||||||||||||||||||||||||||||                                    ||*|#
ACCCGCCGCCCCACACCCCCTGCCAGTG                                     CCAA

GAGGAGGAGGAGGCAGAGCTAGGGGAGCACGGCGGCTCAGCCAAGACTAGCGTGAGCAGTGTCACCACGCCGCCA
                       ||           ||           |||||
                       AC           AGA          AGCAG

CCCCACGGCAAGCGCATCCCCTTCTTTAAGAAGACAGAGCACGTGCCCCCCTATGACGTGGTGCCTTCCATGAGG
        ||       |||                ||||||||||||||||||||||||||||||||||||||||
        AA       ATC                GACAGAGCACGTGCCCCCCTATGACGTGGTGCCTTCCATGAGG

CCCATCATCCTGGTGGGACCGTCGCTCAAGGGCTATGAGGTGACAGACATGATGCAGAAAGCGTTGTTTGACTTC
||||||||||||||||||||||||||||||||||||||||||||||||||||||||||||||||||||||||||||
CCCATCATCCTGGTGGGACCGTCGCTCAAGGGCTATGAGGTGACAGACATGATGCAGAAAGCGTTGTTTGACTTC

CTCAAGCATCGGTTTGATGGCAGGATTTCCATCACCCGGGTAACAGCTGACATTTCCCTGGCCAAACGCTCCGTC
||||||||||||||||||||||||||||||||||||||||||||||||||||||||||||||||||||||||||||
CTCAAGCATCGGTTTGATGGCAGGATTTCCATCACCCGGGTAACAGCTGACATTTCCCTGGCCAAACGCTCCGTC
```

FIG 9C (CONT.)

```
CTCAACAACCCCAGCAAACACATCATCATTGAGCGCTCCAACACGCGTTCCAGCCTGGCTGAGGTACAGAGTGAA
|||||||||||||||||||||||||||||||||||||||||||||||||||||||||||||||||||||||||||
CTCAACAACCCCAGCAAACACATCATCATTGAGCGCTCCAACACGCGTTCCAGCCTGGCTGAGGTACAGAGTGAA

ATTGAGAGGATCTTCGAGCTGGCCCGGACCTTGCAGCTGGTCGCCTTGGACGCTGACACCATCAACCACCCAGCC
|||||||||||||||||||||||||||||||||||||||||||||||||||||||||||||||||||||||||||
ATTGAGAGGATCTTCGAGCTGGCCCGGACCTTGCAGCTGGTCGCCTTGGACGCTGACACCATCAACCACCCAGCC

CAGCTCTCTAAAACGTCGCTGGCCCCCATCATTGTTTACATCAAGATCACATCTCCCAAGGTACTGCAGAGGCTC
|||||||||||||||||||||||||||||||||||||||||||||||||||||||||||||||||||||||||||
CAGCTCTCTAAAACGTCGCTGGCCCCCATCATTGTTTACATCAAGATCACATCTCCCAAGGTACTGCAGAGGCTC

ATCAAATCCCGAGGGAAGTCTCAATCCAAACACCTCAATGTCCAAATAGCAGCCTCGGAGAAGCTGGCACAGTGT
|||||||||||||||||||||||||||||||||||||||||||||||||||||||||||||||||||||||||||
ATCAAATCCCGAGGGAAGTCTCAATCCAAACACCTCAATGTCCAAATAGCAGCCTCGGAGAAGCTGGCACAGTGT

CCCCCCGAAATGTTTGACATAATCCTGGACGAGAACCAATTGGAAGATGCCTGCGAGCACCTGGCTGAGTACTTG
|||||||||||||||||||||||||||||||||||||||||||||||||||||||||||||||||||||||||||
CCCCCCGAAATGTTTGACATAATCCTGGACGAGAACCAATTGGAAGATGCCTGCGAGCACCTGGCTGAGTACTTG

GAAGCCTACTGGAAGGCCACACATCCGCCTAGCAGCACGCCACCCAATCCGCTGCTGAACCGCACCATGGCTACC
|||||||||||||||||||||||||||||||||||||||||||||||||||||||||||||||||||||||||||
GAAGCCTACTGGAAGGCCACACATCCGCCTAGCAGCACGCCACCCAATCCGCTGCTGAACCGCACCATGGCTACC

GCAGCTCTGGCTGCCAGCCCTGCCCCCGTCTCCAACCTCCAGGGACCCTACCTTGCTTCCGGGGACCAGCCGCTG
|||||||||||||||||||||||||||||||||||||||||||||||||||||||||||||||||||||||||||
GCAGCTCTGGCTGCCAGCCCTGCCCCCGTCTCCAACCTCCAGGGACCCTACCTTGCTTCCGGGGACCAGCCGCTG

GACCGGGCCACTGGGGAACATGCCAGTGTGCACGAGTACCCCGGGGAACTGGGCCAGCCCCAGGCCTTTACCCC
|||||||||||||||||||||||||||||||||||||||||||||||||||||||||||||||||||||||||||
GACCGGGCCACTGGGGAACATGCCAGTGTGCACGAGTACCCCGGGGAACTGGGCCAGCCCCAGGCCTTTACCCC

AGCAACCACCCACCTGGCCGGGCAGGCACCCTGCGGGCGCTATCCCGCCAAGACACCTTTGATGCTGACACCCCC
|||||||||||||||||||||||||||||||||||||||||||||||||||||||||||||||||||||||||||
AGCAACCACCCACCTGGCCGGGCAGGCACCCTGCGGGCGCTATCCCGCCAAGACACCTTTGATGCTGACACCCCC

GGCAGCCGAAATTCTGCCTACACGGAGCCGGGAGACTCGTGTGTGGACATGGAGACAGACCCCTCAGAGGGCCCA
|||||||||||||||||||||||||||||||||||||||||||||||||||||||||||||||||||||||||||
GGCAGCCGAAATTCTGCCTACACGGAGCCGGGAGACTCGTGTGTGGACATGGAGACAGACCCCTCAGAGGGCCCA

GGGCCTGGAGACCCTGCAGGGGGAGGCACACCACCAGCCCGGCAGGGCTCCTGGGAAGACGAGGAAGACTATGAG
|||||||||||||||||||||||||||||||||||||||||||||||||||||||||||||||||||||||||||
GGGCCTGGAGACCCTGCAGGGGGAGGCACACCACCAGCCCGGCAGGGCTCCTGGGAAGACGAGGAAGACTATGAG

GAGGAGATGACCGACAACAGGAACCGGGGCCGGAATAAGGCCCGCTACTGTGCGGAGGGTGGTGGGCCGGTTCTG
|||||||||||||||||||||||||||||||||||||||||||||||||||||||||||||||||||||||||||
GAGGAGATGACCGACAACAGGAACCGGGGCCGGAATAAGGCCCGCTACTGTGCGGAGGGTGGTGGGCCGGTTCTG

GGGCGCAATAAGAATGAGCTGGAGGGCTGGGGACAAGGCGTCTACATCCGCTGA  Cacnb1E
||||||||||||||||||||||||||||||||||||||||||||||||||||||
GGGCGCAATAAGAATGAGCTGGAGGGCTGGGGACAAGGCGTCTACATCCGCTGA  Cacnb1B
```

COMPOSITIONS FOR THE TREATMENT OF SARCOPENIA OR DISUSE ATROPHY

This application is the U.S. national phase of International Application No. PCT/EP2019/069545 filed 19 Jul. 2019, which designated the U.S. and claims priority to EP patent application Ser. No. 18/184,861.5 filed 20 Jul. 2018, and EP Patent Application No. 19152677.1 filed 18 Jan. 2019, the entire contents of each of which are hereby incorporated by reference.

REFERENCE TO SEQUENCE LISTING SUBMITTED ELECTRONICALLY

The content of the electronically submitted sequence listing (Name: 3665_374_Sequence_Listing.txt; Size: 32,196 bytes; and Date of Creation: Jan. 15, 2021) is incorporated by reference in its entirety.

The present invention relates to a substance that activates the GDF5 pathway, for use in a method for the treatment of age-related sarcopenia or disuse atrophy.

BACKGROUND OF THE INVENTION

Sarcopenia is an age-related condition characterized by a progressive loss of skeletal muscle mass and function. From age 50, muscle quantity and strength start to decrease and typically, more than 30% of muscle initial mass is lost at 80 years old. Sarcopenia is a major clinical problem in public health of older people, with adverse outcomes such as disability, poor quality of life, hospitalization needs and increased risk of death. Sarcopenia may lead to frailty and several studies have shown that the risk of falls is significantly elevated in subjects with reduced muscle strength. This condition raises major concerns, and it is important to prevent or postpone as much as possible the onset of this condition, to enhance survival and to reduce the demand for long-term care.

A very large number of studies have addressed the molecular mechanisms related to disuse atrophy and sarcopenia.

Disuse atrophy is generally characterized by an early phase, in which atrogenes are rapidly activated, and a later phase in which atrophy is stabilized and differentially expressed genes return to basal levels. This last observation has suggested that molecular mechanism might be activated to counteract muscle mass loss. Such a hypothesis has been confirmed by the evidence that not only total mRNA and protein content increase in denervated muscle (Furuno, K., Goodman, M. N. & Goldberg, A. L. Role of different proteolytic systems in the degradation of muscle proteins during denervation atrophy. *J. Biol. Chem.* 265, 8550-8557 (1990)) but also that protein synthesis machinery is activated (Furano Op. cit.; Sartori, R. et al. BMP signaling controls muscle mass. *Nat. Genet.* 45, 1309-1318 (2013). Few components of this compensatory response have been identified; in particular, a crucial role is played by the Gdf5/Smad4 pathway, essential to counteract muscle mass loss in denervated and fasted muscle (Sartori Op. cit); but also to promote re-innervation after nerve crush (Macpherson, P. C. D., Farshi, P. & Goldman, D. Dach2-Hdac9 signaling regulates reinnervation of muscle endplates. *Development* 142, 4038-4048 (2015)). However, surgical sciatic nerve resection mimics a very severe pathological condition in which complete nerve withdrawal can induce sudden and irreversible molecular pathways and induce compensatory response. Nevertheless, this model is poorly reflecting other neuromuscular diseases in which muscle degradation is much slower and progressive and mechanisms counterbalancing muscle loss might be altered.

Aging muscle, instead, progressively loses the capability to counterbalance mass wasting as a consequence of several molecular alterations, including increased oxidation and DNA damage, inefficient autophagy, metabolic changes, immobilization and reduced nerve-muscle connection (Miljkovic, N., Lim, J.-Y., Miljkovic, I. & Frontera, W. R. Aging of skeletal muscle fibers. *Ann. Rehabil. Med.* 39, 155-162 (2015)). Caloric restriction, aimed to ameliorate autophagy and decrease oxidative DNA damage, and exercise or functional electrical stimulation, aimed to restore muscle activity are, to date, the best approaches to maintain aged skeletal muscle function and size. However a better understanding of the mechanisms leading compensatory response counteracting decline of muscle mass and function would be of great relevance to identify molecular targets to improve survival and quality of life during senescence.

In the present application, we strikingly demonstrate that CaVβ1-E is the major player to maintain physiological muscle mass by sustaining Gdf5 expression and signaling in aging muscle but also in young disused muscle. For the first time, we identified that age-related sarcopenia is associated with a strong decrease of CaVβ1-E/GDF5 and characterized the crucial role of CaVβ1-E as the molecule driving the activation of the molecular pathway necessary to counterbalance muscle atrophy after electrical activity impairment in adult and aging muscle

SUMMARY OF THE INVENTION

The identification of the association of age-related sarcopenia with a strong decrease of CaVβ1-E/GDF5 provides a therapeutic solution to a major health concern. Thanks to the invention, it is now possible to envision the treatment of sarcopenia by activating the GDF5 pathway.

Accordingly, it is herein described a GDF5 pathway-activating substance, for use as a medicament. More particularly, the GDF5 pathway-activating substance is used in a method for the treatment or prevention of sarcopenia, or of disuse atrophy. In a particular embodiment, the substance is selected from compounds that increase the activity of GDF5 or compounds that increase the expression of GDF5. Representative substances for use according to the invention include, without limitation, a recombinant GDF5 protein, a recombinant CaVβ1-E protein or a vector encoding GDF5 or CaVβ1-E. Other substances include substances inducing the CaVβ1-E/GDF-5 axis such as NRSF inhibitors. Among these NRSF inhibitors, one can non-limitatively cite compound X5050 and valproic acid.

The substance may be administered to a subject aged 50 years or older, in particular 55 years or older, in particular 60 years or older, more particularly 65 years or older, even more particularly 70 years or older, such as 75 years or older or even 80 years or older. Furthermore, the substance may be administered via the oral, nasal, intravascular (e.g. intravenous or intra-arterial), intramuscular, intraperitoneal, transdermal or subcutaneous route. The substance may be administered on a regular basis, such as on a monthly basis, in particular on a weekly basis, or more particularly on a daily basis. In addition, the substance may be administered once a day or several times a day.

The treatment of sarcopenia may result in an increase of muscle mass and/or function, an increase in physical performance or mobility, and/or an increase in muscle strength.

Other benefit of the treatment disclosed herein will be apparent to those skilled in the art.

In another aspect, the invention relates to a pharmaceutical composition comprising a GDF5 pathway-activating substance, such as recombinant GDF5, in particular recombinant human GDF5, and a pharmaceutically acceptable carrier.

A further aspect relates to a GDF5 pathway-activating substance, such as recombinant GDF5, in particular recombinant human GDF5, for use in therapy.

Another aspect of the invention relates to a method for the diagnosis of sarcopenia in a subject, comprising determining the level of GDF5 in a biological fluid of said subject.

Other objects and advantages of the invention will be readily apparent to those skilled in the art.

LEGENDS OF THE FIGURES

FIG. 1: Muscle denervation induces the expression of a new CaVβ1 isoform by alternative first exon splicing FIG. 1A: RT-qPCR of Cacnb1 mRNA from TA muscles innervated or denervated for 1,3,7,15 days respectively. Primers are designed in the exon2 and exon3 of the predicted coding region of mouse Cacnb1. Data are shown as mean±s.e.m. *P<0.05, ***P<0.001, independent-samples t test (two-tailed). (n=3 mice per group)

Figure 1A:
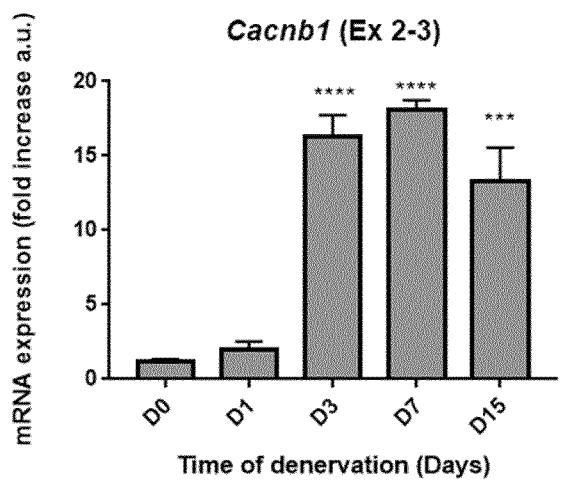
Figure 1B:
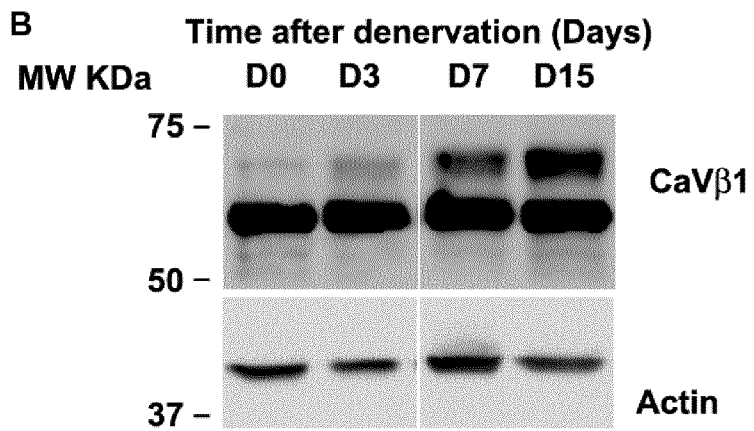

FIG. 1B: representative western blot analysis of CaVβ1 expression in TA muscles innervated (lines 1 and 3) or denervated for 3, 7 or 15 days (lanes 2,4,5 respectively). Actin is used as loading control.

Figure 1C:
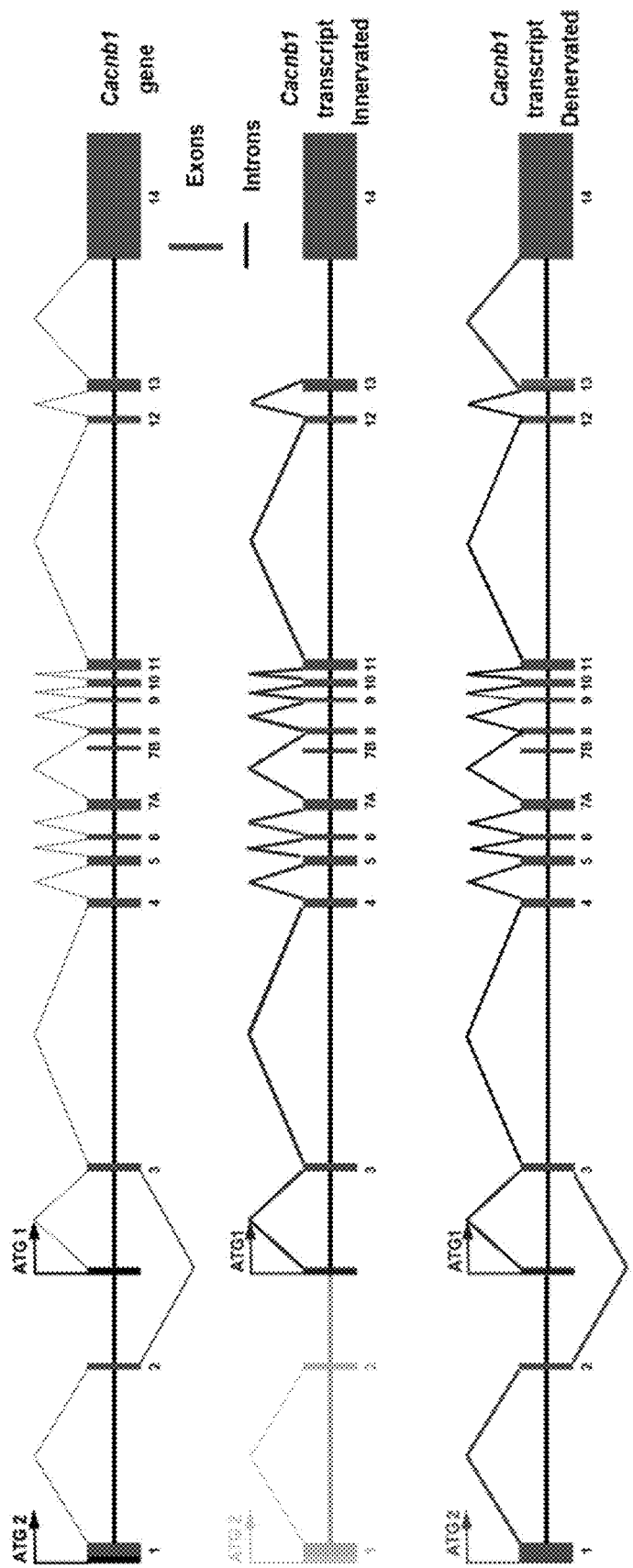

FIG. 1C: Schematic representation of Cacnb1 gene showing two promoter regions.

Figure 1D:
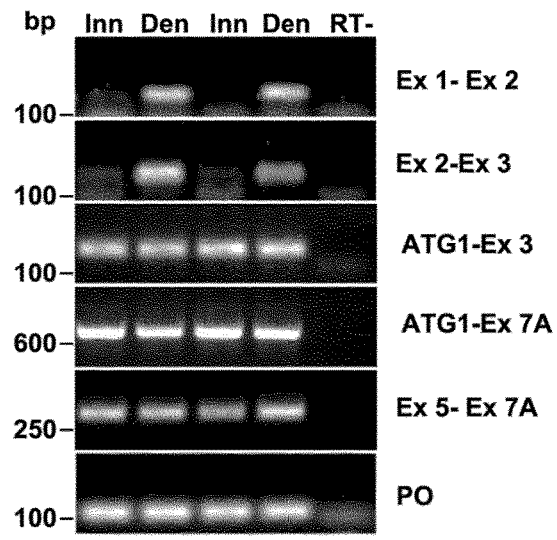

FIG. 1D: representatives RT-PCRs of different Cacnb1 regions in innervated (inn) or denervated (den) TA muscle validating RNAseq data.

Figure 1E:
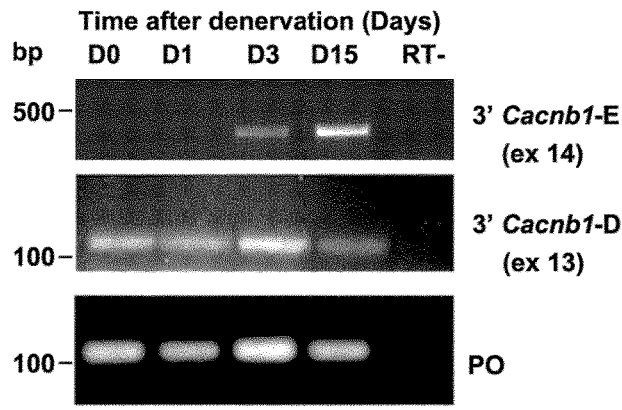

FIG. 1E: representative RT-PCR of Cacnb1-D specific region in exon 13 and Cacnb1-E specific region in exon 14 (primers are underlined in FIG. 1E).

FIG. 2: CaVβ1-E down-regulation exacerbates muscle atrophy in denervated muscles by inhibiting GDF5 signaling FIG. 2A: RT-qPCR of the expression of Cacnb1-E (ex14) in adult innervated (inn) and denervated (den) muscles treated with AAV-sh scrambled (Scra) or AAV-sh CaVβ1-E (sh CaVβ1-E). Data are shown as mean±s.e.m. *P<0.05, ***P<0.001, independent-samples t test (two-tailed) (n=3 mice per group)

Figure 2B:
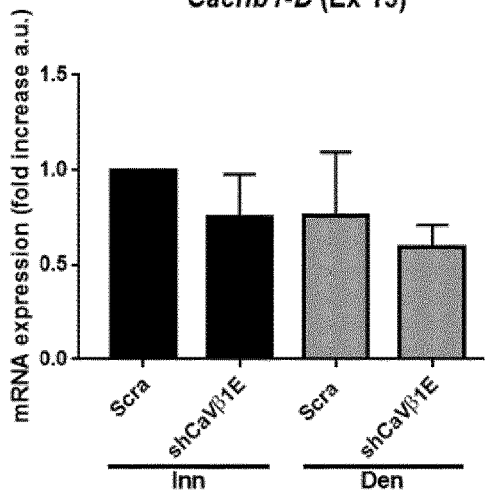

FIG. 2B: RT-qPCR of the expression of Cacnb1-D (ex13) in adult innervated (inn) and denervated (den) muscles treated with AAV-sh scrambled (Scra) or AAV-sh CaVβ1-E (sh CaVβ1-E). Data are shown as mean±s.e.m. *P<0.05, ***P<0.001, independent-samples t test (two-tailed) (n=3 mice per group)

Figure 2C:
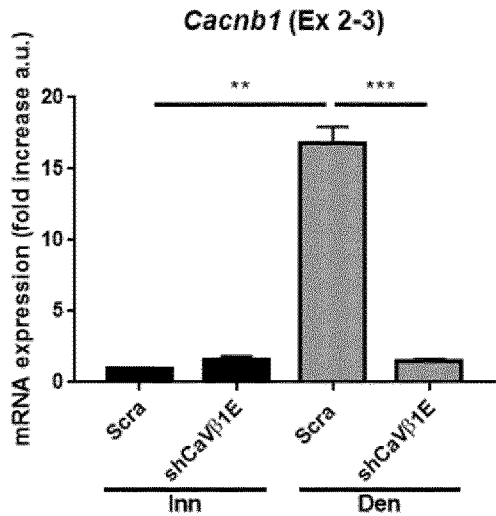

FIG. 2C: RT-qPCR of the expression of Cacnb1 (ex 2-3) in adult innervated (inn) and denervated (den) muscles treated with AAV-sh scrambled (Scra) or AAV-sh CaVβ1-E (sh CaVβ1-E). Data are shown as mean±s.e.m. *P<0.05, ***P<0.001, independent-samples t test (two-tailed) (n=3 mice per group)

Figure 2D:
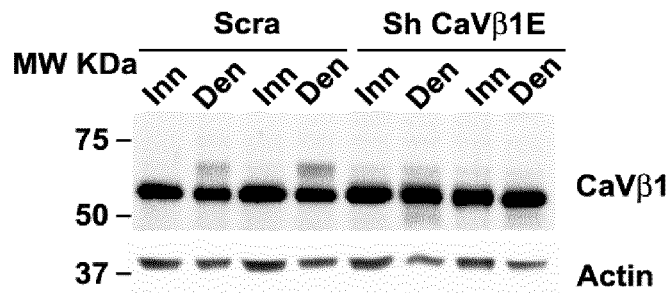

FIG. 2D: representative western blot analysis of CaVβ1 expression in adult innervated (inn) and denervated (den) muscles treated with AAV-sh scrambled (Scra) or AAV-sh CaVβ1-E (sh CaVβ1-E) using an antibody raised against a central peptide of CaVβ1 and recognizing CaVβ1-D (lower band) and CaVβ1-E (upper band).

Figure 2E:
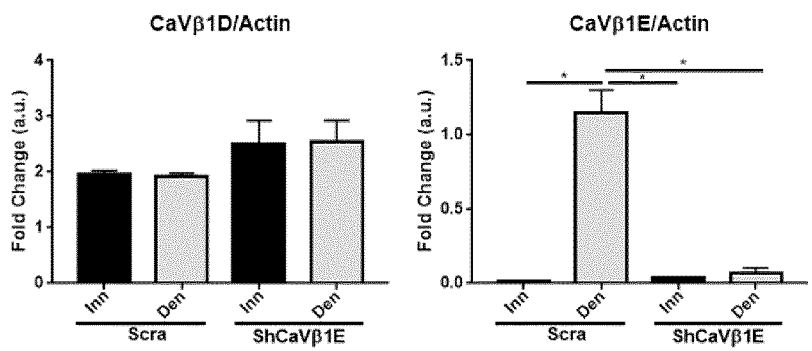

FIG. 2E: Quantification of the expression of CaVβ1-D and CaVβ1-E normalized on actin in adult innervated (inn) and denervated (den) muscles treated with AAV-sh scrambled (Scra) AAV-sh CaVβ1-E (sh CaVβ1-E). Data are shown as mean±s.e.m. *P<0.05, ***P<0.001, independent-samples t test (two-tailed) (n=3 mice per group)

Figure 2F:
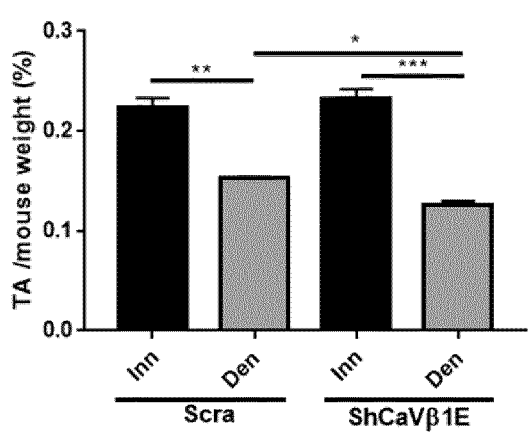

FIG. 2F: percentage of TA/mouse weight ratio of adult innervated (Inn) and denervated (den) for 15 days TAs treated with AAV-sh scrambled (Scra) or AAV-sh CaVβ1-E (sh CaVβ1-E). Data are shown as mean±s.e.m. ***P<0.001, paired-samples t test (two-tailed); n=6 muscles for each condition. FIG.

Figure 2G:
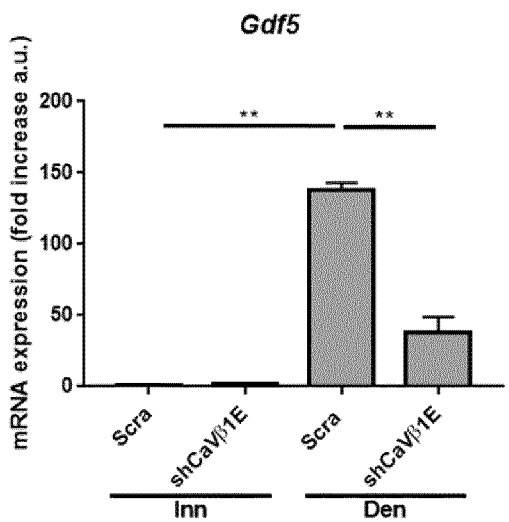

FIG. 2G: RT-qPCR of the expression of Gdf5 in adult innervated (inn) and denervated (den) muscles treated with AAV-sh scrambled (Scra) or AAV-sh CaVβ1-E (sh CaVβ1-E). Data are shown as mean±s.e.m. *P<0.05, ***P<0.001, independent-samples t test (two-tailed) (n=3 mice per group)

FIG. 2H: top: representative western blot analysis of phoshorylated SMAD 1/5/8 and actin in in adult innervated (inn) and denervated (den) muscles treated with AAV-sh scrambled (Scra) or AAV-sh CaVβ1-E (sh CaVβ1-E); bottom: Quantification of the expression of phoshorylated SMAD 1/5/8 normalized on actin in innervated (inn) and denervated (den) TA muscles treated with AAV-sh scrambled (Scra) or AAV-sh CaVβ1-E (sh CaVβ1-E). Data are shown as mean±s.e.m. *P<0.05, ***P5<0.001, independent-samples t test (two-tailed) (n=6 mice per group)

FIG. 2I: RT-qPCR of the expression of Id-1 in adult innervated (inn) and denervated (den) muscles treated with AAV-sh scrambled (Scra) or AAV-sh CaVβ1-E (sh CaVβ1-E). Data are shown as mean±s.e.m. *P<0.05, ***P<0.001, independent-samples t test (two-tailed) (n=3 mice per group)

FIG. 2J: The Gdf5 promoter region, containing heptameric CANNNTG E-box, was cloned upstream luciferase gene and transfected into C2C12 cells together with a pCDNA3 sh-Scrambled (scra), a pCDNA3-sh CaVβ1-E. Cotransfection with a vector for *Renilla* luciferase was used to normalize for transfection efficiency. C2C12 were kept in differentiation medium for 24 or 48 h then the ratio of firefly/*Renilla* luciferase activity was determined; data are shown as mean±s.d. *P<0.05, *P<0.001, independent-samples t test (two-tailed); n=3 independent experiments for each condition FIG. 3: Ageing muscles: a physiologic model of CaVβ1-E downregulation associated to sarcopenic muscle wasting FIG. 3A: percentage of TA/mouse weight ratio of adult innervated TAs from mice at different age. Data are shown as mean±s.e.m. *P<0.001, paired-samples t test (two-tailed); n=6 muscles for each condition. 20

Figure 3A:
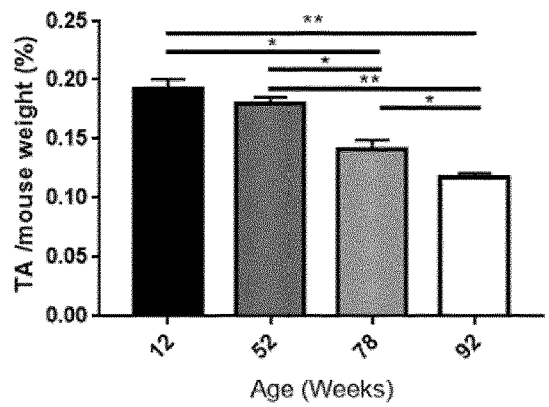
Figure 3B:
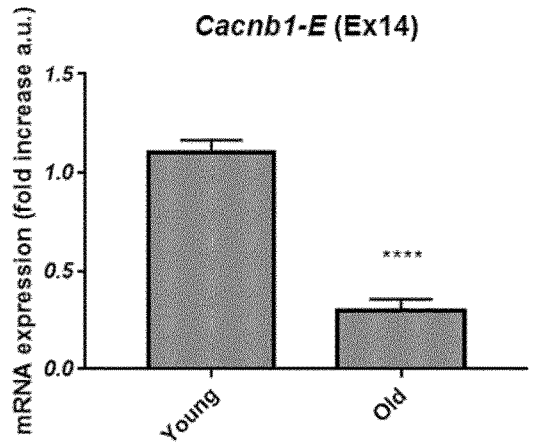
Figure 3C:
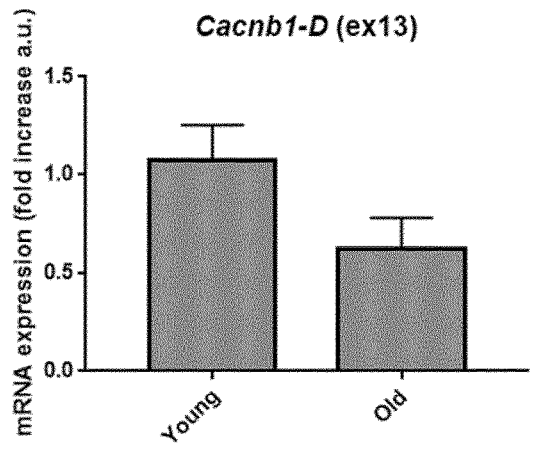

FIG. 3B-C: RT-qPCR of the expression of (B) Cacnb1-E (ex 14) and (C) Cacnb1-D (ex13). Data are shown as mean±s.e.m. *P<0.05, ***P<0.001, independent-samples t test (two-tailed) (n=6 mice per group)

Figure 3D:
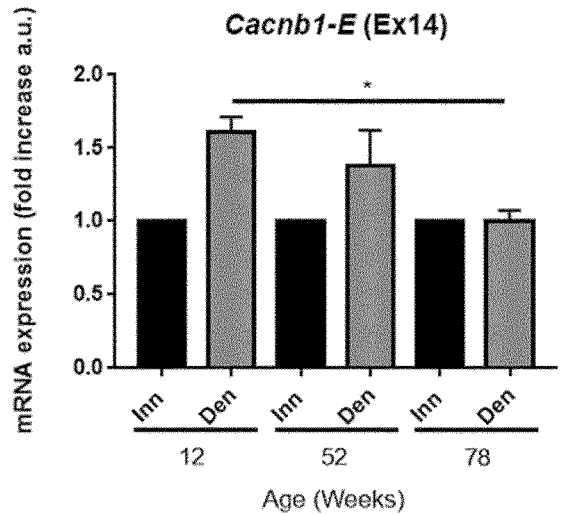
Figure 3E:
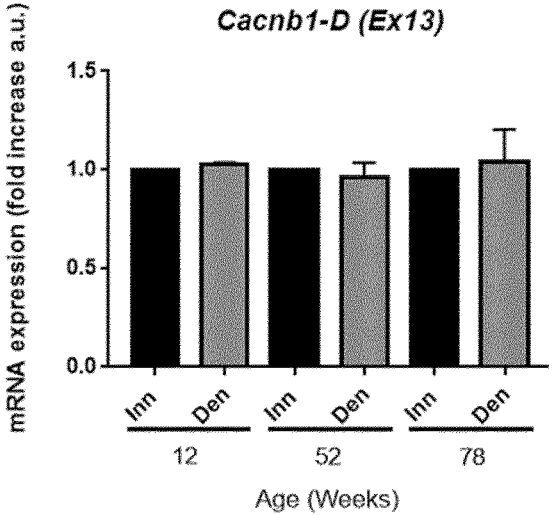
Figure 3F:
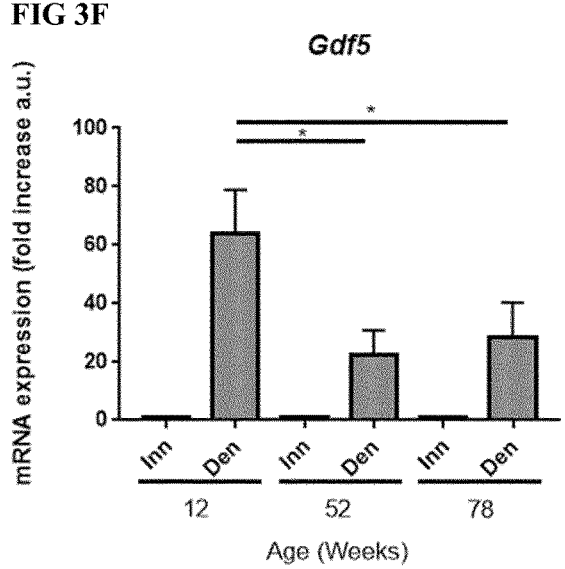

FIG. 3D-F: RT-qPCR of the expression of (D) Cacnb1-E (ex 14) (E) Cacnb1-D (ex13) and (F) Gdf5 in innervated and denervated TA muscles from 12, 52 and 78 weeks old mice. Data are shown as mean±s.e.m. *P<0.05, ***P<0.001, independent-samples t test (two-tailed) (n=6 mice per group)

Figure 3G:
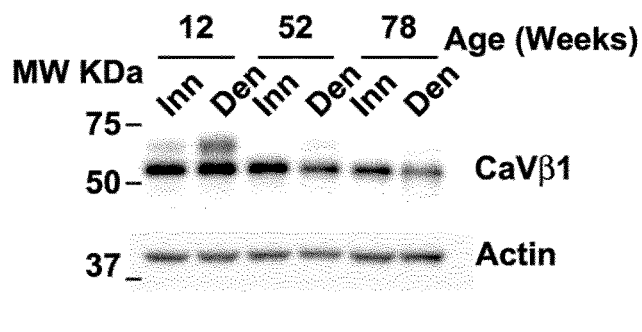

FIG. 3G: representative western blot analysis of CaVβ1 expression in innervated (inn) and denervated (den) TA muscles from 12, 52 and 78 weeks old mice using the antibody recognizing CaVβ1-D (lower band) and CaVβ1-E (upper band).

Figure 3H:
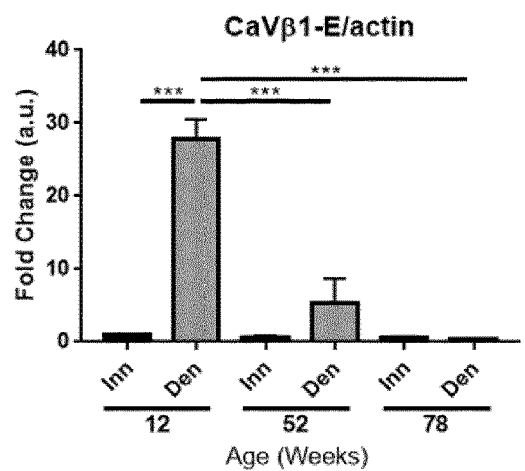
Figure 3I:
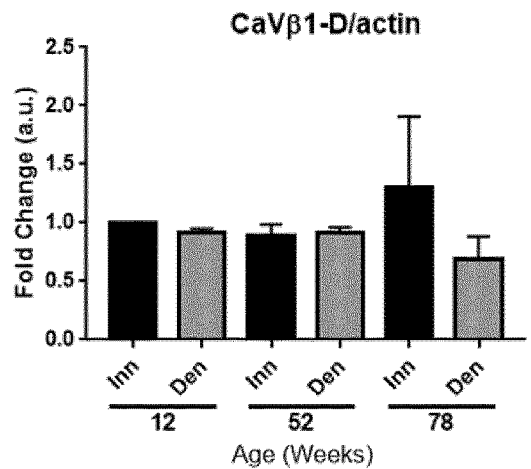

FIG. 3H-I: Quantification of the expression of CaVβ1-E (H) and CaVβ1-D (I) normalized on actin in innervated (inn) and denervated (den) TA muscles from 12, 52 and 78 weeks old mice. Data are shown as mean±s.e.m. *P<0.05, ***P<0.001, independent-samples t test (two-tailed) (n=6 mice per group)

Figure 3J:
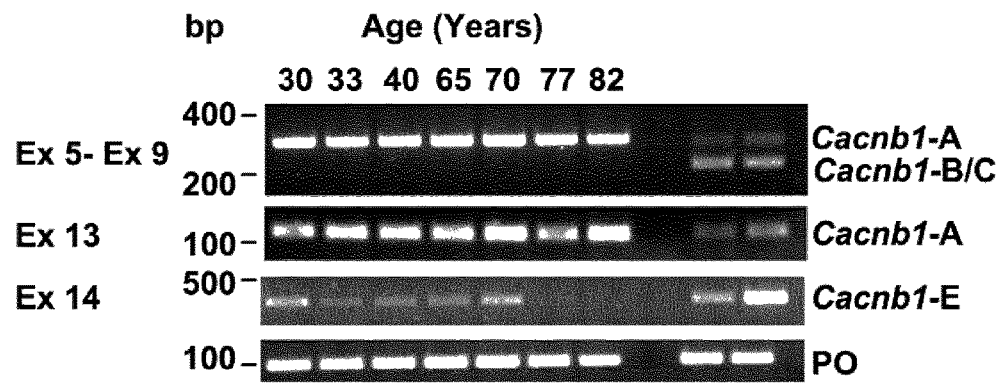

FIG. 3J: RT-qPCR of the expression of different isoforms of Cacnb1 in human tensor of fascia lata muscle biopsies from healthy subject at different ages. RNA from human spinal cord biopsy is used as positive control of Cacnb-B FIG. 3K: RT-qPCR of the expression of Gdf5 in human tensor of fascia lata muscle biopsies from healthy subject at different ages. Data are shown as mean±s.e.m. *P<0.05, ***P<0.001, independent-samples t test (two-tailed) (n=6 mice per group)

FIG. 4: CaVβ1-E overexpression recovers age-related sarcopenia by rescuing GDF5 signaling FIG. 4A: RT-qPCR of the expression of Cacnb1-E (ex 14) in innervated TA muscles from 92 weeks old mice treated with Scrambled (Scra) or AAV-CaVβ1-E (CaVβ1-E). Data are shown as mean±s.e.m. *P<0.05, ***P<0.001, independent-samples t test (two-tailed) (n=12 mice per group)

Figure 4A:
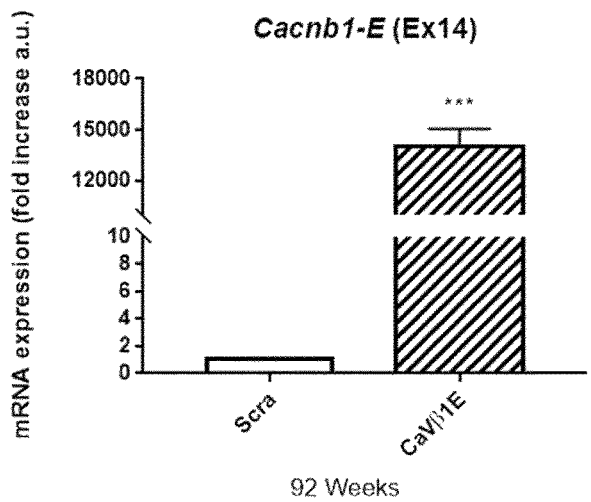
Figure 4B:
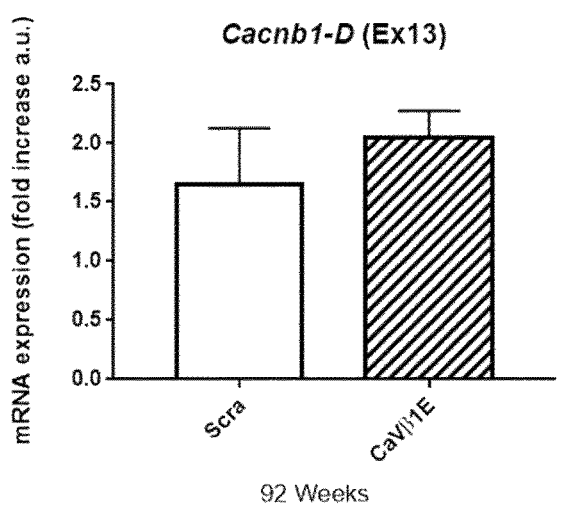

FIG. 4B: RT-qPCR of the expression of Cacnb1-D (ex13) in innervated TA muscles from 92 weeks old mice treated with Scrambled (Scra) or AAV-CaVβ1-E (CaVβ1-E). Data are shown as mean±s.e.m. *P<0.05, ***P<0.001, independent-samples t test (two-tailed) (n=12 mice per group)

Figure 4C:
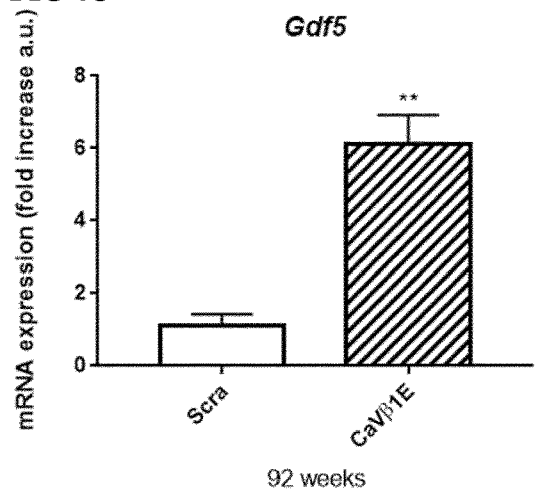

FIG. 4C: RT-qPCR of the expression of Gdf5 in innervated TA muscles from 92 weeks old mice treated with Scrambled (Scra) or AAV-CaVβ1-E (CaVβ1-E). Data are shown as mean±s.e.m. *P<0.05, ***P<0.001, independent-samples t test (two-tailed) (n=12 mice per group)

Figure 4D:
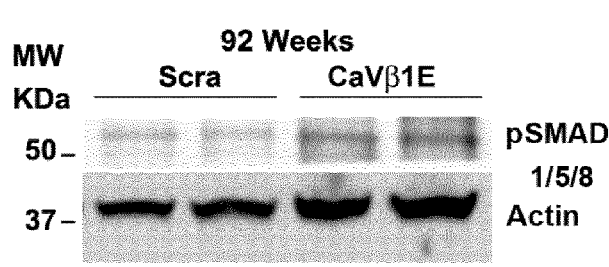

FIG. 4D: representative western blot analysis of phosphorylated SMAD 1/5/8 and actin in innervated TA muscles from 92 weeks old mice treated with Scrambled (Scra) or AAV-CaVβ1-E (CaVβ1-E).

Figure 4E:
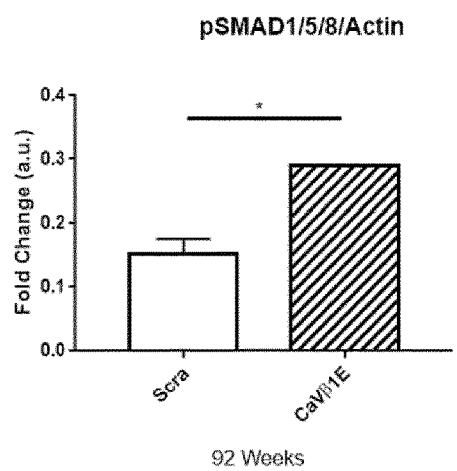

FIG. 4E: Quantification of phosphorylated SMAD 1/5/8 normalized on in innervated TA muscles from 92 weeks old mice treated with Scrambled (Scra) or AAV-CaVβ1-E (CaVβ1-E). Data are shown as mean±s.e.m. *P<0.05, ***P<0.001, independent-samples t test (two-tailed) (n=4 mice per group).

Figure 4F:
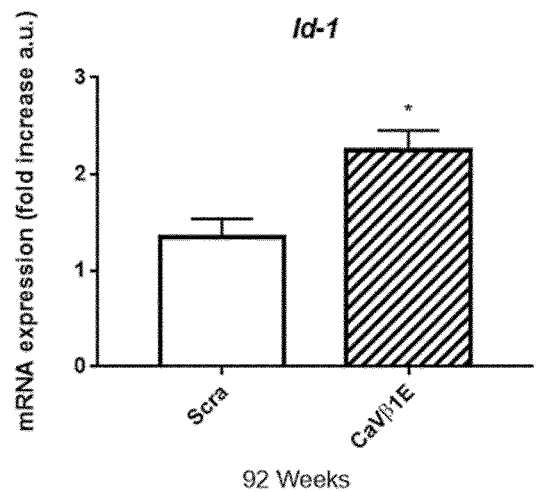

FIG. 4F: RT-qPCR of the expression of Id-1 in innervated TA muscles from 92 weeks old mice treated with Scrambled (Scra) or AAV-CaVβ1-E (CaVβ1-E). Data are shown as mean±s.e.m. *P<0.05, ***P<0.001, independent-samples t test (two-tailed) (n=12 mice per group)

Figure 4G:
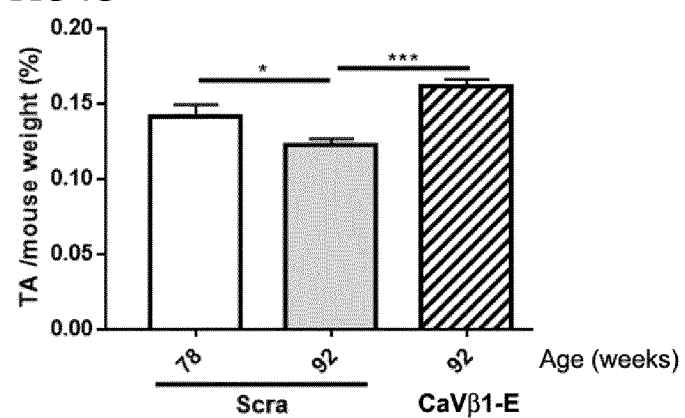

FIG. 4G: percentage of TA/mouse weight ratio of innervated TAs muscles from 92 weeks old mice treated with AAV-sh scrambled (Scra), or AAV-CaVβ1-E. Data are shown as mean±s.e.m. ***P<0.001, paired-samples t test (two-tailed); n=12 muscles for each condition.

Figure 4H:
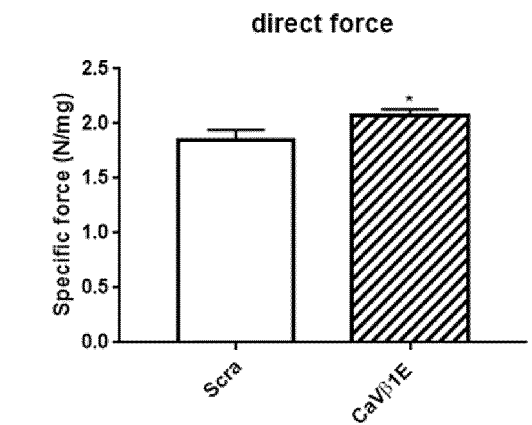

FIG. 4H: Specific force measured in TA of innervated TAs muscles from 92 weeks old mice treated with AAV-sh scrambled (Scra), or AAV-CaVβ1-E (CaVβ1-E). Data are shown as mean±s.e.m. ***P<0.001, paired-samples t test (two-tailed); n=12 muscles for each condition.

FIG. 5: Expression of CaVβ1-E in human muscle: a conserved compensatory mechanism?

Figure 5A:
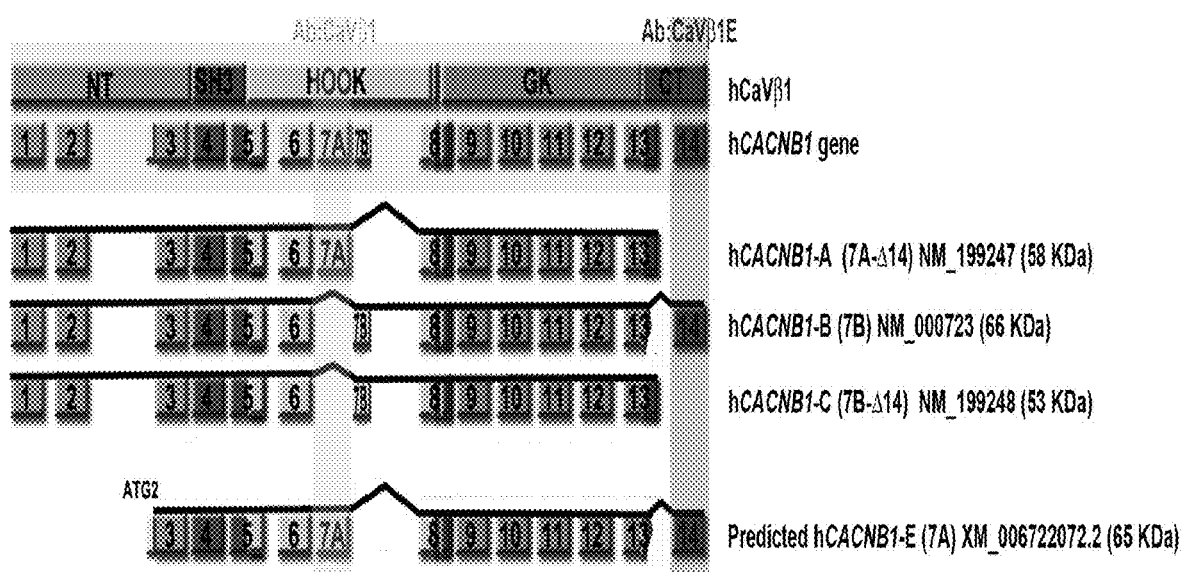

FIG. 5A: Schematic representation of human hCaVβ1 protein and hCACNB1 gene and transcript variants (adapted from[7])

Figure 5B:
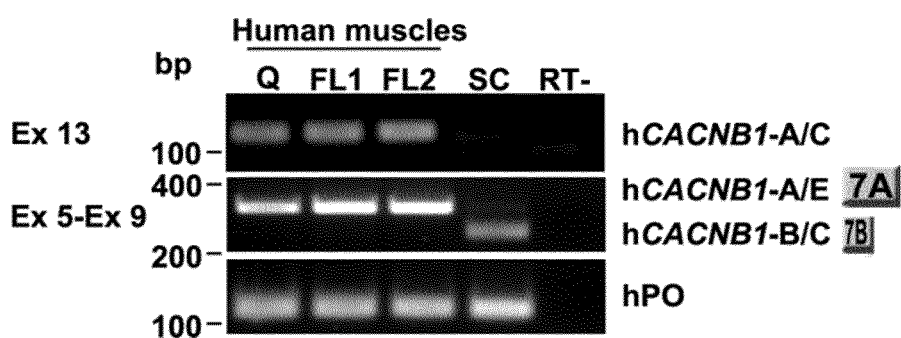

FIG. 5B: Representative RT-PCR results showing the expression of different isoforms of hCACNB1 in human quadriceps (Q) and fascia lata (FL1 and FL2) muscle biopsies from three healthy adults (Table 1). RNA from one human spinal cord biopsy (SC) was used as a positive control for hCACN1-B. Primers were designed for exon 13, exons 5-9 of the predicted coding region of hCACNB1. Human Ribosomal phosphoprotein (hPO) is used as a loading control.

Figure 5C:
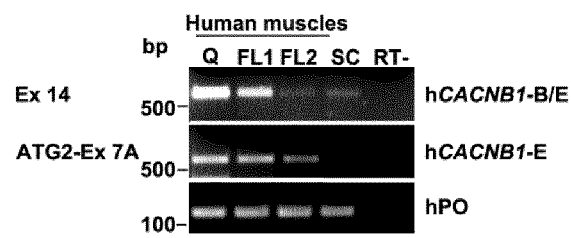

FIG. 5C: Representative RT-PCR results showing the expression of hCACNB1-E in human quadriceps (Q) and fascia lata (FL1 and FL2) muscle biopsies from three healthy adults (Table 1). RNA from one human spinal cord biopsy (SC) was used as a positive control for the expression of exon 14 of CACN1-B. Primers were designed for exon 14, ATG2-exon 7A of the predicted coding region of hCACNB1. hPO is used as a loading control.

Figure 5D:
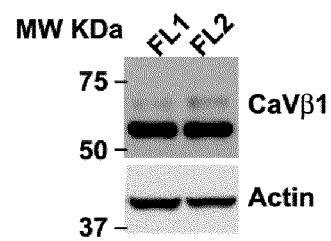

FIG. 5D: Representative western blot of CaVβ1 in human fascia lata (FL1 and FL2) muscle biopsies from the same adult healthy subjects as in B and C (Table 1). Actin was used as the loading control.

FIG. 6: Correlation between hCACNB-E/hGDF5 Expression and age related muscle wasting in humans FIG. 6A: Distribution of lean mass percentage and Power in human quadriceps biopsies from healthy young and old volunteers, detailed in Table 2.

Figure 6A:
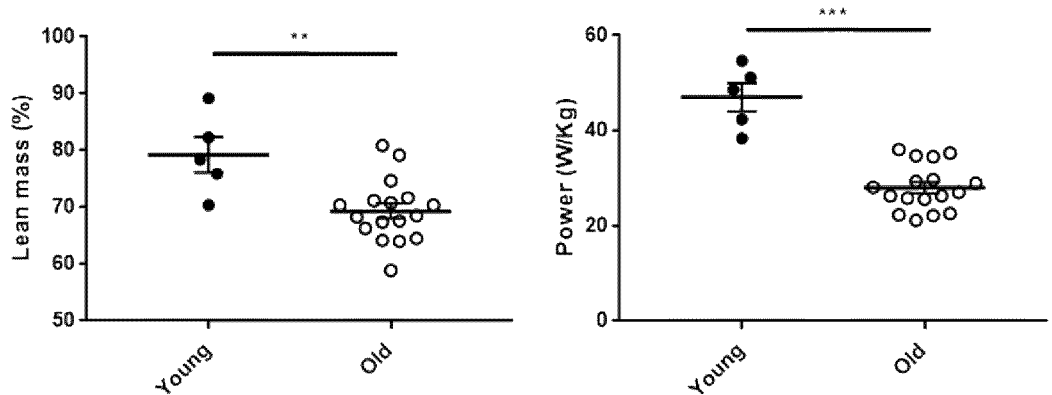
Figure 6B:
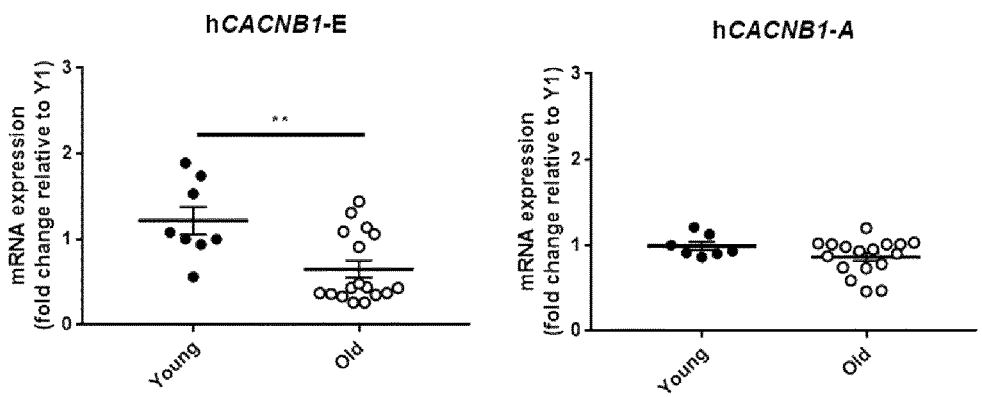

FIG. 6B: Distribution of hCACNB-E or hCACNB-A expression in human quadriceps biopsies from healthy young and old volunteers, detailed in Table 2.

Figure 6C:
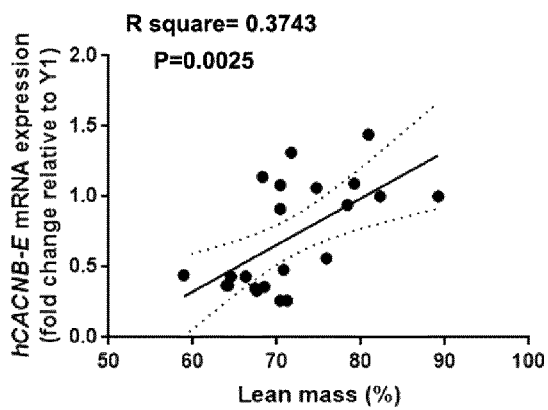

FIG. 6C: Linear regression between hCACNB-E expression and lean mass percentage in human quadriceps biopsies from healthy young and old volunteers, detailed in Table 1; R squared and P are shown.

Figure 6D:
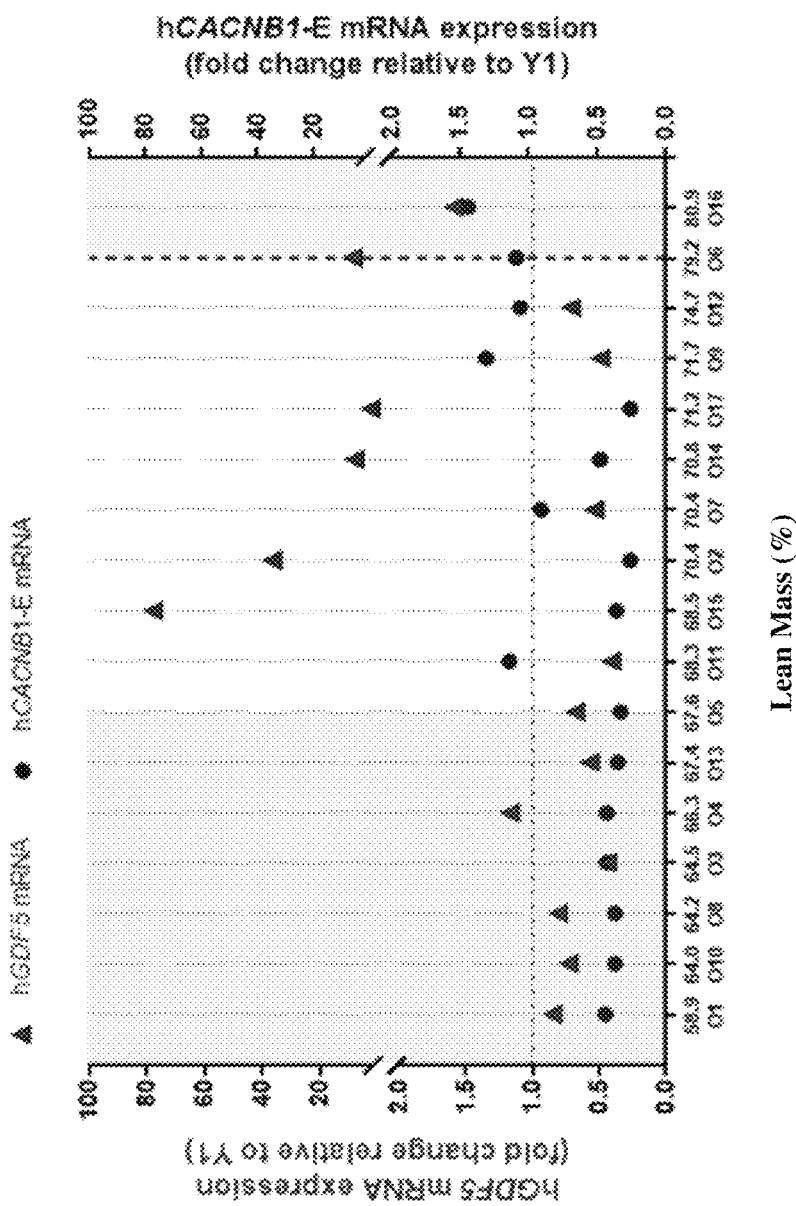

FIG. 6D: Distribution of hGDF5 (red triangles, left y axis) and hCACNB-E (blue circles, right y axis) expression in human quadriceps biopsies from healthy old volunteers, detailed in Table 2, having increasing lean mass percentage. Dot black line indicates the average of lean mass percentage of the young group.

FIG. 7: Rh-GDF supplementation in the pilot study

Figure 7A:
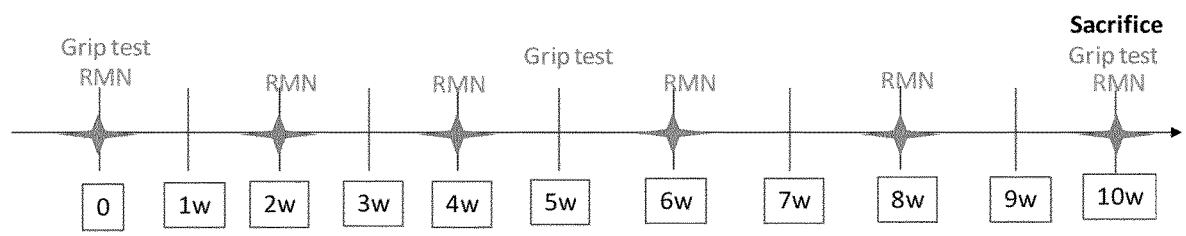

FIG. 7A: Schematic representation of mouse Rh-GDF5 administration protocol to 90 weeks old C57B1/6 mice. Rm-GDF5 has been injected intra-peritoneally twice per week at 0.2 mg/Kg. Vehicle: PBS/BSA 0.1%.

Figure 7B:
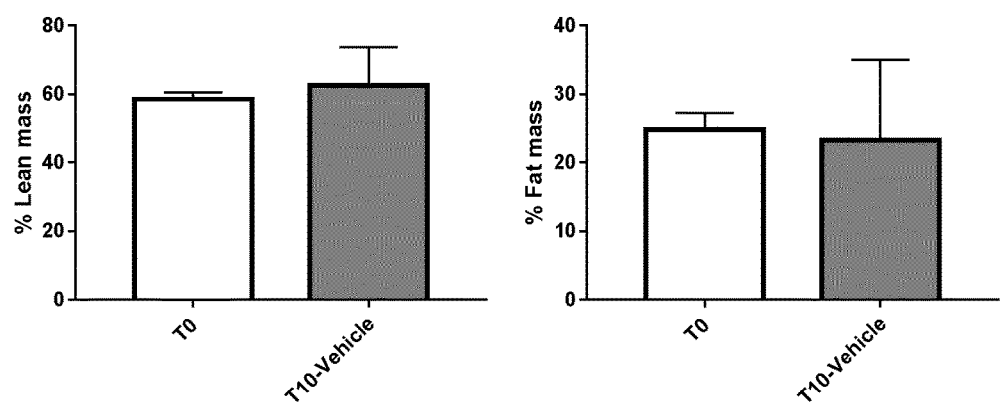

FIG. 7B: Lean and fat mass percentage of 90 weeks old C57B1/6 mice at the beginning (TO) and at the end (T10) of protocol after injection with vehicle alone FIG. 7C: Lean and fat mass percentage of 90 weeks old C57B1/6 mice at the beginning (TO) and at the end (T10) of protocol after injection with mouse Rm-GDF5 (Gdf5)

Figure 7C:
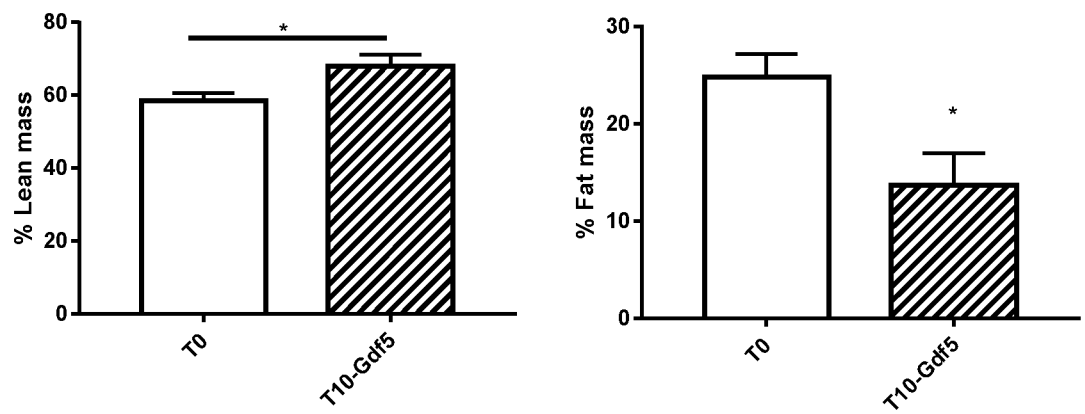
Figure 7D:
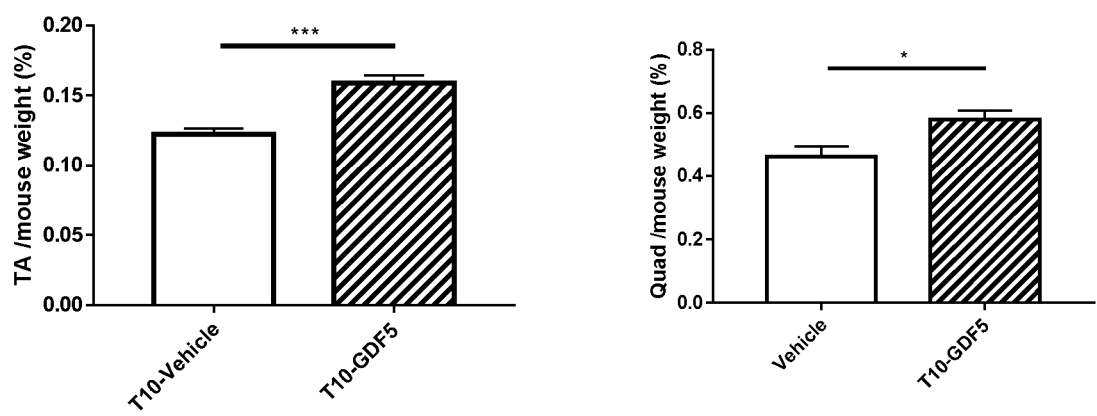

FIG. 7D: Muscle/body-weight ratio of quadriceps (Quad) and tibialis anterior (TA) from 100 weeks old C57B1/6 mice treated for 10 weeks with vehicle or Rm-GDF5 (Gdf5).

FIG. 8: expression of embryonic CaVβ1 isoform

Figure 8A:
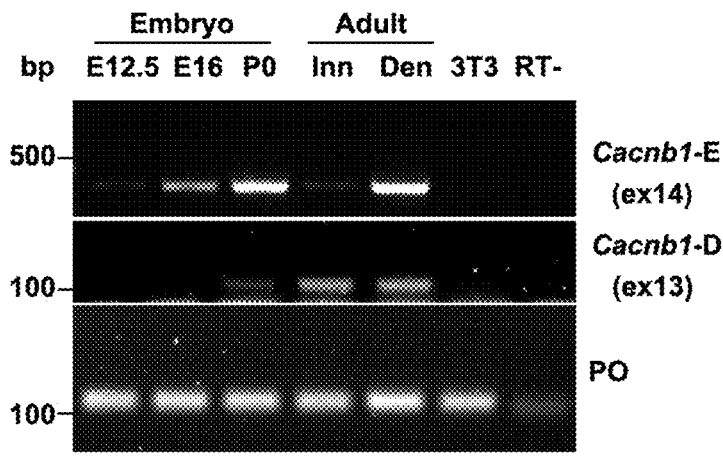
Figure 8B:
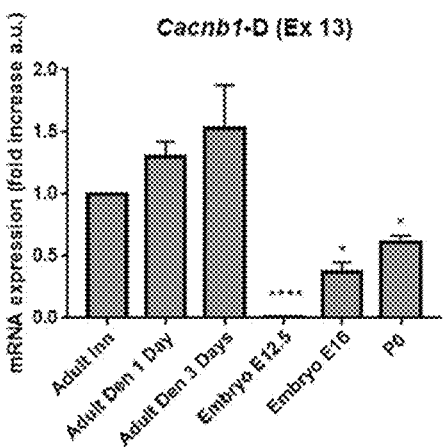

FIG. 8A: Representative RT-PCR of Cacnb1-D specific region in exon 13 and Cacnb1-E specific region in exon 14 as in FIG. 2E: Cacnb1-E is transcribed in embryonic muscle and in denervated muscle, Cacnb1-D is transcribed weakly at P0 and in adult muscle FIG. 8B: RT-qPCR of the expression of Cacnb1-D (ex13) in adult innervated (inn) and denervated (den) muscles and in embryonic/neonatal muscles. Data are shown as mean±s.e.m. *P<0.05, ***P<0.001, independent-samples t test (two-tailed) (n=3 mice per group)

Figure 8C:
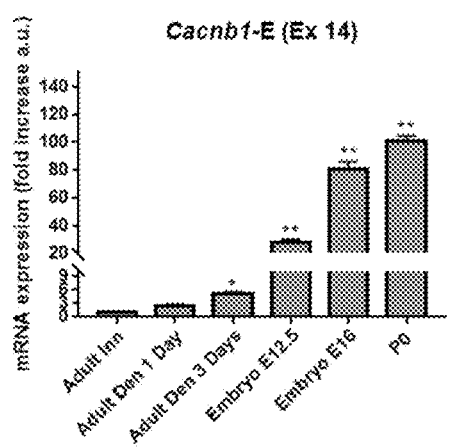

FIG. 8C: RT RT-qPCR of the expression of Cacnb1-E (ex14) in adult innervated and denervated muscles and in embryonic/neonatal muscles. Data are shown as mean±s.e.m. *P<0.05, ***P<0.001, independent-samples t test (two-tailed) (n=3 mice per group).

Figure 8D:
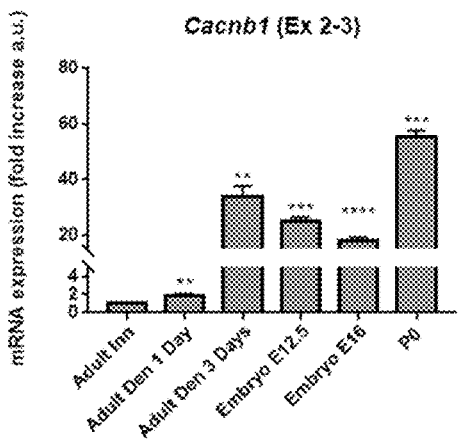

FIG. 8D: RT-qPCR of the expression of Cacnb1 (ex 2-3) showing the alternative first exon splicing in adult innervated (inn) and denervated (den) muscles and in embryonic/ neonatal muscles. Data are shown as mean±s.e.m. *P<0.05, ***P<0.001, independent-samples t test (two-tailed) (n=3 mice per group)

Figure 8E:
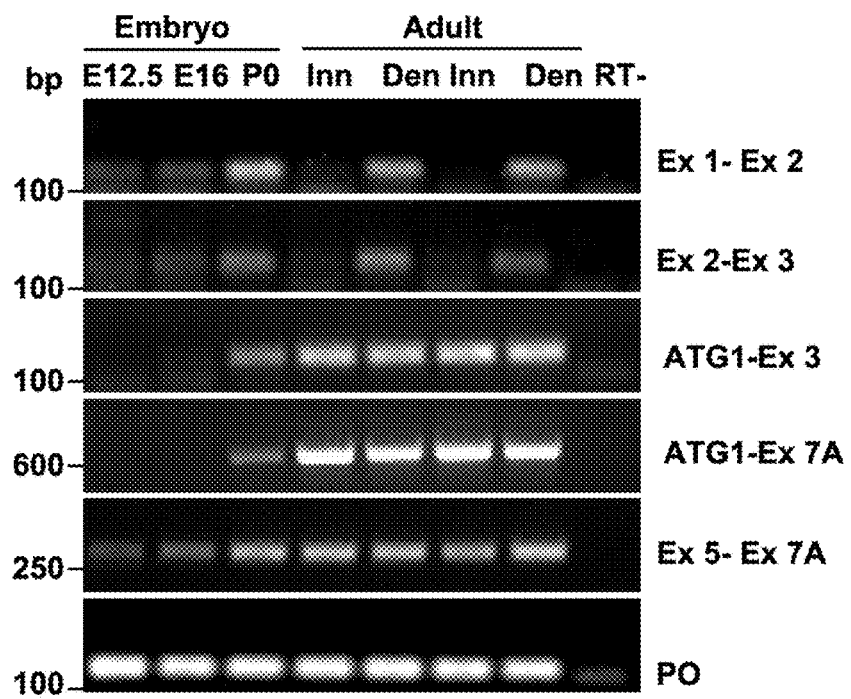

FIG. 8E: Representatives RT-PCRs of different Cacnb1 regions in embryonic/neonatal muscles and in adult innervated and denervated muscles.

Figure 8F:
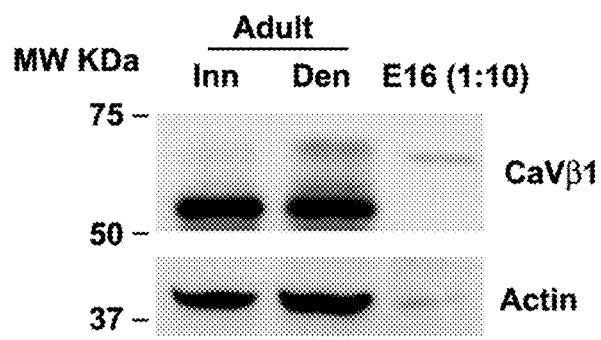

FIG. 8F: Representative western blot analysis of CaVβ1 expression in TA muscles innervated or denervated and in embryonic muscle (E16) using an antibody raised against a central peptide of CaVβ1 and recognizing CaVβ1-D (lower band) and CaVβ1-E (upper band).

Figure 8G:
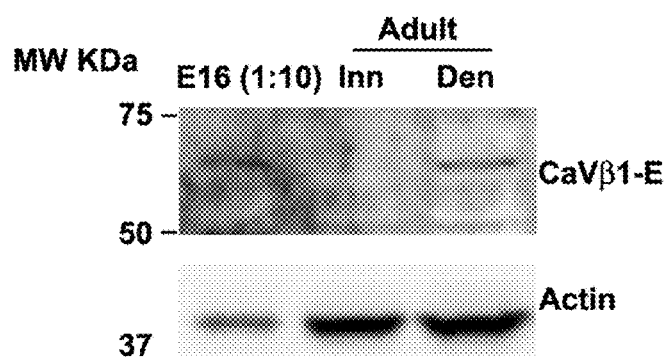

FIG. 8G: representative western blot analysis of CaVβ1 expression in embryonic E16 muscle and adult TA muscles innervated (inn) or denervated for 3 days using CaVβ1 antibody against human CaVβ1 recognizing only CaVβ1-E. Actin is used as loading control.

Figure 8H:
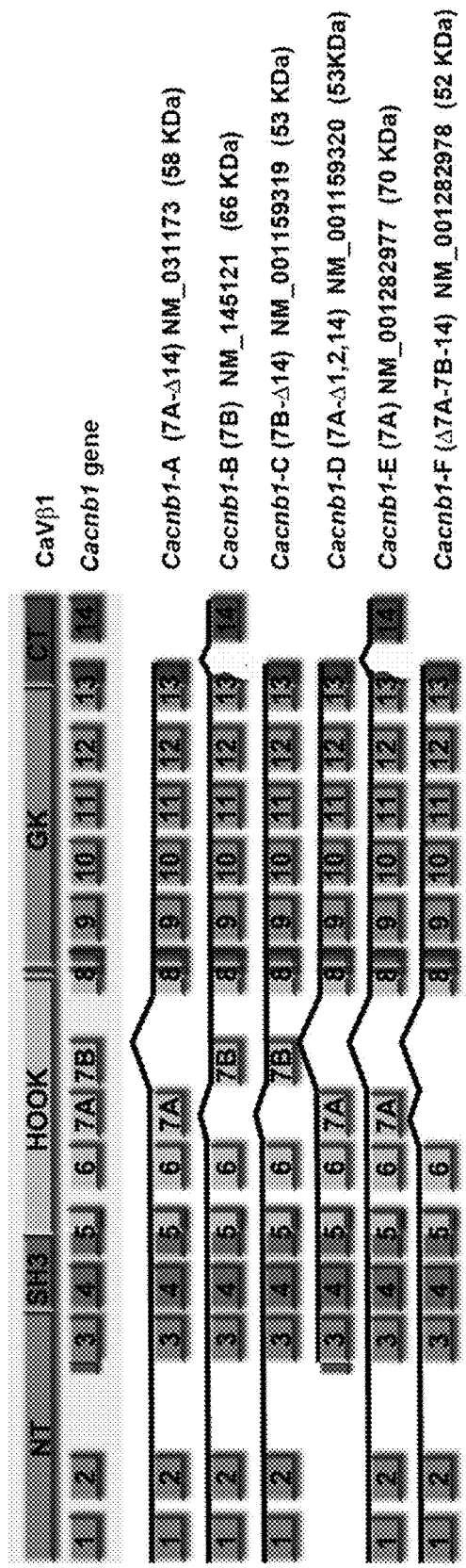
Figure 8I:
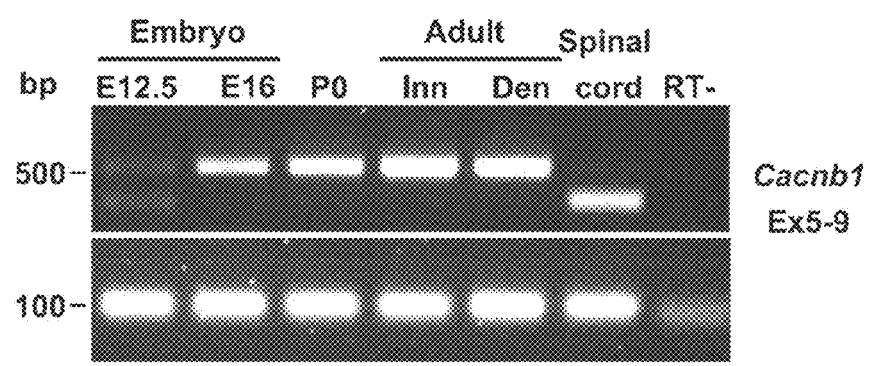

FIG. 8H: Schematic representation of CaVβ1 protein and Cacnb1 gene and transcript variants FIG. 8I: RT-PCR of the expression of Cacnb1 (ex5-9) in embryonic/neonatal muscles, in adult innervated (inn) and denervated (den) muscles and in spinal cord, showing the different size of amplified sequence in muscular or neuronal tissues.

Figure 8J:
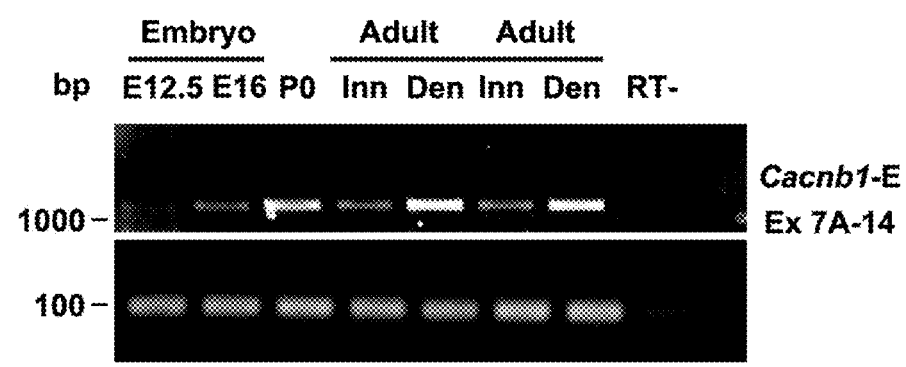

FIG. 8J: RT-PCR of the expression of Cacnb1 (ex7A-14), amplifying only Cacnb1-E variant, in embryonic/neonatal muscles and in adult innervated (inn) and denervated (den) muscles showing the different expression levels of amplified sequence.

FIG. 8 may be alternatively referred to as FIG. S1.

FIG. 9: Sequence alignment of Cacnb1 variants

FIG. 9A: alignment of Cacnb1-D (normal font) and Cacnb-E (italic font) RNA sequences primer sequences for specific qPCR are underlined FIG. 9B: alignment of CaVβ1-D (normal font) and CaVβ1-E (italic font) protein sequences FIG. 9C: alignment of Cacnb1-B (normal font) and Cacnb1-E (italic font) RNA sequences FIG. 9 may be aternatively referred to as FIG. S2.

FIG. 10: Expression of Cacnb1-E and Gdf5 in C2C12

Figure 10A:
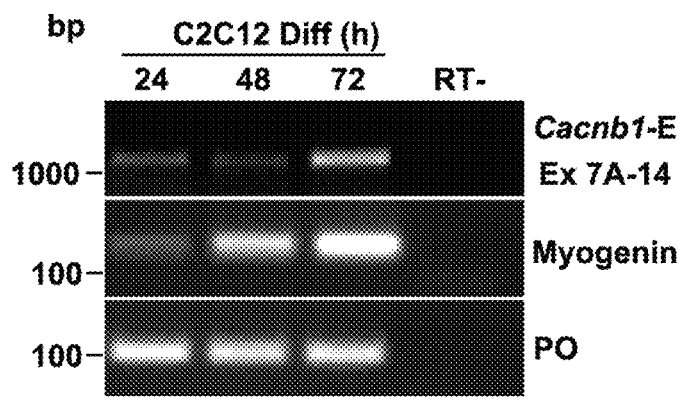

FIG. 10A: RT-PCR of the expression of Cacnb1 (ex7A-14), amplifying only Cacnb1-E variant, in Differentiating C2C12 myotubes. Myogenin is used as differentiation marker and PO as housekeeping gene.

Figure 10B:
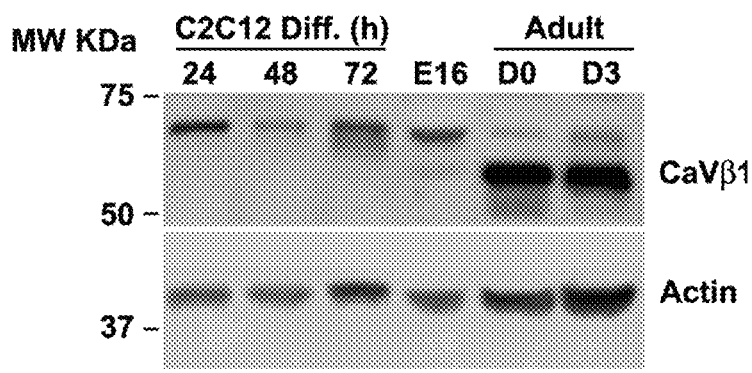

FIG. 10B: Representative western blot analysis of CaVβ1 expression differentiating C2C12 myotubes in embryonic muscle (E16) and in adult TA muscles innervated (DO) or denervated for 3 days (D3) using an antibody raised against a central peptide of CaVβ1 and recognizing CaVβ1-D (lower band) and CaVβ1-E (upper band).

Figure 10C:
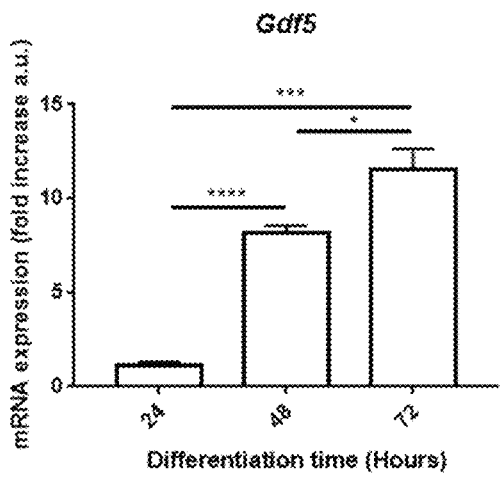

FIG. 10C: RT-qPCR of the expression of Gdf5 in 24, 48 and 72 hours differentiated C2C12.). Data are shown as mean±s.e.m. *P<0.05, ***P<0.001, independent-samples t test (two-tailed)

Figure 10D:
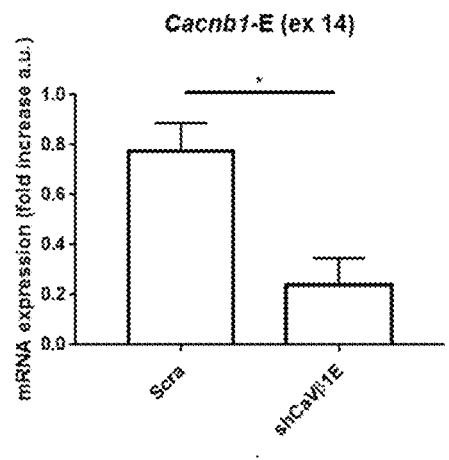

FIG. 10D: RT-qPCR of the expression of Cacnb1-E (Ex 14) in 48 h differentiated C2C12 transfected with pCDNA3-Scrambled (Scra) or pCDNA3-shEx2). Data are shown as mean±s.e.m. *P<0.05, ***P<0.001, independent-samples t test (two-tailed)

Figure 10E:
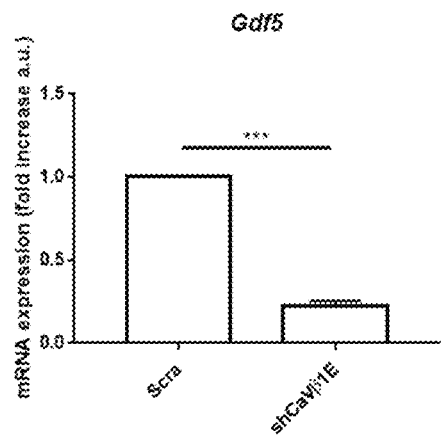

FIG. 10E: RT-qPCR of the expression of Gdf5 in 48 h differentiated C2C12 transfected with pCDNA3-Scrambled (Scra) or pCDNA3-shEx2). Data are shown as mean±s.e.m. *P<0.05, ***P<0.001, independent-samples t test (two-tailed)

FIG. 10 may be alternatively to as FIG. S3.

FIG. 11: CaVβ1 in sarcopenic muscle

Figure 11A:

FIG. 11A: Representative western blot analysis of CaVβ1 expression in innervated 95-100 weeks old (Old) TA muscles and in 12 weeks adult (Young) TA muscles innervated (Inn) or denervated (Den) using an antibody raised against a central peptide of CaVβ1 and recognizing CaVβ1-D (lower band) and CaVβ1-E (upperband).

Figure 11B:
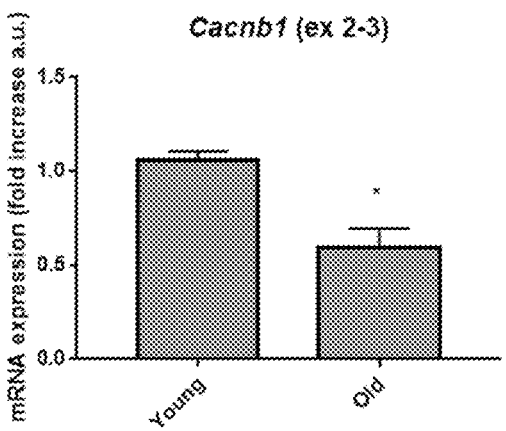

FIG. 11B: RT-qPCR of the expression of Cacnb1 (Ex 2-3) innervated 95-100 weeks old (Old) TA muscles and in 12 weeks adult (Young) TA muscles. Data are shown as mean±s.e.m. *P<0.05, ***P<0.001, independent-samples t test (two-tailed) (n=5 mice per group)

Figure 11C:
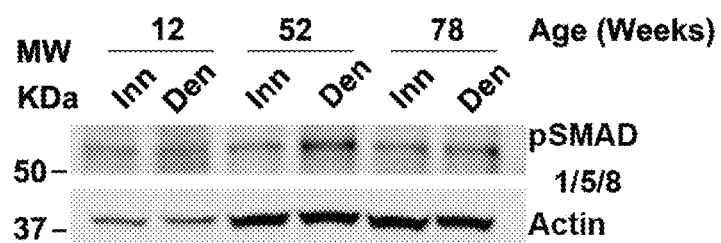
Figure 11D:
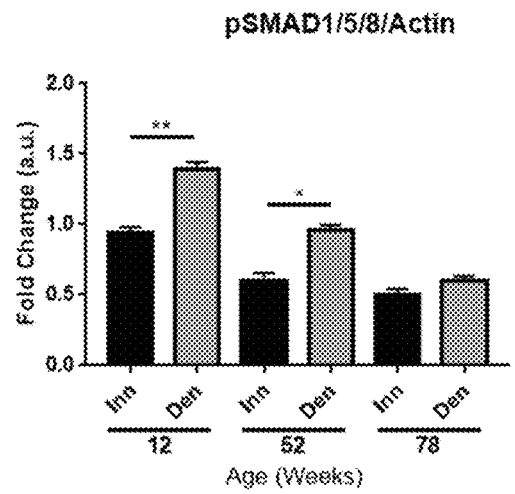

FIG. 11C: representative western blot analysis of phosphorylated SMAD 1/5/8 and actin in innervated (inn) and denervated (den) TA muscles from 12, 52 and 78 weeks old mice FIG. 11D: Quantification of the expression of phosphorylated SMAD 1/5/8 normalized on actin in innervated (inn) and denervated (den) TA muscles from 12, 52 and 78 weeks old mice. Data are shown as mean±s.e.m. *P<0.05, ***P<0.001, independent-samples t test (two-tailed) (n=3 mice per group)

FIG. 11 may be alternatively referred to as FIG. S4.

DETAILED DESCRIPTION OF THE INVENTION

By measuring immediate response of skeletal muscle to electrical activity alteration in a model of resection of sciatic nerve we observed the appearance of a protein corresponding to the translated Cacnb1 isoform E (or isoform 5, RefSeq: NM_001282977; NP_001269906). We have been able to show that this protein, CaVβ1-E, is the specific embryonic variant of CaVβ1, thereby demonstrating that this embryonic isoform is also expressed in adult skeletal muscle lacking innervation. In mice, we demonstrated that CaVβ1-E is needed to counterbalance muscle mass wasting through the activation of GDF5 signaling. The downregulation of CaVβ1-E impairs GDF5 expression and exacerbates muscle atrophy after denervation. Measuring the levels of CaVβ1-E and GDF5 in aged sarcopenic muscles we found that both proteins are significantly decreased during aging. We observed the same correlation regarding CaVβ1-E and GDF5 in human muscle biopsies from aged healthy subjects (more than 75 years old). More importantly, we have been able to show that CaVβ1-E overexpression with an AAV vector led to a striking preservation of skeletal mass of treated mice. In addition, the specific force of CaVβ1-E over-expressing muscle was significantly improved. Recovery of CaVβ1-E led to the rescue of GDF5 pathway and, then, counteracts sarcopenia abolishing further muscle mass loss. The GDF5 pathway had previously been shown to play a role in the compensatory response in a denervation model. However, the present application is the first report that the GDF5 pathway is involved in aging muscle. This represents a major addition to the state of the art and provides novel therapeutic approaches for the treatment of sarcopenia.

Accordingly, the invention relates to the activation of the GDF5 pathway for the treatment of sarcopenia.

Growth Differentiation Factor-5 (GDF5; also called BMP-14 and CDMP-1) is a member of the BMP family of TGF-beta superfamily proteins. Human GDF-5,-6, and-7 are a defined subgroup of the BMP family. GDF5 is synthesized as a homodimeric precursor protein consisting of a 354 amino acid N-terminal pro-region and a 120 amino acid C-terminal mature peptide. Mature human GDF-5 shares 99% amino acid sequence identity with both mature mouse and rat GDF5. GDF5 signaling is mediated by formation of a heterodimeric complex consisting of a type 1 (BMPR-IB)

and a type II (BMPR-II or Activin RII) serine/threonine kinase receptor which results in the phosphorylation and activation of cytosolic Smad proteins (Smad1, 5, and 8). Similar to other BMP family proteins, GDF5 signaling is antagonized by Noggin. GDF5 is involved in multiple developmental processes including limb generation, cartilage development, joint formation, bone morphogenesis, cell survival, and neuritogenesis. Exogenous GDF5 has been reported to promote chondrogenesis, osteogenesis, and angiogenesis in mesenchymal stem cells in vivo and in vitro. Inhibition of GDF5 expression or alteration of its signaling can facilitate the development of osteoarthritis.

The relevance of GDF5/SMAD4 pathway in skeletal muscle maintenance after an atrophic stimulus (nerve damage, fasting) has been shown clearly in 2013, by Sartori and colleagues, in a publication showing that muscles from SMAD4 knockout mice lacked the compensatory response to denervation. They showed that, in wild type mice, SMAD4 was activated by GDF5 (also known as BMP14), a paracrine factor strongly upregulated upon denervation. GDF5 expressed after nerve resection acts on BMP receptor 1 that stimulates Smad1/5/8 complex phosphorylation. On its turn this complex binds SMAD4 and mediates its translocation to the nucleus, where it modulates gene transcription and inhibits the activation of the ubiquitin ligase MUSA1 (Fbox32), thus limiting atrophy. This publication defined an essential pathway needed to counteract the excessive muscle wasting after nerve withdrawal. Furthermore, it also showed that GDF5 dominates GDF8 (better known as myostatin) signaling and that the muscle hypertrophy induced after myostatin inhibition is due to the GDF5 pathway prevalence. Few other studies confirmed the essential role of GDF5/SMAD4 in muscle mass homeostasis (Winbanks et al 2013, Macpherson et al 2015), however no studies have elucidated the upstream signaling triggering GDF5 induction. Recent papers showed that DNA methylation has a crucial role in GDF5 promoter activation (Reynard et al, 2014-Hum Genet (2014) 133:1059-1073) and that the NFKB-TAK1 pathway also participates to SMAD4 signaling (Sadejah et al., JCI Insight. 2018; 3 (3): e98441) in skeletal muscle, only arguing a possible involvement of GDF5.

The invention provides a GDF5 pathway-activating substance for use in a method for the treatment or prevention of sarcopenia.

In a particular embodiment, the GDF5 pathway-activating substance is a GDF5 peptide, in particular synthetic or recombinant GDF5, more particularly recombinant GDF5, such as recombinant human GDF5. Unprocessed wild-type human GDF-5 (Uniprot Accession No. P43026)) has the following sequence:

```
                                                     (SEQ ID NO: 1)
MRLPKLLTFLLWYLAWLDLEFICTVLGAPDLGQRPQGTRPGLAKAEAKER

PPLARNVFRPGGHSYGGGATNANARAKGGTGQTGGLTQPKKDEPKKLPPR

PGGPEPKPGHPPQTRQATARTVTPKGQLPGGKAPPKAGSVPSSFLLKKAR

EPGPPREPKEPFRPPPITPHEYMLSLYRTLSDADRKGGNSSVKLEAGLAN

TITSFIDKGQDDRGPVVRKQRYVFDISALEKDGLLGAELRILRKKPSDTA

KPAAPGGGRAAQLKLSSCPSGRQPASLLDVRSVPGLDGSGWEVFDIWKLF

RNFKNSAQLCLELEAWERGRAVDLRGLGFDRAARQVHEKALFLVFGRTKK

RDLFFNEIKARSGQDDKTVYEYLFSQRRKRRAPLATRQGKRPSKNLKARC
```

```
SRKALHVNFKDMGWDDWIIAPLEYEAFHCEGLCEFPLRSHLEPTNHAVIQ

TLMNSMDPESTPPTCCVPTRLSPISILFIDSANNVVYKQYEDMVVESCGC

R
```

SEQ ID NO:1 comprises a signal peptide at amino acid positions 1-27, a propeptide at amino acid positions 28-381 and a part, underlined in the sequence provided above, corresponding to the mature peptide at amino acid positions 382-501.

The mature peptide thus has a sequence as shown in SEQ ID NO:2 below:

```
                                                     (SEQ ID NO: 2)
APLATRQGKRPSKNLKARCSRKALHVNFKDMGWDDWIIAPLEYEAFHCEG

LCEFPLRSHLEPTNHAVIQTLMNSMDPESTPPTCCVPTRLSPISILFIDS

ANNVVYKQYEDMVVESCGCR.
```

Other recombinant human GDF5 are commercially available, such as the protein having the sequence shown in SEQ ID NO:3, which is available from Thermo Fischer (catalog No. RP-8663):

```
                                                     (SEQ ID NO: 3)
APSATRQGKRPSKNLKARCSRKALHVNFKDMGWDDWIIAPLEYEAFHCEG

LCEFPLRSHLEPTNHAVIQTLMNSMDPESTPPTCCVPTRLSPISILFIDS

ANNVVYKQYEDMVVESCGCR
```

In the context of the present invention, the peptide shown in SEQ ID NO:2 or SEQ ID NO:3 may be referred to as "a reference recombinant human GDF5".

According to another particular embodiment, the GDF5 pathway-activating substance is a functional derivative of a GDF5 peptide. A functional derivative according to the invention is a peptide having at least one, in particular all, activity of a reference peptide. In the context of the present invention, a functional variant of a GDF5 peptide may have its ability to induce alkaline phosphatase production by ATDC5 mouse chondrogenic cells (Nakamura, K. et al. (1999) Exp. Cell Res. 250:351.) with an ED50 from 0.01 to 10 µg/mL, such as from 0.2 to 4 µg/mL, for example from 0.2 to 1.2 µg/mL. In particular, a functional variant of a GDF5 peptide is a peptide that may treat or prevent sarcopenia in an animal model of the condition, as provided in the experimental part of this application, or in a human subject. GDF5 signaling may also be evaluated by measuring SMAD 1/5/8 phosphorylation, SMAD 4 nuclear translocation and Id-1 transcription as provided in the experimental part below. The activity of the functional variant may be of at least 30%, 35%, 40%, 45%, 50%, 55%, 60%, 65%, 70%, 75%, 80%, 85%, 90%, 91%, 92%, 93%, 94%, 95%, 96%, 97%, 98%, 99% or at least 100% of the activity of the reference GDF5 peptide. In a particular embodiment, the functional peptide as an activity greater than the activity of the reference GDF5 peptide, such as an activity of at least 105%, 110%, 115%, 120%, 125%, 130%, 135%, 140%, 145%, or of at least 150% of the activity of the reference GDF5 peptide. In addition, according to the invention, a functional variant of a GDF5 peptide has at least 80% sequence identity to a reference GDF5 amino acid sequence, in particular at least 81%, 82%, 83%, 84%, 85%, 86%, 87%, 88%, 89%, 90%, 91%, 92%, 93%, 94%, 95%, 96%, 97%, 98% or at least 99% sequence identity to a reference human recombinant GDF5. For example, a functional variant of a GDF5 peptide may comprise from 1 to 20 amino acid modifications (i.e. amino acid addition, deletion or substitution) as compared to a reference recombinant human GDF5, such as from 1 to 15 amino acid modifications, in particular from 1 to 10 amino acid modifications, more particularly from 1 to 6 amino acid modifications, even more particularly 1, 2, 3, 4, 5 or 6 amino acid modifications as compared to a reference recombinant human GDF5. Such a functional variant of recombinant human GDF5 may be a natural variant of GDF5. In a particular aspect, the functional variant is an optimized GDF5 peptide. Optimization may include different changes in the peptide, such as amino acid modifications as provided above, glycosylation, acetylation, phosphorylation and the like, or inclusion of at least one D-amino acid, such as at least 2, at least 3, at least 4 or at least 5 D amino acids. In another aspect, the GDF5 peptide comprises at least one non-natural amino acid, included by insertion, appendage, or substitution for another amino acid of the GDF5 sequence. In yet another aspect, recombinant GDF5 may be fused to another moiety, such as another peptide moiety. Such other moiety may, for example, stabilize the peptide.

In another particular embodiment, the substance is a functional variant of a GDF5 peptide corresponding to the GDF5-related proteins as described in WO201308649, having an increased affinity for the BMP receptor IB (BMPR-IB) and/or a reduced affinity for the BMP receptor IA (BMPR-IA). In a particular embodiment, the protein is derived from human wild-type GDF5. In a particular embodiment, the GDF5-related protein is obtained by replacing at least one amino acid residue relating to a BMPR-IB and/or BMPR-IA binding site in the amino acid sequence of the GDF-5 peptide, preferably by genetic engineering technology. In a further embodiment, at least one hydrophobic amino acid in the BMPR-IB and/or BMPR-IA binding site the GDF5 peptide is replaced with a hydrophilic or polar amino acid, such as a hydrophilic amino acid residue or polar amino acid residue selected from the group consisting of aspartic acid, glutamic acid, lysine, arginine, histidine, serine and threonine. In an alternative embodiment, at least one hydrophilic or polar amino acid in the BMPR-IB and/or BMPR-IA binding site of the GDF5 peptide is replaced with a hydrophobic amino acid, such as a hydrophobic amino acid selected from the group consisting of alanine, isoleucine, leucine, methionine, phenylalanine, proline, tryptophan, tyrosine, valine. In another alternative embodiment, the GDF5-related protein comprises a conservative substitution of at least one amino acid in the BMPR-IB and/or BMPR-IA binding site of the GDF peptide, in particular wherein a hydrophobic amino acid is replaced by a smaller or lager hydrophobic amino acid or wherein a hydrophilic or polar amino acid is replaced by a smaller or lager hydrophilic or polar amino acid. The regions of GDF-5 related proteins which are involved in binding to BMPR-IA and/or BMPR-IB are well known in the art or can easily be determined using methods that are within common knowledge. Referring to the unprocessed, full-length amino acid sequence of wild-type human GDF5 of SEQ ID NO: 1, a particular embodiment provides the replacement of one or more of the following amino acids by any different amino acid: R399;

any one of F409 to W417, in particular M412, G413, W414, and/or W417;
any one of E 434 to M 456, in particular F435, P436, L437, R438, S439, H440, P443, N445, V448, I449, L452, M453, S455, and/or M456;
S475;
I476;
F478;
any one of K488 to M493, in particular K488, Y490, and/or D492.

In particular embodiments, referring to the unprocessed, full-length amino acid sequence of SEQ ID NO: 1, one or more of the following amino acids are replaced by the specified amino acid
R399 is replaced by V, L, I, M, F, Y, W, E or D;
M412 is replaced by V, L, I, F, Y, W, H, K or R;
W414 is replaced by R, K, F, Y, H, E or D;
W417 is replaced by R, K, F, Y, H, E or D;
F435 is replaced by V, L, I, M, P, Y, W, H, K or R;
P436 is replaced by V, L, I, M, F, Y or W;
L437 is replaced by D or E;
R438 is replaced by K, D, H, N, M, E, Q, S, T, Y or W;
S439 is replaced by K, D, E, H, R, M, T, N, Q, Y or W;
H440 is replaced by V, I, M, F, Y, W, E or D;
P443 is replaced by V, L, I, M, F, Y, W, A or S;
N445 is replaced by D, Q, H, F, L, R, K, M, S, Y or W;
V448 is replaced by F, L, I, M, P, Y or W;
I449 is replaced by F, L, V, M, P, Y or W;
L452 is replaced by F, I, V, M, P, Y or W;
M456 is replaced by F, I, L, P, Y, W, S, T, N, Q, K or D;
S475 is replaced by M, T, N, Q, Y or W;
K488 is replaced by R, M, S, T, N, Q, Y or W;
Y490 is replaced by E, H, K, R, Q, F, T, M, S, N, Q or W;
D492 is replaced by G, E, M, S, T, N, Q, Y, W, H, K or R;
I476 is replaced by G, A, V, L, M, F, Y or W;
F478 is replaced by G, A, V, L, I, Y or W.

In another particular embodiment, referring to the unprocessed, full-length amino acid sequence of SEQ ID NO: 1, one or more of the following amino acids are replaced by the specified amino acid:
R399 is replaced by M or E;
W414 is replaced by R;
W417 is replaced by R or F;
R438 is replaced by K;
S439 is replaced by K or E;
I449 is replaced by V.

The corresponding positions in the mature peptides (such as in SEQ ID NO:2 or SEQ ID NO:3) will easily be derived from the above information regarding unprocessed, full-length wild-type human GDF-5.

In a particular embodiment of the invention, the substance is a GDF5 peptide whose amino acid consists of SEQ ID NO:2 or SEQ ID NO:3. In another particular embodiment, the substance is a GDF5 peptide whose amino sequence consists of SEQ ID NO:2 or SEQ ID NO:3, with the addition of a methionine residue at its N-terminal end. In another embodiment, the substance is a GDF5 peptide whose amino acid consists of SEQ ID NO:2 or SEQ ID NO:3, wherein the first alanine residue is replaced by a methionine residue.

In a further particular embodiment, the GDF5 pathway-activating substance is a substance inducing the CaVβ1-E/GDF5 axis. In this embodiment, a variant comprises the use of a substance that is a small chemical molecule. In a non-limiting variant of this embodiment, the GDF5 pathway-activating substance is an inhibitor of NRSF (Neuron-Restrictive Silencer Factor; also referred to as REST or RE1-Silencing Transcription Factor).

In a particular embodiment, the GDF5 pathway-activating substance is the NRSF inhibitor is valproic acid. In a further particular embodiment, the GDF5 pathway-activating substance is selected from the NRSF inhibitors disclosed in Charbord et al., Stem Cells. 2013 September; 31(9):1816-28, in particular the 2-(2-Hydroxy-phenyl)-1H-benzoimidazole-5-carboxylic acid allyloxy-amide (X5050), 2-Thiophen-2-yl-1H-benzoimidazole-5-carboxylic acid (2-ethylhexyl)-amide (X5917), 3-[1-(3-Bromo-phenyl)-3,5-dimethyl-1H-pyrazol-4-yl]-1-{4-[5-(morpholine-4-carbonyl)-pyridin-2-yl]-2-phenyl-piperazin-1-yl}-propan-1-one (X38210) or 3-[1-(2,5-Difluoro-phenyl)-3,5-dimethyl-1H-pyrazol-4-yl]-1-{4-[5-(morpholine-4-carbonyl)-pyridin-2-yl]-2-phenyl-piperazin-1-yl}-propan-1-one (X38207) molecule disclosed therein, more particularly the X5050 molecule disclosed therein.

In yet another embodiment, the GDF5 pathway-activating substance is a vector comprising a nucleic acid encoding GDF5, such as human GDF5 or a functional variant thereof. In a particular embodiment, the vector is a plasmid or viral vector, such as a retroviral vector, a lentiviral vector, an adenoviral vector or an adeno-associated virus (AAV) vector. Accordingly, the present invention also relates to a vector, such as a viral vector, for example a retroviral, lentiviral, adenoviral or AAV vector as described above, comprising GDF5 coding sequence. According to a particular embodiment, the viral vector is suitable for transducing muscle and/or neuronal cells. In a more particular embodiment such viral vector suitable for transducing muscle and/or neuronal cells is an AAV vector, such as an AAV vector having an AAV2/2, AAV2/6, AAV2/8, AAV2/9 or AAV2/10 capsid. In a further particular embodiment. The GDF5 coding sequence may be under the control of regulatory sequences such as promoters, enhancers, repressors and polyadenylation signals. In a particular embodiment, the vector comprises an expression cassette, comprising, in this order, a promoter, the GDF5 coding sequence and a polyadenylation signal. The promoter may be ubiquitous or tissue-selective. In a particular embodiment, the promoter is the natural promoter of the GDF5 gene, such as the promoter of the human GDF5 gene.

In another particular embodiment, the GDF5 pathway-activating substance is a substance that increases the activity or the expression of GDF5. In a more particular embodiment, the substance is recombinant CaVβ1-E, such as recombinant human CaVβ1-E.

In a further embodiment, the GDF5 pathway-activating substance is a vector comprising a nucleic acid encoding CaVβ1-E, such as human CaVβ1-E. In a particular embodiment, the vector is a plasmid or viral vector, such as a retroviral vector, a lentiviral vector, an adenoviral vector or an adeno-associated virus vector. Accordingly, the present invention also relates to a vector, such as a viral vector, for example a retroviral, lentiviral, adenoviral or AAV vector as described above, comprising CaVβ1-E coding sequence. The CaVβ1-E coding sequence may be under the control of regulatory sequences such as promoters, enhancers, repressors and polyadenylation signals. In a particular embodiment, the vector comprises an expression cassette, comprising, in this order, a promoter, the CaVβ1-E coding sequence and a polyadenylation signal. The promoter may be ubiquitous or tissue-selective. In a particular embodiment, the promoter is the natural promoter of the CaVβ1-E gene, such as the promoter of the human CaVβ1-E gene.

In a preferred embodiment, the GDF5 pathway-activating substance is recombinant GDF5, such as recombinant human GDF5 or a functional variant thereof, as disclosed above.

In a particular embodiment, the substance is to be administered to a subject aged 50 years or older. In particular embodiments, the subject is aged 55 years or older, in particular 60 years or older, more particularly 65 years or older, even more particularly 70 years or older, such as 75 years or older or even 80 years or older. In a particular embodiment, the subject displays progressive muscle mass loss. The subject may be a man or woman, in particular a post-menopausal woman. In a particular embodiment, the subject's motor neurons are intact or substantially intact, meaning that no denervation occurs in the subject's body.

The subject may be screened as suffering, or potentially suffering, from sarcopenia by any means known to those skilled in the art. These include evaluation by calculating skeletal muscle mass index by dual energy X-ray absorptiometry (DEXA) and/or by calculating the body mass index of the subject. Other means for identifying the subject who would benefit from the present invention include the measure of muscle functional parameters.

The invention may also benefit to a subject of the age mentioned above, when the subject undergoes partial or complete body immobilization, such as the immobilization of one limb, such as immobilization of an arm, a leg, a shoulder, a hip, in particular after a fracture of said limb, most particularly a fracture of hip. For example, the immobilization may be the consequence of a bone fracture, such as a fracture of an arm bone, a leg bone, or a fracture of the hip. The immobilization may also follow the replacement of a body part with an artificial part, such as with a prosthesis, a partial or total knee prosthesis, a partial or total hip prosthesis and a partial or total shoulder joint. In a particular embodiment, the substance is administered to an aged subject with a hip fracture. The invention thus also relates to a GDF5 pathway-activating substance, for use in a method for the treatment or prevention of age-related muscle mass loss in a subject having a partial or complete body immobilization. In particular, the invention relates to a GDF5 pathway-activating substance, for use in a method for the treatment or prevention of age-related muscle mass loss in a subject having a hip fracture.

The invention may also benefit to subjects suffering from progeria. Progeria, also known as Hutchinson-Gilford syndrome, is an extremely rare, progressive genetic disorder that causes children to age rapidly, starting in their first two years of life. Children with progeria generally appear normal at birth. During the first year, signs and symptoms, such as slow growth and hair loss, begin to appear. A loss of muscle mass is also observed in the children suffering from this disease. Accordingly, the present invention may be beneficial for subjects suffering from progeria, by at least alleviating one of the symptoms of the disease. As such, the invention thus relates to a GDF5 pathway-activating substance for use in a method for treating or preventing progeria-related muscle mass loss, increase or stabilizing muscle mass and/or function, or for increasing or stabilizing physical performance or mobility of a subject suffering from progeria.

According to another embodiment, the subject is identified by determining the level of GDF5 in a biological sample of said subject. In a particular embodiment, the biological sample is a biological fluid sample, such as blood, plasma, serum, urine or saliva. Accordingly, another aspect of the invention relates to a method for the diagnosis of sarcopenia in a subject, comprising determining the level of GDF5 in a biological sample, such as a biological fluid, of said subject. In a particular embodiment, the biological fluid is blood, plasma or serum. In a further particular embodiment, the level of GDF5 in the subject sample is compared to the level of GDF5 in a reference sample. The reference sample may be a sample from a young non-sarcopenic subject, processed similarly as the subject's sample. The level of GDF5 in a reference sample may also be a published predetermined standard, such as a standard derived from the measure of the average level of GDF5 in young non-sarcopenic subjects. For example, the reference sample may be a sample of a young subject (for example a subject 45 or younger, 40 or younger, 35 or younger, or 30 or younger. In this case, sarcopenia may be suspected if the level of GDF5 in the test sample is lower than the level of GDF5 in the reference sample. The reference sample may correspond to age- and/or gender-specific subjects. In a particular embodiment, the subject is a human male, and the level of GDF5 in the reference sample is the level of GDF5 in a reference sample of a young human male subject. In another particular embodiment, the subject is a human female, and the level of GDF5 in the reference sample is the level of GDF5 in a reference sample of a young human female subject. For example, when the subject is a human male, the reference sample may be the level of GDF5 in a reference sample from a human male aged from 30 to 40 years. In a particular embodiment, when the subject is a human male, the reference sample level is the average value of the level of GDF5 measured in non-sarcopenic human male subjects aged from 30 to 40 years. In another embodiment, when the subject is a human female, the reference sample may be the level of GDF5 in a reference sample from a human female aged from 40 to 50 years. In a particular embodiment, when the subject is a human female, the reference sample level is the average value of the level of GDF5 measured in non-sarcopenic human female subjects aged from 40 to 50 years. For the sake of clarity, these average values are derived from the levels measured in multiple young human male subjects aged from 30 to 40 years or in multiple young female subjects aged from 40 to 50 years, these values being averaged. In defining the reference levels, care should be taken on the condition of the subjects whose GDF5 levels are derived from. For example, for human female reference, care may be taken to exclude pregnant women.

It is also herein disclosed a pharmaceutical composition comprising GDF5 pathway-activating substance or a vector as provided above, in a pharmaceutically acceptable carrier. The pharmaceutical composition may further comprise other additives such as preservatives, buffers and/or solvents. Suitable carriers include, without limitation, water or saline solutions. A carrier protein such as serum albumin may also be included into the pharmaceutical composition. The finally formulated pharmaceutical composition prepared according to the present invention may be stored in sterile vials in form of a solution, suspension, gel, emulsion, solid or dehydrated or lyophilized powder. These formulations may be stored either in a ready-to-use form or in a form, e.g. in case of a lyophilized powder, which requires reconstitution prior to administration. The above and further suitable pharmaceutical formulations are known in the art and are described in, for example, Gus Remington's Pharmaceutical Sciences (18th Ed., Mack Publishing Co., Eastern, Pa., 1990, 1435-1712). Such formulations may influence the physical state, stability, rate of in vivo release and rate of in vivo clearance of the pharmaceutically effective component.

Other effective administration forms comprise parenteral slow-release, i.e. retarded, formulations, inhalant mists, or orally active formulations. For example, a slow-release formulation may comprise proteins bound to or incorporated into particulate preparations of polymeric compounds (such as polylactic acid, polyglycolic acid, etc.) or liposomes.

The pharmaceutical composition according to the present invention may also be formulated for parenteral administration, e.g., by infusion or injection, and may also include slow-release or sustained circulation formulations.

The substance may be administered via different routes, enterally or parenterally, such as via the oral, rectal, nasal, intravascular (e.g. intravenous or intra-arterial), intramuscular and intraperitoneal, transdermal and subcutaneous routes. The pharmaceutical composition will be adapted to the particular route of administration ultimately chosen.

In a particular embodiment, the substance is a recombinant protein such as a recombinant human GDF5, which is administered via the transdermal or intravascular route, more particularly via the intravenous route.

In certain aspects, the substance is comprised in a liposome, nanoparticle (e.g., lipid-containing nanoparticle), or in a lipid-based carrier. In other aspects, the substance is comprised within a skin patch to affect transdermal delivery. In another aspect, the substance is incorporated within an implantable device, such as a, implantable device, for example a device for subcutaneous implantation. In a particular embodiment, the implantable device includes a pump to deliver the substance slowly and/or continuously. Such an implantable device may comprise a refill system.

The substance is administered in a therapeutically effective amount, i.e. in an amount that results in the amelioration of at least one symptom of sarcopenia. A therapeutically effective amount can easily be determined by one skilled in the art, based on the substance to be administered, the subject to be treated, the stage of sarcopenia, the administration route and the like.

In a particular embodiment, the substance is administered once. For example, the substance may be a gene therapy vector, such as a vector encoding GDF5 or CaVβ1-E, which is administered once for persistent expression of the encoded transgene.

In another particular embodiment, the substance is administered on a regular basis, such as on a monthly basis, in particular on a weekly basis, or more particularly on a daily basis. In addition, the substance may be administered once a day or several times a day. In a further particular embodiment, the substance is administered to an aging subject for the rest of her/his life.

It is also further herein disclosed a pharmaceutical composition comprising a GDF5 pathway-activating substance, and a pharmaceutically acceptable carrier.

Another aspect also relates to a GDF5 pathway-activating substance, for use as a medicament.

The substance of the invention may be used in a method for treating or preventing sarcopenia, i.e. for treating or preventing age-related muscle mass loss in a subject. Non-limiting benefits of the invention may include an increase or stabilization of muscle mass and/or function, an increase or stabilization of physical performance or mobility, a decrease of the period of hospitalization, a gain of autonomy, the prevention of risks of death associated to sarcopenia, prevention of cancer mortality and/or the treatment or prevention of frailty in the subject.

In another aspect, the invention also relates to a GDF5 pathway-activating substance for use in a method for the treatment of muscle weakness in a subject suffering from myopathy or from a neuromuscular disorder. Weakness is one of the predominant clinical manifestations of myopathies and neuromuscular diseases, which strongly influences daily life, prognosis, and outcome of affected patients. One of the major therapeutic goals in subjects suffering from these diseases is to completely resolve muscle weakness. Various treatment options are available and include physical therapy, electrotherapy, diet, drugs, avoidance or withdrawal of muscle-toxic and weakness-inducing agents, detoxification, stem-cell-therapy, plasma-exchange, respiratory therapy, or surgery. Thanks to the present invention, muscle weakness may be treated or prevented by administration of a GDF5 pathway-activating substance to a subject in need thereof. The GDF5 pathway-activating substance may be administered alone, or in combination with a treatment for a myopathy or neuromuscular disease. Therefore, the invention also relates to a GDF5 pathway-activating substance for use in combination with a treatment for a myopathy or neuromuscular disease, such as in combination with another pharmaceutically active substance suitable for the treatment of said condition. Thanks to the invention, great benefits may be obtained in the context of such treatments for a myopathy or a neuromuscular disease, such as an increase or stabilization of muscle mass and/or function or an increase or stabilization of physical performance or mobility, thereby synergistically increasing the therapeutic efficiency of said treatment against a myopathy or neuromuscular disease. The invention also further relates to a GDF5 pathway-activating substance for use in increasing or stabilizing the muscle mass and/or function or increasing or stabilizing physical performance or mobility in a subject receiving a treatment for a myopathy or neuromuscular disease, such as a subject suffering from a myopathy such as a centronuclear myopathies and dystrophinopathies (e.g. Duchenne muscular dystrophy or Becker muscular dystrophy) or from a neuromuscular disease such as spinal muscular atrophy and amyotrophic lateral sclerosis. Preferably, the motor neurons of the subject are intact or substantially intact.

Another aspect of the invention relates to the treatment of a muscular disease mediated by an affection of motor neurons. Indeed, it is herein shown that the activation of the GDF5 pathway leads to the activation of a compensatory pathway in atrophic or sarcopenic muscles. Therefore, it is possible to compensate the lack of innervation or impaired innervation thanks to a GDF5 pathway-activating substance. Muscular diseases that could be treated thanks to the invention include, without limitation, myopathies such as centronuclear myopathies and dystrophinopathies (e.g. Duchenne muscular dystrophy or Becker muscular dystrophy), neuromuscular diseases such as spinal muscular atrophy and amyotrophic lateral sclerosis, and congenital and traumatic spinal cord injury.

Although the present invention is mainly focused on the treatment of age-related loss of muscle mass and/or function, other benefits of administering a GDF5 pathway-activating substance may be envisioned based on the observation that the CaVβ1-E/GDF-5 axis is involved in muscle mass and function homeostasis. As provided above, the substance may advantageously be administered to a young progeria subject. In addition, the subject receiving a treatment for a condition selected from a myopathy and a neuromuscular disease as provided above, be it a treatment with the GDF5 pathway-activating substance alone or in combination with another pharmaceutically active substance suitable for the treatment of said condition, may benefit to young subjects.

In another aspect, the GDF5 pathway-activating substance may also be administered to treat or prevent disuse atrophy in a subject in need thereof. In this aspect, the subject may be either young or old. For example, the disuse atrophy may be the result, or the result-to-be, of a partial or complete body immobilization, such as the immobilization of a limb, for example the immobilization of an arm, a leg, a shoulder, or a hip. For example, the immobilization may be the consequence of a bone fracture, such as a fracture of an arm bone, a leg bone, or a fracture of the hip. The immobilization may also follow the replacement of a body part with an artificial part, such as with a prosthesis, a partial or total knee prosthesis, a partial or total hip prosthesis and a partial or total shoulder joint replacement. The immobilization may also be the consequence of the subject being in a coma state. As such the invention may be beneficial in that it may treat or prevent muscle wasting observed during a coma episode. For example, the invention may be beneficial to a subject in a coma state to increase or stabilize muscle mass and/or function, to increase or stabilize physical performance or mobility, or to prevent or treat coma-associated frailty in the subject.

In another particular aspect, the invention relates to the use of a GDF5 pathway-activating substance for obtaining a non-therapeutic muscle mass and/or strength gain. For example, such muscle mass and/or strength gain may be desired in the context of sport practice or exercise. In this embodiment, the subject may be a young subject, for example a teenager or a young adult, such as a subject aged from 11 to 50 year, in particular from 15 to 40 year, such as from 18 to 30 year.

Of course, the present invention may also have applications and benefits in the veterinary field. In particular, any embodiment described above may be implemented in a non-human mammalian such as pets and livestock. In particular, a GDF5 pathway-activating substance may be administered to a pet to treat or prevent sarcopenia in said pet or livestock, in particular in a pet. In particular, GDF5 pathway-activating substance may be administered to a pet to increase or stabilize muscle mass and/or function, to increase or stabilize physical performance or mobility, to decrease the period of hospitalization in a veterinary hospital, to increase gain of autonomy, to prevent the risks of death associated to sarcopenia, to prevent cancer mortality and/or to treat or prevent frailty in said pet. According to a particular embodiment, a pet includes, without limitation, any non-human mammalian that may be kept for a person's company. These include cats, dogs, rabbits, rats, mice, hamsters, guinea pigs, ferrets, horses and pigs, without limitation. In a particular embodiment, the pet is a cat or a dog.

In another aspect, the invention relates to a non-therapeutic method for increasing muscle mass and/or function in a non-human animal, in particular in livestock, the method comprising administering to said animal a GDF5 pathway-activating substance in an amount effective to induce and increase in muscle mass and/or function. In the context of the present invention, livestock are domesticated animals raised in an agricultural setting to produce labor and/or commodities such as meat, eggs, milk, fur, leather, and wool. The term includes, without limitation, cattle, pigs, sheep, goats and horses.

Of course, in all non-human mammal aspects described above, the GDF5 pathway activating substance specifically used will be selected according to the specific non-human mammalian receiving said substance. For example, if the substance is a GDF5 peptide, the CaVβ1-E protein, or a vector encoding a GDF5 peptide or CaVβ1-E protein, it may be more suitable to use the peptide, protein or vector encoding the peptide or protein derived from said non-human mammal. As an illustration, a cat, dog, rabbit, rat, mouse, hamster, guinea pig, ferret, horse, pig, cattle, sheep, goat and horse GDF5 peptide, CaVβ1-E protein, or vector encoding the same may be preferably used in a cat, dog, rabbit, rat, mouse, hamster, guinea pig, ferret, horse, pig, cattle, sheep, goat and horse subject, respectively.

EXAMPLES

Example 1

Material and Methods
Plasmids and AAV production.

AAV-sh CaVβ1-Ex2 (sh CaVβ1-E) (Individual: TRC Mouse Cacnb1 shRNA Clone Id: TRCN000006951, Dharmacon) has been generated by cloning pALK0.1shCaVβ1-Ex2 in pSUPER under the control of the H1 promoter, by PCR insertion of BglII and HindIII sites. The H1 cassette was then introduced into an AAV1-based vector between the two ITRs using BamHI and SalI sites of pSMD2-sh AAV2 vector backbones Vassillopoulos et al, *J. Cell Biol.* 205, 377-393 (2014)). pSUPER retro puro Scr shRNA (SCRA) was a gift from John Gurdon (Addgene plasmid #30520) (Pasque et al, *EMBO J.* 30, 2373-2387 (2011)). BamHI site has been inserted by PCR and the H1-SCRA cassette has been cloned in pSMD2-sh through BamHI and SalI sites. AAV2/1 pseudotyped vectors have been prepared by the AAV production facility of the Center of Research in Myology, by transfection in 293 cells as described previously (Rivière et al, *Gene Ther.* 13, 1300-1308 (2006))

AAV-CaVβ1-E, has been generated by direct cloning of Cacnb-E ORF (NM_001282977) flanked by EcoRI and NheI sites (GeneArt string; ThermoFisher), in pSMD2 AAV2 vectors backbones, under CMV promoter. The final viral preparations were kept in PBS solution at −80° C. The particle titer (number of viral genomes) was determined by quantitative PCR. All AAV2/1 were used at final titer of $1×10^{12}$ vector genomes (vg)/TA.

sh Cacnb-Ex2, sh-SCRA, were also cloned in pCDNA3 for luciferase assay.

Gdf5 promoter region has been designed using the public domain http://epd.vital-it.ch, getting a sequence from −312 to of Gdf5 TSS. This sequence flanked by EcoRI and NheI sites has been synthesized (GeneArt string; ThermoFisher) and cloned upstream Firefly Luciferase gene in HSVTK-Luc3' modified plasmid for luciferase assay.

In Vivo Gene Transfer

Experiments were performed on adult 6-8 or in 78-80-wk-old C57/BL6 mice. Anesthesia was achieved using isoflurane, analgesia by buprenorphine (vetergesic). One intramuscular injection (40 µl/TA) was performed in both TA muscles. As control, 6-8-wk-old or 78-80-wk-old C57/BL6 mice were injected using the same procedure with SCRA AAV vector. Mice were sacrificed 3 months after the injection.

Denervation Experiments.

Ten weeks after injection of mice with AAV or control, the sciatic nerve was neuroectomized (ablation of a 5-mm segment of the sciatic nerve) under general anesthesia (isofluorane). Mice were sacrificed 2 weeks after denervation, and TA muscles were dissected, weighed and thereafter frozen isopentane precooled in liquid nitrogen and stored at −80° C. until histology or molecular analysis.

Gene Expression Analysis

Total RNA was prepared from 600 µm of tibialis anterior (TA) cryosections using TRizol (Life Technologies) following the manufacturer's instructions. Complementary DNA was generated with Invitrogen Superscript II Reverse transcriptase (Invitrogen) and analyzed by real-time qPCR performed on StepOne Plus Real-Time PCR System (Applied Biosystems) using Power SyberGreen PCR MasterMix (Applied Biosystems). All data were normalized to PO expression levels. Primers used are listed in the following table.

| Primer Name | Primer Sequence | SEQ ID NO: | Specie | Annotations | Use |
|---|---|---|---|---|---|
| PO fw | CTCCAAGCAGATGCAGCAGA | 4 | mouse | | qPCR |
| PO rv | ATAGCCTTGCGCATCATGGT | 5 | mouse | | qPCR |
| Id-1 fw | AGTGAGCAAGGTGGAGATCC | 6 | mouse | | qPCR |
| Id-1 rv | GATCGTCGGCTGGAACAC | 7 | mouse | | qPCR |
| Gdf5 fw | ATGCTGACAGAAAGGGAGGTAA | 8 | mouse | | qPCR |
| Gdf5 rv | GCACTGATGTCAAACACGTACC | 9 | mouse | | qPCR |
| Gdf5 fw | AGACCGTGTATGAGTACCTGTT | 10 | human | | qPCR |
| Gdf5 rv | GTCCTTGAAGTTGACATGCAGT | 11 | human | | qPCR |
| PO fw | GGCGACCTGGAAGTCCAACT | 12 | human | | qPCR/PCR |
| PO rv | CCATCAGCACCACAGCCTTC | 13 | human | | qPCR/PCR |
| Cacnb1 exons | | | | | |
| Ex5 fw | GACAGCCTTCGCCTGCTGCAG | 14 | human | Ex5-Ex9 iso A band 380 bp, iso B/C band 245 pb | PCR |
| Ex9 rv | ATGTCTGTAACCTCGTAGCCC | 15 | | | |

| Primer | Sequence | SEQ ID NO: | Specie | Annotations | Use |
|---|---|---|---|---|---|
| Ex13 fw | CAGGTACAGGTGCTCACCTC | 16 | human | Ex 13 iso A/C band 105 bp | PCR |
| Ex13 rv | CATGGCATGTTCCTGCTCCTG | 17 | human | | |
| Ex14 fw | CAGGGACCCTACCTTGCTTC | 18 | human | Ex 14 "isoE" band 465 bp | PCR |
| Ex14 rv | GCGAATGTAGACGCCTCGTC | 19 | human | | |
| Ex1 fw | ATGGTCCAGAAGAGCGGCATG | 20 | mouse | Ex1-2 expressing isoforms band 154 pb | PCR |
| Ex2 rv | TGGATGTTGTATCCGAGGACG | 21 | mouse | | |
| Ex2 fw | GGCAAGTACAGCAAGAGGAAAG | 22 | mouse | Ex2-3 expressing isoforms band pb 160 | PCR |
| Ex3 rv | TTAAGGCTTCCCGGTCCTCC | 23 | mouse | | |
| ATG1 (Intronic region 2-3) fw | CAGCCGGACCCTGGTAGTG | 24 | mouse | iso D band 146 pb | PCR |
| Ex3/4 rv | GTTTGGTCTTGGCTTTCTCG | 25 | mouse | | |
| ATG1 (Intronic region 2-3) fw | CAGCCGGACCCTGGTAGTG | 26 | mouse | ATG1 (Intronic region 2-3)-Ex7A only iso D band 622 pb | PCR |
| Ex7A rv | GAAGGGGATGCGCTTGCCGT | 27 | mouse | | |
| Ex 5 fw | GACAGCCTTCGTCTGCTGCAG | 28 | mouse | Ex5-7A all isoforms except iso B, C, F band 279 pb | PCR |
| Ex 7A rv | GAAGGGGATGCGCTTGCCGT | 29 | mouse | | |
| Ex 14 fw | CAGGGACCCTACCTTGCTTC | 30 | mouse | Iso B, E band 462 pb | PCR |
| Ex 14 rv | GCGGATGTAGACGCCTTGTC | 31 | mouse | | |
| Ex 5 fw | GACAGCCTTCGTCTGCTGCAG | 32 | mouse | Ex5-Ex8/9 iso B/C band 246 pb D, E band 381 pb | PCR |
| Ex 8/9 rv | CATGTCTGTCACCTCATAGCC | 33 | mouse | | |
| Ex 2 fw | GTTCAAAAGGTCAGACGGG | 34 | mouse | First exon splicing isoforms 101 pb | qPCR |
| Ex 3 rv | CAGAGTCTGATGGTCGGCTCGTG | 35 | mouse | | |
| Ex 13 (end) fw | CAGGTACAGGTGCTCACCT | 36 | mouse | Iso D band 108 pb band | qPCR |
| Ex 13 rv | CATGGCGTGCTCCTGAGGCTG | 37 | mouse | | |
| Ex 14 fw | CAGGGACCCTACCTTGCTTC | 38 | mouse only | Iso B, E band 175 pb | qPCR |
| Ex 14 rv | CATCAAAGGTGTCTTGGCGG | 39 | mouse only | | |

Antibodies for Immunoblotting

The following antibodies from Cell Signaling Technology were used: rabbit polyclonal antibody to phosphorylated Smad1/5 (Ser463/465)/Smad8 (Ser426/438); rabbit monoclonal antibody to phosphorylated Smad3 (Ser423/425), mouse polyclonal antibody to Smad4, mouse monoclonal antibody to Cav3. Rabbit polyclonal antibody for Cavß1 C-terminus (AP16144b) was purchased from AbGent, while the rabbit polyclonal antibody against the Cavß1 internal region (no longer available: sc-25689) and the mouse monoclonal to GDF5 was obtained by Santa Cruz Biotechnologies. Mouse monoclonal antibody to actin (A4700) was purchased from Sigma. Rat polyclonal AchR from Covance; Sigma; mouse anti-actinin EA53 from Sigma.

Immunoblotting

Cryosections from frozen TA muscles or liquid nitrogen frozen human muscle biopsies were homogenized with a dounce homogenizer in a lysis buffer containing 50 mM Tris-HCl, pH 7.4, 100 mM NaCl, 0.5% NP40 and Halt Protease and Phosphatase inhibitor cocktail (Pierce). Samples were then centrifuged for 5 min at 5000 g and denatured at room temperature for 30 min with Laemmli buffer. Protein concentration was determined by Bradford assay (Pierce). Proteins were separated by electrophoresis (Nu-PAGE 4-12% Bis-Tris gel; Life Technologies) and then transferred to nitrocellulose membranes (GE Healthcare) and labeled with primary antibodies and secondary antibodies coupled to horseradish peroxidase. Signals were visualized with SuperSignal West Pico Chemiluminescent substrate (Pierce). Images were acquired with camera LAS4000 (GE Healthcare). Western blot image analysis was performed with the public domain software Fiji ImageJ (analyze gel tool) (Schneider, C. A., Rasband, W. S. & Eliceiri, K. W. NIH Image to ImageJ: 25 years of image analysis. *Nature Methods* (2012). doi: 10.1038/nmeth.2089). Blots were stripped using Restore Western Blotting Stripping Buffer (Thermo) according to the manufacturer's instructions and reprobed if necessary.

Immunolabeling Experiments

For immunolabeling procedures, sections of tissues were performed at 10 μm on a cryostat (Leica), fixed on glass slides and stored at −80° C. Slides were rehydrated in phosphate-buffered saline (PBS), fixed with paraformaldehyde 4% for 10 min, permeabilized with 0.5% Triton X-100 (Sigma-Aldrich) and blocked in PBS/4% bovine serum albumin/0.1% Triton X-100 for 1 h. Sections were incubated in PBS/2% BSA/0.1% Triton X-100 with a primary antibodies overnight at 4° C., washed in PBS, incubated for 1 h with secondary antibodies, thoroughly washed in PBS, incubated with 4',6'-diamidino-2-phenylindole for nuclear staining for 5 min and mounted in Fluoromount (Southern Biotech). Images were acquired with a Leica SPE confocal microscope.

Cell Culture and Transfection and Luciferase Assay,

C2C12 muscle cell line were purchased from ATCC and were cultured in IMDM (Gibco-Life Technologies) supplemented with 15% FBS and 1% penicillin-streptomycin mixture at 37° C. and 5% CO2 until cells reached confluence. Differentiation were induced by medium replacement with IMDM supplemented with 2% HS and 1% penicillin-streptomycin mixture. Cells were transfected using Lipofectamine 2000 (Life Technologies) according to the manufacturer's instructions. Cell lines used in the experiments were authenticated and tested for *mycoplasma* contamination. Gdf5 promoter-luciferase was co-transfected in C2C12 cells with 25 μg of either pCDNA3-sh CaVβ1-E or pCDNA3-sh Scra alone using lipofectamine 2000 diluted in Optimem reduced medium. The plasmid CMV-*Renilla* luciferase (0.25 ng) was also transfected in each condition as normalizer.

5 hours post-transfection, Optimem reduced-medium was replaced with IMDM added with HS 2%. Cells were analyzed 24 and 48 hours after medium replacement.

Firefly and *Renilla* luciferase luminescences were quantified with Dual-Glo Luciferase Assay System (according to manufacturer's instructions) on Flexstation 3 Microplate reader. Firefly luciferase activity was normalized on *Renilla* luciferase activity.

Results

Innervation Regulates Embryonic CaVβ1-E Expression in Adult Muscle

A proper model to measure response of skeletal muscle to activity alteration is the resection of sciatic nerve. In this model we probed Cacnb1 mRNA with primers in the exons 2 and 3 we observed a time-dependent increase of this region amplification in denervated Tibialis Anterioris (TA) muscles (FIG. 1A). Western blot of CaVβ1 protein in the same condition, using an antibody recognizing CaVβ1 central peptide 18, revealed the appearance of a 70 KDa extra-band increasing over time after denervation. In contrast, the intensity of the band at 53 kDa, the molecular weight of the predicted muscle specific CaVβ1A (or isoform 1 of Cacnb1 NM_031173; NP_112450), remained unchanged (FIG. 1B).

We speculated that the 70 KDa band could be a longer CaVβ1 isoform never described in muscle to date. Cacnb1 gene (GSMG0007319) has 14 exons that can be spliced to give 6 transcript variants (NM_031173; NM_145121; NM_001159319; NM_001159320; NM_001282977; NM_001282978) (Fig S1H).

To identify potential splicing events of Cacnb1 occurring in denervated muscle, we performed a genome-wide transcriptomic analysis at the exon level on RNA extracted from innervated or denervated mouse TA muscles. We found 1022 differentially regulated alternative splicing events (from 706 Distinct Genes), the repartition of which indicated a predominance of first exon splicing events. Among them, Cacnb1 showed a first exon splicing indicating that transcript started in a putative non-coding sequence at the 5' of exon 3 in innervated muscles samples. In denervated muscle samples, other than this first Cacnb1 mRNA, another transcript starting at the exon 1 was found up-regulated (FIG. 1C and table S2), implying the transcription of two different splicing isoforms. RT-PCR confirmed that in innervated TA muscles Cacnb1 Open Reading Frame (ORF) was at the 5' of exon 3 (ATG1), while in denervated muscles Cacnb1 two transcripts were expressed: one starting at the level of exon 1 (ATG2) and another at ATG1 (FIG. 1D). Blasting the mRNA sequence of Cacnb1 starting immediately upstream exon 3 and to the NCBI data base, we concluded that the specific CaVβ1 isoform expressed in adult mouse skeletal muscle is CaVβ1D (NP_001152792.1) (Fig S1H, S2A, S2B). On the other hand, the size of the CaVβ1 extra-band appearing in protein extracts from denervated muscle was reliable with the translated Cacnb1-E (or isoform 5, NM_001282977; NP_001269906). To confirm this assumption, we designed specific primers matching in 3' of the two sequences at the level of exon 13 for Cacnb1-D and exon 14 for Cacnb1-E (Fig S2A, primer regions underlined) and we confirmed by RT-PCR that only Cacnb1-E transcript increased in adult denervated muscle (FIG. 1E), consistently with the protein expression data.

Muscle denervation induces several embryonic proteins, such as troponin T, myosin and acetylcholine receptor subunit. We wondered if it was the case for CaVβ1-E. Real-time PCR and qPCR revealed that Cacnb1-E was the specific variant of embryonic and neonatal muscles (E12.5, E16, P0) (Fig S1A, S1B, S1C) with ORF at exon 1 (Fig S1D, S1E), identical to Cacnb1-E expressed after denervation in adult muscle.

Cacnb1-B variant, shown as specific of the nerve terminals, shares an identical 3' end sequence with Cacnb1-E (Fig S2C). Amplification of the region between exon 5 and 9 showed a huge mRNA expression of Cacnb1-E (381 bp) in embryonic and neonatal muscles and almost undetectable expression of Cacnb1-B (246 bp) only in E12.5 muscles, (probably due to the presence of mixed precursor cells at this embryonic stage) (fig S1I). Furthermore, probing the region between exon 7A, excluded in Cacnb1-B and Cacnb1-C variants, and ex 14 we confirmed that Cacnb1-E is the only CaVβ1 isoform up-regulated after denervation (Fig S1J). As further confirmation, western blotting using an antibody specific to mouse CaVβ1E stained only denervated adult and embryonic muscle protein extracts (Fig S1G). Immunofluorescence of innervated and denervated muscle slides and isolated fibers with either CaVβ1 (central peptide) or CaVβ1E antibody showed that CaVβ1 staining intensity and triadic localization reflected more likely the mainly expressed CaVβ1D. Indeed, specific CaVβ1-E staining appeared increased in denervated fibers and slides, mostly distributed at the level of Z-lines and localized at the nuclei and in accordance with the expression of an NLS predicted by the free software cNLM mapper (http://nlsmapper.iab.keio.ac.jp/cgibin/NLS_Mapper_form.cgi).

Overall, these data demonstrate that skeletal muscle expresses different innervation-dependent CaVβ1 isoforms. An alternative first exon splicing is at the origin of the differential expression of adult and embryonic Cacnb1 variants. The CaVβ1D, and not CaVβ1A, is the isoform expressed in innervated adult skeletal muscle while embryonic muscle expresses only CaVβ1E. In addition, the lack of innervation induces specifically the expression of CaVβ1E while it is almost undetectable in innervated adult muscle.

Moreover, the CaVβ1D and the CaVβ1E show different intracellular locations in adult skeletal muscle fibers.

Cavβ1-E is Needed to Activate GDF5 Signaling after Denervation

In order to understand if CaVβ1-E may have a role in disuse atrophy we generated a tool targeting a specific sequence in Cacnb1 exon (shCaVβ1 Ex2) to abolish CaVβ1-E expression. The construct shCaVβ1-E carried by an AAV2/1 vector (AAV-shCaVβ1-E) was injected in mouse TA muscles.

CaVβ1-E expression induced after denervation was abolished two months after AAV-shCaVβ1-E injection (FIGS. 2A, 2C, 2D, 2E). No decrease in CaVβ1D expression was measured (FIG. 2C, 2D, 2E). The consequence of the missed induction of CaVβ1-E was an increased atrophy after denervation, suggesting a protective role of this protein in preserving muscle mass from disuse (FIG. 2F).

Among the molecular pathways involved in muscle mass homeostasis, GDF5 signal has been shown essential to limit muscle wasting in atrophic conditions (Sartori Op. cit).

The absence of CaVβ1-E significantly affected Gdf5 rise after denervation (FIG. 2G), suggesting a positive control of CaVβ1-E on GDF5 pathway. Indeed, Smad 1/5/8 phosphorylation, Smad 4 nuclear translocation and Id-1 transcription were inhibited in the CaVβ1-E down-regulated condition (FIG. 2H, 2I).

As CaVß1 has been described as transcription factor in muscle precursor cells (Taylor et al. J. Cell Biol. 205, 829-846 (2014) we asked whether CaVβ1E could have a transcriptional activity on GDF5 expression. For this, we used C2C12 cells. We first checked if these cells expressed CaVβ1E during differentiation. Our data showed that Cacnb1-E is expressed and increased in C2C12 during differentiation (Fig S3A) and that CaVβ1E is the main isoform expressed in this myogenic cell line (Fig S3B). Moreover, the expression of Gdf5 was also increasing in differentiating C2C12. Consistently, the inhibition of Cacnb1-E expression by transfection of a plasmid carrying shCaVβ1-E (pCDNA3-shCaVβ1-E) (Fig S3D) prevented the expression of Gdf5 in differentiating C2C12 (Fig S4C), mimicking its effect in vivo. These data validated the C2C12 cells as a pertinent in vitro tool to measure the CaVβ1-E transcriptional activity.

A previous study showed that canonical and non-canonical DNA E-Box sequences (CANNTG and CANNNTG) (Taylor et al. J. Cell Biol. 205, 829-846 (2014)) of several promoter regions could be targeted by the CaVβ1. Thus, the sequence from-312 to Gdf5 TSS, containing two CANNNTG and one CANNTG E-Box, was cloned upstream Firefly Luciferase in HSVTK-Luc3' modified plasmid and transfected in C2C12 cells (FIG. 2J). The Firefly/Renilla signal was increased during cellular differentiation reflecting Gdf5 promoter activation which was abolished by a down-regulation of CaVβ1-E induced by shCaVβ1-E plasmid co-transfection. These data strongly suggests that CaVβ1-E could target Gdf5 promoter and confirmed its effect observed in vivo.

Ageing Muscles: A Key Role for CaVβ1-E

Surgical sciatic nerve resection mimics a very severe pathological condition in which nerve withdrawal induces a molecular pathway to avoid complete muscle loss. However, we wondered about the role of CaVß1 in a physiological process when compensatory response to muscle atrophy is impaired. This scenario is represented by age related sarcopenia.

Senescence is a complex physiological status involving many tissues and organs. Ageing skeletal muscle shows denervation-like signs, becomes sarcopenic and loses progressively its ability to counteract mass wasting. In ageing muscle little and controversial is known about CaVβ1 expression and function (Taylor et al. Aging Cell 8, 584-594 (2009)). In TA of C57bl/6 mice, muscle loss become significant around 78 and very significant at 92 weeks of age (26.3±8.9% et 38.7±6.4% of sarcopenia, respectively, compared to 12 weeks old mice) (FIG. 3A). We observed in 95-100 weeks old TA a slight decrease of Cacnb1-D compared to adult 12 weeks old TA muscles (FIGS. 3C and S4A) but, in contrast, a significantly decreased basal level of Cacnb1-E (FIG. 3B, Fig S4B). Nothing is known about Gdf5 levels in senescent muscles.

In addition, we measured CaVβ1-E expression in innervated and denervated TA muscles during aging. We found that CaVβ1-E failed to increase in response to denervation since 52 weeks of age and that the rise of Gdf5 was diminished (FIGS. 3D, 3E, 3F, 3G) affecting Smad 1/5/8 phosphorylation (Fig S4C, S4D). No significant changes in CaVβ1D expression were measured (FIG. 3H, 3I).

Figure 3K:
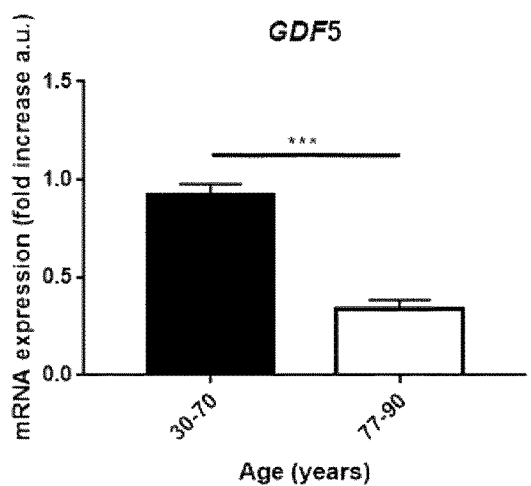

We wondered if this mechanism was conserved also in humans. Only three human CACNB1 variants have been identified to date (NM_000723.4, NM_199247.2, NM_199248.2), corresponding to the mouse isoforms A, B, C (Fig S1H). We probed exon 5-9, exon 13 and exon 14 of human CACNB1 mRNA extracted from muscle of healthy subjects aged from 30 to 89 years. Amplification of the region between exon 5 and exon 9 showed that all muscles expressed the predicted CACNB-A (380 bp) and not CACNB-B (245 bp) variants, and this was confirmed by the amplification of the specific region in exon 13. Surprisingly, amplification of the specific region in the exon 14 revealed that human muscle expresses a new unidentified variant, that we called CACNB1-E, and that this transcript was strongly down-regulated in >75 years old muscles (senescent) (FIG. 3J). We measured GDF5 transcript in the same samples and we found a very significant decrease of its level in senescent muscles (FIG. 3K). These results demonstrate the existence of an unraveled human CACNB1-E and strongly suggest that the axis CaVß1-GDF5 is also conserved in humans.

To understand if CaVβ1-E might improve age-related sarcopenia, we over-expressed CaVβ1-E by injecting the AAV-CaVβ1-E in 78-80 weeks old mouse TA. Over-expression of CaVβ1-E was very efficient after 3 months (FIG. 4A) without affecting Cacnb1-D transcription (FIG. 4B). CaVß1-E over-expression rescued Gdf5 transcription (FIG. 5C) and GDF-5 signaling, measured by Smad 1/5/8 phosphorylation, Smad 4 nuclear translocation and Id-1 transcription (FIG. 4D, 4E, 4F).

The effect of the rescue of GDF5 signaling by CaVβ1-E was a striking preservation of aged skeletal muscle mass (FIG. 4G) and the improvement of specific force compared to the scrambled (FIG. 4H). Overall, these data demonstrated that CaVß1-E is a very essential player to maintain muscle mass during age-related sarcopenia.

Conclusion

The proteins and the mechanism linking skeletal muscle activity sensing and translation into gene expression were missing to date.

Here, we showed a molecular pathway triggered by a voltage sensor subunit, independently of E-C coupling, sustaining muscle plasticity and strictly needed to muscle maintenance. These evidences suggest that CaVß1-E-dependent signaling could be also central in neuromuscular disorders and might shed light on potential therapeutic target to preserve muscular and neuronal degeneration in these pathologies.

Most importantly, we established that CaVβ1-E is essential to activate Gdf5 promoter. In adult skeletal muscle the expression of CaVβ1-E but not CaVβ1D is necessary to sustain GDF5 pathway. Importantly, we asked about the GDF5 signaling and its driving protein CaVβ1-E when the ability of skeletal muscle in maintaining its mass is lost, as it happens in age-related sarcopenia. To date, a correlation between progressive muscle wasting and defective GDF5 pathway has never been reported. Here we show that the levels of Gdf5 decrease during age-related sarcopenia. Overall, our data show that the GDF5 pathway plays a key role during in this process. Accordingly, we propose a potent therapeutic strategy based on the administration of GDF5 to subjects suffering from muscle mass and/or function loss, either in the context of sarcopenia or in the context of disuse atrophy.

Finally, but of extreme importance, CaVβ1-E could be a crucial component of the pathways leading to re-innervation of muscle after reversible nerve crush. CaVβ1-E implication, as consequence of its cross-talk with GDF5 signaling, should be a central factor mediating the recovery of nerve connection.

Example 2

Human Muscle: A New CaVβ1 Isoform Implicated in Skeletal Muscle Aging

Given the apparent importance of CaVβ1-E in mouse skeletal muscle, we wondered whether an analogous mechanism might be conserved in humans. To date, only three human CACNB1 variants have been identified corresponding to the mouse isoforms A, B, and C (FIG. 5A). Human mRNA extracted from one quadriceps and two fascia lata muscle biopsies of healthy adult subjects together with human mRNA extracted from the cervical spinal cord (Table 1), as a positive control for hCACNB1-B, were probed for exons 13 and 5-9.

TABLE 1

Human biopsies included in the study for the discovery of human hCaVβ1 protein and hCACNB1-E transcript. Y6-8 have been included also in the cohort showed in Table 2.

| Age (Years) | Gender | Muscle type |
|---|---|---|
| Myobank Institute of Myology (ref:BB-0033-00012) | | |
| 37 | M | Quadriceps (Y6) |
| 38 | M | Quadriceps (Y7) |
| 42 | M | Quadriceps (Y8) |
| 38 | M | Quadriceps (Q) |
| 40 | M | Fascia Lata (FL1) |
| 70 | F | Fascia Lata (FL2) |
| Neuropathology Lab, R. Escorolle-APHP-Paris | | |
| ND | ND | Cervical tract spinal cord (Post-mortem) |

Amplification of the sequence in exon 13 showed that both muscle types expressed hCACNB1-A and/or hCACNB1-C. As in mouse muscle, amplification of the region between exons 5 and 9 demonstrated that hCACNB1-B (245 bp) was only expressed in human spinal cord (SC) and not in muscle, where only a 380 bp corresponding to hCACNB1-A or hCACNB1-E appeared. Furthermore, hCACNB1-C expression was to be excluded in muscle because the amplified sequence would be 245 bp (FIG. 5B). Amplification of the region in exon 14 revealed that the human muscles expressed the previously unidentified variant hCACNB1-E (FIG. 5C). This isoform corresponded to the predicted XM_006722072.2 variant, having a codon start (ATG2) upstream the exon 3 (FIGS. 5A, C). Western blot experiments confirmed its expression in two different human fascia lata muscle biopsies (FIG. 5D).

Because we found that the CaVβ1-E/GDF5 axis alteration was associated to muscle wasting during senescence in mice, we compared muscle characteristics indicating muscle mass (lean mass percentage) and function (power) decline in a cohort of healthy young (20-42 years) and old (70-81 years) volunteers, included in a previous study (Table 2).

TABLE 2

Characteristics of human muscles:

| Participant | Gender | Age (years) | Height (m) | Weight (kg) | Lean mass (%) | Power (W/Kg) |
|---|---|---|---|---|---|---|
| Y1 | M | 20.9 | 1.82 | 84.4 | 82.3 | 54.7 |
| Y2 | F | 24.5 | 1.63 | 56.2 | 78.4 | 51.1 |
| Y3 | F | 26.1 | 1.53 | 53.0 | 70.4 | 38.4 |
| Y4 | M | 26.4 | 1.76 | 56.7 | 89.2 | 48.6 |
| Y5 | M | 27.1 | 1.83 | 73.8 | 75.9 | 42.4 |
| Y6 | M | 37.0 | ND | ND | ND | ND |
| Y7 | M | 38.0 | ND | ND | ND | ND |
| Y8 | M | 42.0 | ND | ND | ND | ND |
| O1 | F | 70.8 | 1.68 | 70.2 | 58.9 | 22.3 |
| O2 | M | 70.9 | 1.58 | 65.1 | 70.4 | 34.5 |
| O3 | M | 71.4 | 1.76 | 90.7 | 64.5 | 29.7 |
| O4 | M | 71.4 | 1.68 | 84.4 | 66.3 | 27 |
| O5 | F | 71.5 | 1.61 | 53.3 | 67.6 | 21.2 |
| O6 | M | 71.7 | 1.67 | 69.4 | 79.2 | 35.3 |
| O7 | M | 72.5 | 1.67 | 74.3 | 70.4 | 34.7 |
| O8 | M | 72.9 | 1.74 | 91.6 | 64.2 | 28.1 |
| O9 | M | 73.8 | 1.67 | 76.0 | 71.7 | 36 |
| O10 | F | 74.2 | 1.54 | 58.3 | 64.0 | 26.3 |
| O11 | M | 75.0 | 1.69 | 80.0 | 68.3 | 29.4 |
| O12 | M | 76.4 | 1.58 | 67.7 | 74.7 | 25.6 |
| O13 | M | 76.7 | 1.76 | 85.5 | 67.4 | 25.8 |
| O14 | F | 77.8 | 1.58 | 55.5 | 70.8 | 22.2 |
| O15 | M | 78.0 | 1.75 | 80.3 | 68.5 | 22.6 |
| O16 | M | 79.6 | 1.67 | 67.9 | 80.9 | 26.3 |
| O17 | F | 80.6 | 1.59 | 56.3 | 71.2 | 29 |

Parameters were investigated in young aged of 20 and 42 (Y) and old aged from 70 to 81 (O) participants; gender male (M) and female (F). Lean mass (%) was assessed by dual-energy X-ray absorptiometry. Power performed on a force platform is expressed by Watt on kilograms (W/kg); ND: not determined.

We found that the old group had significantly lower lean mass and power than the young group (FIG. 6A). We then measured hCACNB1-E transcript and found a significant reduction of its expression in the old group while hCACNB1-A level did not differ between groups (FIG. 6B). A significantly lower hCACNB1-E expression was also associated with a lower lean mass percentage (FIG. 6C). hGDF5 was detected at very low level in muscle biopsies, However, in old muscle samples we could associate low expression of both hCACNB1-E and hGDF5 with low lean mass percentage. In addition, participants having a higher lean mass percentage displayed a higher level of both hCACNB1-E and hGDF5 (FIG. 6D).

Overall, we discovered CaVβ1-E as new driver of compensatory response via GDF5 modulation, counteracting muscle wasting in young and aged muscles. In particular, the results obtained in this study show that an association between age-related muscle wasting and CaVβ1-E/GDF5 axis is conserved between mice and humans, strongly suggesting an essential role of this protein in muscle-mass maintenance in mammals.

Systemic rGdf5 Administration Counteracts Age-Related Sarcopenia

Recombinant mouse (Rm) Gdf5 has been administered by intraperitoneal injection (I.P) for ten weeks to four C57bl/6 mice (90 weeks old) twice per week at 0.2 mg/kg diluted in PBS/BSA 0.1%. As control PBS/BSA 0.1% alone has been also injected. Measurements of body composition (RMN) and grip test have been performed every two weeks (FIG. 7A).

Grip test analysis showed no differences between groups, probably due to the reduced sensitivity of this assay. Lean mass and fat mass percentage did not change in mice treated with vehicle (FIG. 7B). However, RmGdf5 implementation induced a significant increase of lean mass percentage and decrease of the fat mass percentage (FIG. 7C).

Muscle/body-weight ratio of TAs and QUAD was increased in 100 weeks old C57Bl/6 mice treated for 10 weeks with Rm-GDF5 (Gdf5) compared to 92 weeks old C57Bl/6 mice untreated or treated with vehicle (FIG. 7D) suggesting that Rm-Gdf5 implementation lead to a significant muscle mass gain. All together these data suggest that a systemic treatment with Rm-Gdf5 can efficiently counteract age-related sarcopenia.

The invention claimed is:

1. A method for the treatment or prevention of sarcopenia or disuse atrophy in a subject, the method comprising administering to the subject a substance selected from the group consisting of a synthetic or recombinant GDF5 protein, a GDF5 peptide and a vector encoding GDF5.

2. A method for treating or preventing muscle weakness in Duchenne muscular dystrophy or amyotrophic lateral sclerosis in a subject, the method comprising administering to the subject a substance selected from the group consisting of a synthetic or recombinant GDF5 protein, a GDF5 peptide and a vector encoding GDF5, alone or in combination with a treatment of Duchenne muscular dystrophy or amyotrophic lateral sclerosis.

3. The method according to claim 1, wherein the substance is recombinant human GDF5.

4. The method according to claim 1, wherein the subject is aged 50 years or older.

5. The method according to claim 1, wherein the substance is administered via the oral, nasal, intravascular, intramuscular, intraperitoneal route, transdermal or subcutaneous route.

6. The method according to claim 1, wherein the substance is administered on a monthly basis, a weekly basis, or a daily basis.

7. The method according to claim 1, wherein the treatment of sarcopenia results in an increase of muscle mass and/or function, an increase in physical performance or mobility, and/or an increase in muscle strength.

8. The method according to claim 1, comprising administering to the subject a pharmaceutical composition comprising the substance selected from the group consisting of a synthetic or recombinant GDF5 protein, a GDF5 peptide and a vector encoding GDF5 and a pharmaceutically acceptable carrier.

9. The method according to claim 8, wherein the substance is recombinant human GDF5.

10. The method according to claim 2, wherein the substance is recombinant human GDF5.

11. The method according to claim 2, wherein the substance is administered via the oral, nasal, intravascular, intramuscular, intraperitoneal route, transdermal or subcutaneous route.

12. The method according to claim 2, wherein the substance is administered on a monthly basis, a weekly basis, or a daily basis.

13. The method according to claim 2, comprising administering to the subject a pharmaceutical composition comprising the substance selected from the group consisting of a synthetic or recombinant GDF5 protein, a GDF5 peptide and a vector encoding GDF5 and a pharmaceutical acceptable carrier.

14. The method according to claim 13, wherein the substance is recombinant human GDF5.

* * * * *

SEQUENCE LISTING

```
<160> NUMBER OF SEQ ID NOS: 45

<210> SEQ ID NO 1
<211> LENGTH: 501
<212> TYPE: PRT
<213> ORGANISM: homo sapiens

<400> SEQUENCE: 1

Met Arg Leu Pro Lys Leu Leu Thr Phe Leu Leu Trp Tyr Leu Ala Trp
1               5                   10                  15

Leu Asp Leu Glu Phe Ile Cys Thr Val Leu Gly Ala Pro Asp Leu Gly
            20                  25                  30

Gln Arg Pro Gln Gly Thr Arg Pro Gly Leu Ala Lys Ala Glu Ala Lys
        35                  40                  45

Glu Arg Pro Pro Leu Ala Arg Asn Val Phe Arg Pro Gly Gly His Ser
    50                  55                  60

Tyr Gly Gly Gly Ala Thr Asn Ala Asn Ala Arg Ala Lys Gly Gly Thr
65                  70                  75                  80

Gly Gln Thr Gly Gly Leu Thr Gln Pro Lys Lys Asp Glu Pro Lys Lys
                85                  90                  95

Leu Pro Pro Arg Pro Gly Gly Pro Glu Pro Lys Pro Gly His Pro Pro
            100                 105                 110

Gln Thr Arg Gln Ala Thr Ala Arg Thr Val Thr Pro Lys Gly Gln Leu
        115                 120                 125

Pro Gly Gly Lys Ala Pro Pro Lys Ala Gly Ser Val Pro Ser Ser Phe
    130                 135                 140

Leu Leu Lys Lys Ala Arg Glu Pro Gly Pro Pro Arg Glu Pro Lys Glu
145                 150                 155                 160

Pro Phe Arg Pro Pro Ile Thr Pro His Glu Tyr Met Leu Ser Leu
                165                 170                 175

Tyr Arg Thr Leu Ser Asp Ala Asp Arg Lys Gly Gly Asn Ser Ser Val
                180                 185                 190

Lys Leu Glu Ala Gly Leu Ala Asn Thr Ile Thr Ser Phe Ile Asp Lys
            195                 200                 205

Gly Gln Asp Asp Arg Gly Pro Val Val Arg Lys Gln Arg Tyr Val Phe
        210                 215                 220

Asp Ile Ser Ala Leu Glu Lys Asp Gly Leu Leu Gly Ala Glu Leu Arg
225                 230                 235                 240

Ile Leu Arg Lys Lys Pro Ser Asp Thr Ala Lys Pro Ala Ala Pro Gly
                245                 250                 255

Gly Gly Arg Ala Ala Gln Leu Lys Leu Ser Ser Cys Pro Ser Gly Arg
            260                 265                 270

Gln Pro Ala Ser Leu Leu Asp Val Arg Ser Val Pro Gly Leu Asp Gly
        275                 280                 285
```

-continued

```
Ser Gly Trp Glu Val Phe Asp Ile Trp Lys Leu Phe Arg Asn Phe Lys
    290                 295                 300

Asn Ser Ala Gln Leu Cys Leu Glu Leu Glu Ala Trp Glu Arg Gly Arg
305                 310                 315                 320

Ala Val Asp Leu Arg Gly Leu Gly Phe Asp Arg Ala Ala Arg Gln Val
            325                 330                 335

His Glu Lys Ala Leu Phe Leu Val Phe Gly Arg Thr Lys Lys Arg Asp
        340                 345                 350

Leu Phe Phe Asn Glu Ile Lys Ala Arg Ser Gly Gln Asp Asp Lys Thr
    355                 360                 365

Val Tyr Glu Tyr Leu Phe Ser Gln Arg Arg Lys Arg Ala Pro Leu
370                 375                 380

Ala Thr Arg Gln Gly Lys Arg Pro Ser Lys Asn Leu Lys Ala Arg Cys
385                 390                 395                 400

Ser Arg Lys Ala Leu His Val Asn Phe Lys Asp Met Gly Trp Asp Asp
            405                 410                 415

Trp Ile Ile Ala Pro Leu Glu Tyr Glu Ala Phe His Cys Glu Gly Leu
        420                 425                 430

Cys Glu Phe Pro Leu Arg Ser His Leu Glu Pro Thr Asn His Ala Val
    435                 440                 445

Ile Gln Thr Leu Met Asn Ser Met Asp Pro Glu Ser Thr Pro Pro Thr
450                 455                 460

Cys Cys Val Pro Thr Arg Leu Ser Pro Ile Ser Ile Leu Phe Ile Asp
465                 470                 475                 480

Ser Ala Asn Asn Val Val Tyr Lys Gln Tyr Glu Asp Met Val Val Glu
            485                 490                 495

Ser Cys Gly Cys Arg
            500

<210> SEQ ID NO 2
<211> LENGTH: 120
<212> TYPE: PRT
<213> ORGANISM: homo sapiens

<400> SEQUENCE: 2

Ala Pro Leu Ala Thr Arg Gln Gly Lys Arg Pro Ser Lys Asn Leu Lys
1               5                   10                  15

Ala Arg Cys Ser Arg Lys Ala Leu His Val Asn Phe Lys Asp Met Gly
            20                  25                  30

Trp Asp Asp Trp Ile Ile Ala Pro Leu Glu Tyr Glu Ala Phe His Cys
        35                  40                  45

Glu Gly Leu Cys Glu Phe Pro Leu Arg Ser His Leu Glu Pro Thr Asn
    50                  55                  60

His Ala Val Ile Gln Thr Leu Met Asn Ser Met Asp Pro Glu Ser Thr
65                  70                  75                  80

Pro Pro Thr Cys Cys Val Pro Thr Arg Leu Ser Pro Ile Ser Ile Leu
                85                  90                  95

Phe Ile Asp Ser Ala Asn Asn Val Val Tyr Lys Gln Tyr Glu Asp Met
            100                 105                 110

Val Val Glu Ser Cys Gly Cys Arg
        115                 120

<210> SEQ ID NO 3
<211> LENGTH: 120
<212> TYPE: PRT
```

```
<213> ORGANISM: artificial
<220> FEATURE:
<223> OTHER INFORMATION: rhGDF5

<400> SEQUENCE: 3

Ala Pro Ser Ala Thr Arg Gln Gly Lys Arg Pro Ser Lys Asn Leu Lys
1               5                   10                  15

Ala Arg Cys Ser Arg Lys Ala Leu His Val Asn Phe Lys Asp Met Gly
                20                  25                  30

Trp Asp Asp Trp Ile Ile Ala Pro Leu Glu Tyr Glu Ala Phe His Cys
            35                  40                  45

Glu Gly Leu Cys Glu Phe Pro Leu Arg Ser His Leu Glu Pro Thr Asn
        50                  55                  60

His Ala Val Ile Gln Thr Leu Met Asn Ser Met Asp Pro Glu Ser Thr
65                  70                  75                  80

Pro Pro Thr Cys Cys Val Pro Thr Arg Leu Ser Pro Ile Ser Ile Leu
                85                  90                  95

Phe Ile Asp Ser Ala Asn Asn Val Val Tyr Lys Gln Tyr Glu Asp Met
            100                 105                 110

Val Val Glu Ser Cys Gly Cys Arg
        115                 120

<210> SEQ ID NO 4
<211> LENGTH: 20
<212> TYPE: DNA
<213> ORGANISM: artificial
<220> FEATURE:
<223> OTHER INFORMATION: primer

<400> SEQUENCE: 4
ctccaagcag atgcagcaga                                                   20

<210> SEQ ID NO 5
<211> LENGTH: 20
<212> TYPE: DNA
<213> ORGANISM: artificial
<220> FEATURE:
<223> OTHER INFORMATION: primer

<400> SEQUENCE: 5
atagccttgc gcatcatggt                                                   20

<210> SEQ ID NO 6
<211> LENGTH: 20
<212> TYPE: DNA
<213> ORGANISM: artificial
<220> FEATURE:
<223> OTHER INFORMATION: primer

<400> SEQUENCE: 6
agtgagcaag gtggagatcc                                                   20

<210> SEQ ID NO 7
<211> LENGTH: 18
<212> TYPE: DNA
<213> ORGANISM: artificial
<220> FEATURE:
<223> OTHER INFORMATION: primer

<400> SEQUENCE: 7
gatcgtcggc tggaacac                                                     18
```

-continued

```
<210> SEQ ID NO 8
<211> LENGTH: 22
<212> TYPE: DNA
<213> ORGANISM: artificial
<220> FEATURE:
<223> OTHER INFORMATION: primer

<400> SEQUENCE: 8
atgctgacag aaagggaggt aa                                              22

<210> SEQ ID NO 9
<211> LENGTH: 22
<212> TYPE: DNA
<213> ORGANISM: artificial
<220> FEATURE:
<223> OTHER INFORMATION: primer

<400> SEQUENCE: 9
gcactgatgt caaacacgta cc                                              22

<210> SEQ ID NO 10
<211> LENGTH: 22
<212> TYPE: DNA
<213> ORGANISM: artificial
<220> FEATURE:
<223> OTHER INFORMATION: primer

<400> SEQUENCE: 10
agaccgtgta tgagtacctg tt                                              22

<210> SEQ ID NO 11
<211> LENGTH: 22
<212> TYPE: DNA
<213> ORGANISM: artificial
<220> FEATURE:
<223> OTHER INFORMATION: primer

<400> SEQUENCE: 11
gtccttgaag ttgacatgca gt                                              22

<210> SEQ ID NO 12
<211> LENGTH: 20
<212> TYPE: DNA
<213> ORGANISM: artificial
<220> FEATURE:
<223> OTHER INFORMATION: primer

<400> SEQUENCE: 12
ggcgacctgg aagtccaact                                                 20

<210> SEQ ID NO 13
<211> LENGTH: 20
<212> TYPE: DNA
<213> ORGANISM: artificial
<220> FEATURE:
<223> OTHER INFORMATION: primer

<400> SEQUENCE: 13
ccatcagcac cacagccttc                                                 20

<210> SEQ ID NO 14
<211> LENGTH: 21
<212> TYPE: DNA
<213> ORGANISM: artificial
<220> FEATURE:
<223> OTHER INFORMATION: primer
```

```
<400> SEQUENCE: 14
gacagccttc gcctgctgca g                                              21

<210> SEQ ID NO 15
<211> LENGTH: 21
<212> TYPE: DNA
<213> ORGANISM: artificial
<220> FEATURE:
<223> OTHER INFORMATION: primer

<400> SEQUENCE: 15
atgtctgtaa cctcgtagcc c                                              21

<210> SEQ ID NO 16
<211> LENGTH: 20
<212> TYPE: DNA
<213> ORGANISM: artificial
<220> FEATURE:
<223> OTHER INFORMATION: primer

<400> SEQUENCE: 16
caggtacagg tgctcacctc                                                20

<210> SEQ ID NO 17
<211> LENGTH: 21
<212> TYPE: DNA
<213> ORGANISM: artificial
<220> FEATURE:
<223> OTHER INFORMATION: primer

<400> SEQUENCE: 17
catggcatgt tcctgctcct g                                              21

<210> SEQ ID NO 18
<211> LENGTH: 20
<212> TYPE: DNA
<213> ORGANISM: artificial
<220> FEATURE:
<223> OTHER INFORMATION: primer

<400> SEQUENCE: 18
cagggaccct accttgcttc                                                20

<210> SEQ ID NO 19
<211> LENGTH: 20
<212> TYPE: DNA
<213> ORGANISM: artificial
<220> FEATURE:
<223> OTHER INFORMATION: primer

<400> SEQUENCE: 19
gcgaatgtag acgcctcgtc                                                20

<210> SEQ ID NO 20
<211> LENGTH: 21
<212> TYPE: DNA
<213> ORGANISM: artificial
<220> FEATURE:
<223> OTHER INFORMATION: primer

<400> SEQUENCE: 20
atggtccaga agagcggcat g                                              21

<210> SEQ ID NO 21
<211> LENGTH: 21
```

```
<212> TYPE: DNA
<213> ORGANISM: artificial
<220> FEATURE:
<223> OTHER INFORMATION: primer

<400> SEQUENCE: 21
tggatgttgt atccgaggac g                                     21

<210> SEQ ID NO 22
<211> LENGTH: 22
<212> TYPE: DNA
<213> ORGANISM: artificial
<220> FEATURE:
<223> OTHER INFORMATION: primer

<400> SEQUENCE: 22
ggcaagtaca gcaagaggaa ag                                    22

<210> SEQ ID NO 23
<211> LENGTH: 20
<212> TYPE: DNA
<213> ORGANISM: artificial
<220> FEATURE:
<223> OTHER INFORMATION: primer

<400> SEQUENCE: 23
ttaaggcttc ccggtcctcc                                       20

<210> SEQ ID NO 24
<211> LENGTH: 19
<212> TYPE: DNA
<213> ORGANISM: artificial
<220> FEATURE:
<223> OTHER INFORMATION: primer

<400> SEQUENCE: 24
cagccggacc ctggtagtg                                        19

<210> SEQ ID NO 25
<211> LENGTH: 20
<212> TYPE: DNA
<213> ORGANISM: artificial
<220> FEATURE:
<223> OTHER INFORMATION: primer

<400> SEQUENCE: 25
gtttggtctt ggctttctcg                                       20

<210> SEQ ID NO 26
<211> LENGTH: 19
<212> TYPE: DNA
<213> ORGANISM: artificial
<220> FEATURE:
<223> OTHER INFORMATION: primer

<400> SEQUENCE: 26
cagccggacc ctggtagtg                                        19

<210> SEQ ID NO 27
<211> LENGTH: 20
<212> TYPE: DNA
<213> ORGANISM: artificial
<220> FEATURE:
<223> OTHER INFORMATION: primer

<400> SEQUENCE: 27
``` gaagggatg cgcttgccgt                                                          20

<210> SEQ ID NO 28
<211> LENGTH: 21
<212> TYPE: DNA
<213> ORGANISM: artificial
<220> FEATURE:
<223> OTHER INFORMATION: primer

<400> SEQUENCE: 28
gacagccttc gtctgctgca g                                                       21

<210> SEQ ID NO 29
<211> LENGTH: 20
<212> TYPE: DNA
<213> ORGANISM: artificial
<220> FEATURE:
<223> OTHER INFORMATION: primer

<400> SEQUENCE: 29 gaagggatg cgcttgccgt                                                          20

<210> SEQ ID NO 30
<211> LENGTH: 20
<212> TYPE: DNA
<213> ORGANISM: artificial
<220> FEATURE:
<223> OTHER INFORMATION: primer

<400> SEQUENCE: 30
cagggaccct accttgcttc                                                         20

<210> SEQ ID NO 31
<211> LENGTH: 20
<212> TYPE: DNA
<213> ORGANISM: artificial
<220> FEATURE:
<223> OTHER INFORMATION: primer

<400> SEQUENCE: 31
gcggatgtag acgccttgtc                                                         20

<210> SEQ ID NO 32
<211> LENGTH: 21
<212> TYPE: DNA
<213> ORGANISM: artificial
<220> FEATURE:
<223> OTHER INFORMATION: primer

<400> SEQUENCE: 32
gacagccttc gtctgctgca g                                                       21

<210> SEQ ID NO 33
<211> LENGTH: 21
<212> TYPE: DNA
<213> ORGANISM: artificial
<220> FEATURE:
<223> OTHER INFORMATION: primer

<400> SEQUENCE: 33
catgtctgtc acctcatagc c                                                       21

<210> SEQ ID NO 34
<211> LENGTH: 19
<212> TYPE: DNA
<213> ORGANISM: artificial

```
<220> FEATURE:
<223> OTHER INFORMATION: primer

<400> SEQUENCE: 34
gttcaaaagg tcagacggg                                                19

<210> SEQ ID NO 35
<211> LENGTH: 23
<212> TYPE: DNA
<213> ORGANISM: artificial
<220> FEATURE:
<223> OTHER INFORMATION: primer

<400> SEQUENCE: 35
cagagtctga tggtcggctc gtg                                           23

<210> SEQ ID NO 36
<211> LENGTH: 19
<212> TYPE: DNA
<213> ORGANISM: artificial
<220> FEATURE:
<223> OTHER INFORMATION: primer

<400> SEQUENCE: 36
caggtacagg tgctcacct                                                19

<210> SEQ ID NO 37
<211> LENGTH: 21
<212> TYPE: DNA
<213> ORGANISM: artificial
<220> FEATURE:
<223> OTHER INFORMATION: primer

<400> SEQUENCE: 37
catggcgtgc tcctgaggct g                                             21

<210> SEQ ID NO 38
<211> LENGTH: 20
<212> TYPE: DNA
<213> ORGANISM: artificial
<220> FEATURE:
<223> OTHER INFORMATION: primer

<400> SEQUENCE: 38
cagggaccct accttgcttc                                               20

<210> SEQ ID NO 39
<211> LENGTH: 20
<212> TYPE: DNA
<213> ORGANISM: artificial
<220> FEATURE:
<223> OTHER INFORMATION: primer

<400> SEQUENCE: 39
catcaaaggt gtcttggcgg                                               20

<210> SEQ ID NO 40
<211> LENGTH: 1929
<212> TYPE: DNA
<213> ORGANISM: Mus musculus

<400> SEQUENCE: 40
atggtccaga agagcggcat gtcccggggc ccttacccac cttcccaaga gatccctatg    60
gaggtcttcg accccagccc acagggcaag tacagcaaga ggaaagggcg gttcaaaagg   120
```

| | |
|---|---:|
| tcagacggga gtacgtcctc ggatacaaca tccaacagct tcgtccgcca gggctcagca | 180 |
| gagtcctaca cgagccgacc atcagactct gatgtgtctc tggaggagga ccgggaagcc | 240 |
| ttaaggaagg aggcagagcg ccaggcctta gcccagctcg agaaagccaa gaccaaacca | 300 |
| gtggcttttg ctgttcggac aaatgttggc tacaatccgt ctccagggga tgaggtgcct | 360 |
| gtacagggag tggccatcac ctttgagccc aaggacttcc tacacatcaa ggagaagtac | 420 |
| aataatgact ggtggattgg gcggctggtg aaggaaggct gcgaggttgg cttcatcccc | 480 |
| agcccggtca aactggacag ccttcgtctg ctgcaggaac agaccctgcg ccagaaccgc | 540 |
| ctcagctcca gcaagtcagg tgacaactcc agttccagtc tgggagatgt ggtgactggc | 600 |
| acccgccgcc ccacaccccc tgccagtggt aatgaaatga ctaactttgc ctttgagcta | 660 |
| gacccctag agttagagga ggaggaggca gagctagggg agcacggcgg ctcagccaag | 720 |
| actagcgtga gcagtgtcac cacgccgcca ccccacggca agcgcatccc cttctttaag | 780 |
| aagacagagc acgtgccccc ctatgacgtg gtgccttcca tgaggcccat catcctggtg | 840 |
| ggaccgtcgc tcaagggcta tgaggtgaca gacatgatgc agaaagcgtt gtttgacttc | 900 |
| ctcaagcatc ggtttgatgg caggatttcc atcacccggg taacagctga catttccctg | 960 |
| gccaaacgct ccgtcctcaa caaccccagc aaacacatca tcattgagcg ctccaacacg | 1020 |
| cgttccagcc tggctgaggt acagagtgaa attgagagga tcttcgagct ggcccggacc | 1080 |
| ttgcagctgt tcgccttgga cgctgacacc atcaaccacc cagcccagct ctctaaaacg | 1140 |
| tcgctggccc ccatcattgt ttacatcaag atcacatctc caaggtact gcagaggctc | 1200 |
| atcaaatccc gagggaagtc tcaatccaaa cacctcaatg tccaaatagc agcctcggag | 1260 |
| aagctggcac agtgtccccc cgaaatgttt gacataatcc tggacgagaa ccaattggaa | 1320 |
| gatgcctgcg agcacctggc tgagtacttg gaagcctact ggaaggccac acatccgcct | 1380 |
| agcagcacgc cacccaatcc gctgctgaac cgcaccatgg ctaccgcagc tctggctgcc | 1440 |
| agccctgccc ccgtctccaa cctccaggga ccctaccttg cttccgggga ccagccgctg | 1500 |
| gaccgggcca ctggggaaca tgccagtgtg cacgagtacc ccggggaact gggccagccc | 1560 |
| ccaggccttt accccagcaa ccacccacct ggccgggcag gcaccctgcg ggcgctatcc | 1620 |
| cgccaagaca cctttgatgc tgcaccccc ggcagccgaa attctgccta cacggagccg | 1680 |
| ggagactcgt gtgtggacat ggagacagac ccctcagagg gcccagggcc tggagaccct | 1740 |
| gcaggggag gcacaccacc agcccggcag ggctcctggg aagacgagga agactatgag | 1800 |
| gaggagatga ccgacaacag gaaccggggc cggaataagg cccgctactg tgcggagggt | 1860 |
| ggtgggccgg ttctggggcg caataagaat gagctggagg gctggggaca aggcgtctac | 1920 |
| atccgctga | 1929 |

<210> SEQ ID NO 41
<211> LENGTH: 1434
<212> TYPE: DNA
<213> ORGANISM: Mus musculus

<400> SEQUENCE: 41

| | |
|---|---:|
| atggaggtgc ccagccggac cctggtagtg ggctcagcag agtcctacac gagccgacca | 60 |
| tcagactctg atgtgtctct ggaggaggac cgggaagcct taaggaagga ggcagagcgc | 120 |
| caggccttag cccagctcga gaaagccaag accaaaccag tggcttttgc tgttcggaca | 180 |
| aatgttggct acaatccgtc tccaggggat gaggtgcctg tacagggagt ggccatcacc | 240 |
| tttgagccca aggacttcct acacatcaag gagaagtaca ataatgactg gtggattggg | 300 |

```
cggctggtga aggaaggctg cgaggttggc ttcatcccca gcccggtcaa actggacagc    360
cttcgtctgc tgcaggaaca gaccctgcgc cagaaccgcc tcagctccag caagtcaggt    420
gacaactcca gttccagtct gggagatgtg gtgactggca cccgccgccc cacacccct    480 gccagtggta atgaaatgac taactttgcc tttgagctag accccctaga gttagaggag    540
gaggaggcag agctagggga gcacggcggc tcagccaaga ctagcgtgag cagtgtcacc    600
acgccgccac cccacggcaa cgcatcccc ttctttaaga agacagagca cgtgccccc    660 tatgacgtgg tgccttccat gaggcccatc atcctggtgg gaccgtcgct caagggctat    720
gaggtgacac acatgatgca gaaagcgttg tttgacttcc tcaagcatcg gtttgatggc    780
aggatttcca tcacccgggt aacagctgac atttccctgg ccaaacgctc cgtcctcaac    840
aaccccagca acacatcat cattgagcgc tccaacacgc gttccagcct ggctgaggta    900
cagagtgaaa ttgagaggat cttcgagctg gcccggacct tgcagctggt cgccttggac    960
gctgacacca tcaaccaccc agcccagctc tctaaaacgt cgctggcccc catcattgtt   1020
tacatcaaga tcacatctcc caaggtactg cagaggctca tcaaatcccg agggaagtct   1080
caatccaaac acctcaatgt ccaaatagca gcctcggaga agctggcaca gtgtcccccc   1140
gaaatgtttg acataatcct ggacgagaac caattggaag atgcctgcga gcacctggct   1200
gagtacttgg aagcctactg gaaggccaca catccgccta gcagcacgcc acccaatccg   1260
ctgctgaacc gcaccatggc taccgcagct ctggctgcca gccctgcccc cgtctccaac   1320
ctccaggtac aggtgctcac ctcgctcagg agaaatctca gcttctgggg cgggctggag   1380
gcctcaccgc ggggaggcga cgcggtggcc cagcctcagg agcacgccat gtag          1434

<210> SEQ ID NO 42
<211> LENGTH: 642
<212> TYPE: PRT
<213> ORGANISM: Mus musculus

<400> SEQUENCE: 42

Met Val Gln Lys Ser Gly Met Ser Arg Gly Pro Tyr Pro Pro Ser Gln
1               5                   10                  15

Glu Ile Pro Met Glu Val Phe Asp Pro Ser Pro Gln Gly Lys Tyr Ser
            20                  25                  30

Lys Arg Lys Gly Arg Phe Lys Arg Ser Asp Gly Ser Thr Ser Ser Asp
        35                  40                  45

Thr Thr Ser Asn Ser Phe Val Arg Gln Gly Ser Ala Glu Ser Tyr Thr
    50                  55                  60

Ser Arg Pro Ser Asp Ser Asp Val Ser Leu Glu Glu Asp Arg Glu Ala
65                  70                  75                  80

Leu Arg Lys Glu Ala Glu Arg Gln Ala Leu Ala Gln Leu Glu Lys Ala
                85                  90                  95

Lys Thr Lys Pro Val Ala Phe Ala Val Arg Thr Asn Val Gly Tyr Asn
            100                 105                 110

Pro Ser Pro Gly Asp Glu Val Pro Val Gln Gly Val Ala Ile Thr Phe
        115                 120                 125

Glu Pro Lys Asp Phe Leu His Ile Lys Glu Lys Tyr Asn Asn Asp Trp
    130                 135                 140

Trp Ile Gly Arg Leu Val Lys Glu Gly Cys Glu Val Gly Phe Ile Pro
145                 150                 155                 160

Ser Pro Val Lys Leu Asp Ser Leu Arg Leu Leu Gln Glu Gln Thr Leu
                165                 170                 175
```

```
Arg Gln Asn Arg Leu Ser Ser Lys Ser Gly Asp Asn Ser Ser Ser
            180                 185                 190

Ser Leu Gly Asp Val Val Thr Gly Thr Arg Arg Pro Thr Pro Pro Ala
        195                 200                 205

Ser Gly Asn Glu Met Thr Asn Phe Ala Phe Glu Leu Asp Pro Leu Glu
    210                 215                 220

Leu Glu Glu Glu Glu Ala Glu Leu Gly Glu His Gly Gly Ser Ala Lys
225                 230                 235                 240

Thr Ser Val Ser Ser Val Thr Thr Pro Pro His Gly Lys Arg Ile
                245                 250                 255

Pro Phe Phe Lys Lys Thr Glu His Val Pro Pro Tyr Asp Val Val Pro
            260                 265                 270

Ser Met Arg Pro Ile Ile Leu Val Gly Pro Ser Leu Lys Gly Tyr Glu
            275                 280                 285

Val Thr Asp Met Met Gln Lys Ala Leu Phe Asp Phe Leu Lys His Arg
290                 295                 300

Phe Asp Gly Arg Ile Ser Ile Thr Arg Val Thr Ala Asp Ile Ser Leu
305                 310                 315                 320

Ala Lys Arg Ser Val Leu Asn Asn Pro Ser Lys His Ile Ile Glu
                325                 330                 335

Arg Ser Asn Thr Arg Ser Ser Leu Ala Glu Val Gln Ser Glu Ile Glu
            340                 345                 350

Arg Ile Phe Glu Leu Ala Arg Thr Leu Gln Leu Val Ala Leu Asp Ala
            355                 360                 365

Asp Thr Ile Asn His Pro Ala Gln Leu Ser Lys Thr Ser Leu Ala Pro
    370                 375                 380

Ile Ile Val Tyr Ile Lys Ile Thr Ser Pro Lys Val Leu Gln Arg Leu
385                 390                 395                 400

Ile Lys Ser Arg Gly Lys Ser Gln Ser Lys His Leu Asn Val Gln Ile
                405                 410                 415

Ala Ala Ser Glu Lys Leu Ala Gln Cys Pro Pro Glu Met Phe Asp Ile
            420                 425                 430

Ile Leu Asp Glu Asn Gln Leu Glu Asp Ala Cys Glu His Leu Ala Glu
            435                 440                 445

Tyr Leu Glu Ala Tyr Trp Lys Ala Thr His Pro Pro Ser Ser Thr Pro
450                 455                 460

Pro Asn Pro Leu Leu Asn Arg Thr Met Ala Thr Ala Ala Leu Ala Ala
465                 470                 475                 480

Ser Pro Ala Pro Val Ser Asn Leu Gln Gly Pro Tyr Leu Ala Ser Gly
                485                 490                 495

Asp Gln Pro Leu Asp Arg Ala Thr Gly Glu His Ala Ser Val His Glu
            500                 505                 510

Tyr Pro Gly Glu Leu Gly Gln Pro Gly Leu Tyr Pro Ser Asn His
            515                 520                 525

Pro Pro Gly Arg Ala Gly Thr Leu Arg Ala Leu Ser Arg Gln Asp Thr
            530                 535                 540

Phe Asp Ala Asp Thr Pro Gly Ser Arg Asn Ser Ala Tyr Thr Glu Pro
545                 550                 555                 560

Gly Asp Ser Cys Val Asp Met Glu Thr Asp Pro Ser Glu Gly Pro Gly
                565                 570                 575

Pro Gly Asp Pro Ala Gly Gly Thr Pro Ala Arg Gln Gly Ser
            580                 585                 590
```

-continued

```
Trp Glu Asp Glu Glu Asp Tyr Glu Glu Met Thr Asp Asn Arg Asn
            595                 600                 605
Arg Gly Arg Asn Lys Ala Arg Tyr Cys Ala Glu Gly Gly Pro Val
610                 615                 620
Leu Gly Arg Asn Lys Asn Glu Leu Glu Gly Trp Gly Gln Gly Val Tyr
625                 630                 635                 640
Ile Arg

<210> SEQ ID NO 43
<211> LENGTH: 477
<212> TYPE: PRT
<213> ORGANISM: Mus musculus

<400> SEQUENCE: 43

Met Glu Val Pro Ser Arg Thr Leu Val Val Gly Ser Ala Glu Ser Tyr
1               5                   10                  15
Thr Ser Arg Pro Ser Asp Ser Asp Val Ser Leu Glu Glu Asp Arg Glu
                20                  25                  30
Ala Leu Arg Lys Glu Ala Glu Arg Gln Ala Leu Ala Gln Leu Glu Lys
            35                  40                  45
Ala Lys Thr Lys Pro Val Ala Phe Ala Val Arg Thr Asn Val Gly Tyr
        50                  55                  60
Asn Pro Ser Pro Gly Asp Glu Val Pro Val Gln Gly Val Ala Ile Thr
65                  70                  75                  80
Phe Glu Pro Lys Asp Phe Leu His Ile Lys Glu Lys Tyr Asn Asn Asp
                85                  90                  95
Trp Trp Ile Gly Arg Leu Val Lys Glu Gly Cys Glu Val Gly Phe Ile
            100                 105                 110
Pro Ser Pro Val Lys Leu Asp Ser Leu Arg Leu Leu Gln Glu Gln Thr
        115                 120                 125
Leu Arg Gln Asn Arg Leu Ser Ser Ser Lys Ser Gly Asp Asn Ser Ser
130                 135                 140
Ser Ser Leu Gly Asp Val Val Thr Gly Thr Arg Arg Pro Thr Pro Pro
145                 150                 155                 160
Ala Ser Gly Asn Glu Met Thr Asn Phe Ala Phe Glu Leu Asp Pro Leu
                165                 170                 175
Glu Leu Glu Glu Glu Glu Ala Glu Leu Gly Glu His Gly Gly Ser Ala
            180                 185                 190
Lys Thr Ser Val Ser Ser Val Thr Thr Pro Pro His Gly Lys Arg
        195                 200                 205
Ile Pro Phe Phe Lys Lys Thr Glu His Val Pro Pro Tyr Asp Val Val
    210                 215                 220
Pro Ser Met Arg Pro Ile Ile Leu Val Gly Pro Ser Leu Lys Gly Tyr
225                 230                 235                 240
Glu Val Thr Asp Met Met Gln Lys Ala Leu Phe Asp Phe Leu Lys His
                245                 250                 255
Arg Phe Asp Gly Arg Ile Ser Ile Thr Arg Val Thr Ala Asp Ile Ser
            260                 265                 270
Leu Ala Lys Arg Ser Val Leu Asn Asn Pro Ser Lys His Ile Ile Ile
        275                 280                 285
Glu Arg Ser Asn Thr Arg Ser Ser Leu Ala Glu Val Gln Ser Glu Ile
    290                 295                 300
Glu Arg Ile Phe Glu Leu Ala Arg Thr Leu Gln Leu Val Ala Leu Asp
305                 310                 315                 320
```

-continued

```
Ala Asp Thr Ile Asn His Pro Ala Gln Leu Ser Lys Thr Ser Leu Ala
            325                 330                 335

Pro Ile Ile Val Tyr Ile Lys Ile Thr Ser Pro Lys Val Leu Gln Arg
        340                 345                 350

Leu Ile Lys Ser Arg Gly Lys Ser Gln Ser Lys His Leu Asn Val Gln
    355                 360                 365

Ile Ala Ala Ser Glu Lys Leu Ala Gln Cys Pro Pro Glu Met Phe Asp
370                 375                 380

Ile Ile Leu Asp Glu Asn Gln Leu Glu Asp Ala Cys Glu His Leu Ala
385                 390                 395                 400

Glu Tyr Leu Glu Ala Tyr Trp Lys Ala Thr His Pro Pro Ser Ser Thr
                405                 410                 415

Pro Pro Asn Pro Leu Leu Asn Arg Thr Met Ala Thr Ala Ala Leu Ala
            420                 425                 430

Ala Ser Pro Ala Pro Val Ser Asn Leu Gln Val Gln Val Leu Thr Ser
        435                 440                 445

Leu Arg Arg Asn Leu Ser Phe Trp Gly Gly Leu Glu Ala Ser Pro Arg
    450                 455                 460

Gly Gly Asp Ala Val Ala Gln Pro Gln Glu His Ala Met
465                 470                 475

<210> SEQ ID NO 44
<211> LENGTH: 1929
<212> TYPE: DNA
<213> ORGANISM: Mus musculus

<400> SEQUENCE: 44
atggtccaga gagcggcat gtcccggggc ccttacccac cttcccaaga gatccctatg    60
gaggtcttcg accccagccc acagggcaag tacagcaaga ggaaagggcg gttcaaaagg   120
tcagacggga gtacgtcctc ggatacaaca tccaacagct tcgtccgcca gggctcagca   180
gagtcctaca cgagccgacc atcagactct gatgtgtctc tggaggagga ccggaagcc    240 ttaaggaagg aggcagagcg ccaggcctta gcccagctcg agaaagccaa gaccaaacca   300
gtggcttttg ctgttcggac aaatgttggc tacaatccgt ctccagggga tgaggtgcct   360
gtacagggag tggccatcac cttttgagccc aaggacttcc tacacatcaa ggagaagtac   420
aataatgact ggtggattgg gcggctggtg aaggaaggct cgaggttgg cttcatcccc   480 agcccggtca aactggacag ccttcgtctg ctgcaggaac agaccctgcg ccagaaccgc   540
ctcagctcca gcaagtcagg tgacaactcc agttccagtc tgggagatgt ggtgactggc   600
acccgccgcc ccacaccccc tgccagtggt aatgaaatga ctaactttgc ctttgagcta   660 gacccctag agttagagga ggaggaggca gagctagggg agcacggcgg ctcagccaag   720
actagcgtga gcagtgtcac cacgccgcca ccccacggca gcgcatccc cttctttaag   780 aagacagagc acgtgccccc ctatgacgtg gtgccttcca tgaggcccat catcctggtg   840
ggaccgtcgc tcaagggcta tgaggtgaca gacatgatgc agaaagcgtt gtttgacttc   900
ctcaagcatc ggtttgatgg caggatttcc atcacccggg taacagctga catttccctg   960
gccaaacgct ccgtcctcaa caaccccagc aaacacatca tcattgagcg ctccaacacg  1020
cgttccagcc tggctgaggt acagagtgaa attgagagga tcttcgagct ggcccggacc  1080
ttgcagctgg tcgccttgga cgctgacacc atcaaccacc cagcccagct ctctaaaacg  1140
tcgctggccc ccatcattgt ttacatcaag atcacatctc ccaaggtact gcagaggctc  1200
atcaaatccc gagggaagtc tcaatccaaa cacctcaatg tccaaatagc agcctcggag  1260
```

```
aagctggcac agtgtccccc cgaaatgttt gacataatcc tggacgagaa ccaattggaa    1320
gatgcctgcg agcacctggc tgagtacttg gaagcctact ggaaggccac acatccgcct    1380
agcagcacgc cacccaatcc gctgctgaac cgcaccatgg ctaccgcagc tctggctgcc    1440
agccctgccc ccgtctccaa cctccaggga ccctaccttg cttccgggga ccagccgctg    1500
gaccgggcca ctggggaaca tgccagtgtg cacgagtacc ccggggaact gggccagccc    1560
ccaggccttt accccagcaa ccacccacct ggccgggcag caccctgcg gccgctatcc    1620 cgccaagaca cctttgatgc tgacaccccc ggcagccgaa attctgccta cacggagccg    1680
ggagactcgt gtgtggacat ggagacagac ccctcagagg gcccagggcc tgagacccct    1740 gcaggggag gcacaccacc agcccggcag ggctcctggg aagacgagga agactatgag    1800
gaggagatga ccgacaacag gaaccggggc cggaataagg cccgctactg tgcggagggt    1860
ggtgggccgg ttctggggcg caataagaat gagctggagg gctggggaca aggcgtctac    1920
atccgctga                                                            1929
```

<210> SEQ ID NO 45
<211> LENGTH: 1794
<212> TYPE: DNA
<213> ORGANISM: Mus musculus

<400> SEQUENCE: 45

```
atggtccaga gagcggcat gtcccggggc ccttacccac cttcccaaga gatccctatg      60
gaggtcttcg accccagccc acagggcaag tacagcaaga ggaaagggcg gttcaaaagg    120
tcagacggga gtacgtcctc ggatacaaca tccaacagct tcgtccgcca gggctcagca    180
gagtcctaca cgagccgacc atcagactct gatgtgtctc tggaggagga ccggaaagcc    240
ttaaggaagg aggcagagcg ccaggcctta gcccagctcg agaaagccaa gaccaaacca    300
gtggcttttg ctgttcggac aaatgttggc tacaatccgt ctccagggga tgaggtgcct    360
gtacagggag tggccatcac ctttgagccc aaggacttcc tacacatcaa ggagaagtac    420
aataatgact ggtggattgg gcggctggtg aaggaaggct gcgaggttgg cttcatcccc    480
agcccggtca aactggacag ccttcgtctg ctgcaggaac agaccctgcg ccagaaccgc    540
ctcagctcca gcaagtcagg tgacaactcc agttccagtc tgggagatgt ggtgactggc    600
acccgccgcc ccacaccccc tgccagtgcc aaacagaaga gaaatcgac agagcacgtg    660 cccccctatg acgtggtgcc ttccatgagg cccatcatcc tggtgggacc gtcgctcaag    720
ggctatgagt tgacagacat gatgcagaaa gcgttgtttg acttcctcaa gcatcggttt    780
gatggcagga tttccatcac ccgggtaaca gctgacattt ccctggccaa acgctccgtc    840
ctcaacaacc ccagcaaaca catcatcatt gagcgctcca cacgcgttc cagcctggct    900 gaggtacaga gtgaaattga gaggatcttc gagctggccc ggaccttgca gctggtcgcc    960
ttggacgctg acaccatcaa ccacccagcc cagctctcta aaacgtcgct ggccccatc   1020 attgtttaca tcaagatcac atctcccaag gtactgcaga ggctcatcaa atcccgaggg   1080
aagtctcaat ccaaacacct caatgtccaa atagcagcct cggagaagct ggcacagtgt   1140
ccccccgaaa tgtttgacat aatcctggac gagaaccaat ggaagatgc ctgcgagcac   1200 ctggctgagt acttggaagc ctactggaag gccacacatc cgcctagcag cacgccaccc   1260
aatccgctgc tgaaccgcac catggctacc gcagctctgg ctgccagccc tgcccccgtc   1320
tccaacctcc agggacccta ccttgcttcc ggggaccagc cgctggaccg ggccactggg   1380
```

-continued

```
gaacatgcca gtgtgcacga gtaccccggg gaactgggcc agcccccagg cctttacccc    1440
agcaaccacc cacctggccg ggcaggcacc ctgcgggcgc tatcccgcca agacaccttt    1500
gatgctgaca cccccggcag ccgaaattct gcctacacgg agccgggaga ctcgtgtgtg    1560
gacatggaga cagaccccctc agagggccca gggcctggag accctgcagg gggaggcaca    1620
ccaccagccc ggcagggctc ctgggaagac gaggaagact atgaggagga gatgaccgac    1680
aacaggaacc ggggccggaa taaggcccgc tactgtgcgg agggtggtgg gccggttctg    1740
gggcgcaata agaatgagct ggagggctgg ggacaaggcg tctacatccg ctga          1794
```